(12) United States Patent
Cooper

(10) Patent No.: US 11,144,520 B2
(45) Date of Patent: Oct. 12, 2021

(54) INFORMATION SYSTEM WITH VERSIONING DESCENDING NODE SNAPSHOT

(71) Applicant: ADP, LLC, Roseland, NJ (US)

(72) Inventor: Thomas A. Cooper, Sutton, MA (US)

(73) Assignee: ADP, LLC, Roseland, NJ (US)

( * ) Notice: Subject to any disclaimer, the term of this patent is extended or adjusted under 35 U.S.C. 154(b) by 783 days.

(21) Appl. No.: 14/707,451

(22) Filed: May 8, 2015

(65) Prior Publication Data

US 2016/0328425 A1    Nov. 10, 2016

(51) Int. Cl.
  *G06F 16/21*    (2019.01)
  *G06F 16/22*    (2019.01)

(52) U.S. Cl.
  CPC ........ *G06F 16/219* (2019.01); *G06F 16/2246* (2019.01)

(58) Field of Classification Search
  CPC ......... G06F 17/30309; G06F 17/30327; G06F 16/219; G06F 16/2246; G06F 16/9024; G06F 16/9535; G06F 16/24578; G06F 16/90335; G06F 16/248; G06F 16/164; G06F 16/904; G06F 16/245; G06F 16/24575; G06F 16/27; G06F 16/24534; G06F 16/2455; G06F 16/2438; G06F 16/2465; G06F 16/367; G06F 16/221; G06F 16/24522; G06F 16/2453; G06F 16/24535; G06F 16/35; G06F 16/353; G06F 16/45; G06F 16/9027; G06F 16/906; G06F 16/9537; G06F 16/128; G06F 16/182; G06F 16/2365; G06F 16/13; G06F 16/1844; G06F 16/185; G06F 16/9017; G06F 16/183; G06F 16/1865; G06F 16/1873; G06F 16/275; G06F 16/9566
  USPC ........................................................ 707/695
  See application file for complete search history.

(56) References Cited

U.S. PATENT DOCUMENTS

| | | | |
|---|---|---|---|
| 5,162,986 A | 11/1992 | Graber et al. | |
| 5,745,681 A | 4/1998 | Levine et al. | |
| 5,862,325 A * | 1/1999 | Reed .................. | H04L 29/06 704/270.1 |
| 6,088,717 A | 7/2000 | Reed et al. | |
| 6,199,047 B1 * | 3/2001 | Dimino .............. | G06Q 30/0201 379/114.01 |
| 6,332,163 B1 | 12/2001 | Bowman-Amuah | |
| 6,415,298 B1 * | 7/2002 | Oesterer ................... | G06F 8/71 |
| 6,434,568 B1 | 8/2002 | Bowman-Amuah | |

(Continued)

FOREIGN PATENT DOCUMENTS

WO    2006016350 A2    2/2006

*Primary Examiner* — Pierre M Vital
*Assistant Examiner* — Andalib F Lodhi
(74) *Attorney, Agent, or Firm* — Yee & Associates, P.C.

(57) ABSTRACT

A method for accessing information. A request to change a piece of the information is received from a source. A branch for the piece of the information is identified using an identifier in the request. The branch is part of branches in a hierarchical structure and the branches are versions of the piece of the information. The identifier identifies the branch. The branch is changed when the request is from a source that controls a portion of the information in which the branches for the piece of the information are located in a location and the source is part of sources that control portions of the information in the location.

28 Claims, 31 Drawing Sheets

(56) References Cited

U.S. PATENT DOCUMENTS

| | | | |
|---|---|---|---|
| 6,539,396 B1 | 3/2003 | Bowman-Amuah | |
| 6,550,057 B1 | 4/2003 | Bowman-Amuah | |
| 6,813,587 B2 | 11/2004 | McIntyre et al. | |
| 6,986,102 B1 | 1/2006 | Baer et al. | |
| 7,146,524 B2 | 12/2006 | Patel et al. | |
| 8,028,329 B2 | 9/2011 | Whitcomb | |
| 8,230,443 B2 | 7/2012 | Resnick et al. | |
| 8,275,836 B2 | 9/2012 | Beaven et al. | |
| 8,346,826 B2 * | 1/2013 | Torii | G06F 11/1456 707/831 |
| 8,351,600 B2 | 1/2013 | Resch | |
| 8,417,715 B1 | 4/2013 | Bruckhaus et al. | |
| 8,429,351 B1 | 4/2013 | Yu et al. | |
| 8,468,137 B2 | 6/2013 | Baptist et al. | |
| 8,473,756 B2 | 6/2013 | Orsini et al. | |
| 8,612,397 B2 * | 12/2013 | Henderson | G06F 16/27 707/687 |
| 8,909,806 B2 | 12/2014 | Bocharov et al. | |
| 9,087,088 B1 * | 7/2015 | Bose | G06F 16/22 |
| 2003/0018510 A1 | 1/2003 | Sanches | |
| 2003/0097383 A1 | 5/2003 | Smirnov et al. | |
| 2005/0097046 A1 * | 5/2005 | Singfield | G06Q 20/042 705/42 |
| 2008/0104141 A1 * | 5/2008 | McMahon | G06F 17/2288 |
| 2008/0109421 A1 * | 5/2008 | Yoo | G06F 16/2477 |
| 2008/0140629 A1 * | 6/2008 | Porter | G06F 17/30595 |
| 2008/0168135 A1 | 7/2008 | Redlich et al. | |
| 2009/0199090 A1 * | 8/2009 | Poston | G06F 16/907 715/255 |
| 2010/0010968 A1 | 1/2010 | Redlich et al. | |
| 2010/0161556 A1 * | 6/2010 | Anderson | G06F 16/174 707/638 |
| 2012/0209886 A1 * | 8/2012 | Henderson | G06F 16/273 707/798 |
| 2013/0073465 A1 * | 3/2013 | Richey | G06Q 40/02 705/44 |
| 2014/0207592 A1 * | 7/2014 | Kavis | G06Q 40/12 705/21 |
| 2016/0078103 A1 * | 3/2016 | Novik | G06F 16/2477 707/725 |
| 2017/0024446 A1 * | 1/2017 | O'Kane | G06F 16/254 |
| 2017/0099183 A1 * | 4/2017 | Vaidyanathan | G05B 19/0426 |

* cited by examiner

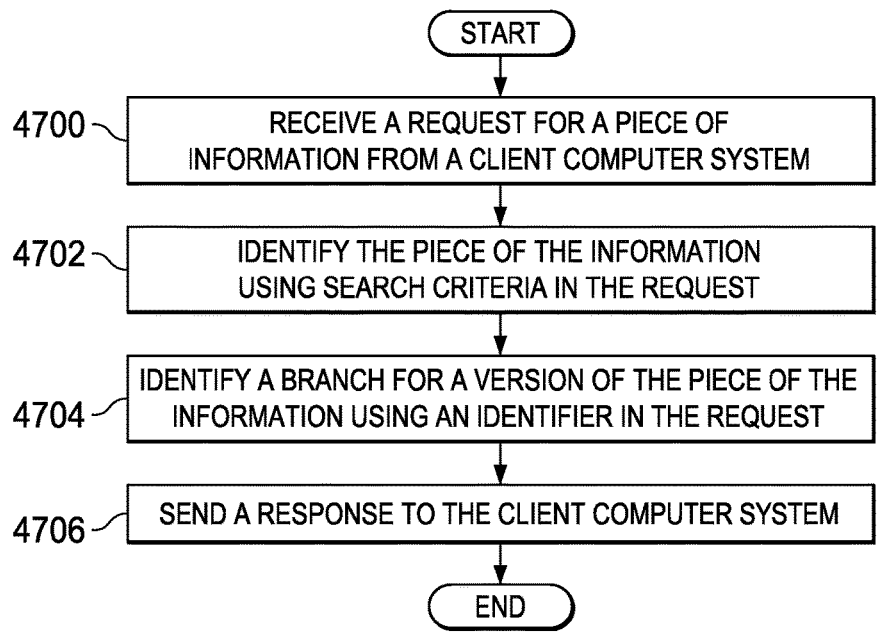
FIG. 47
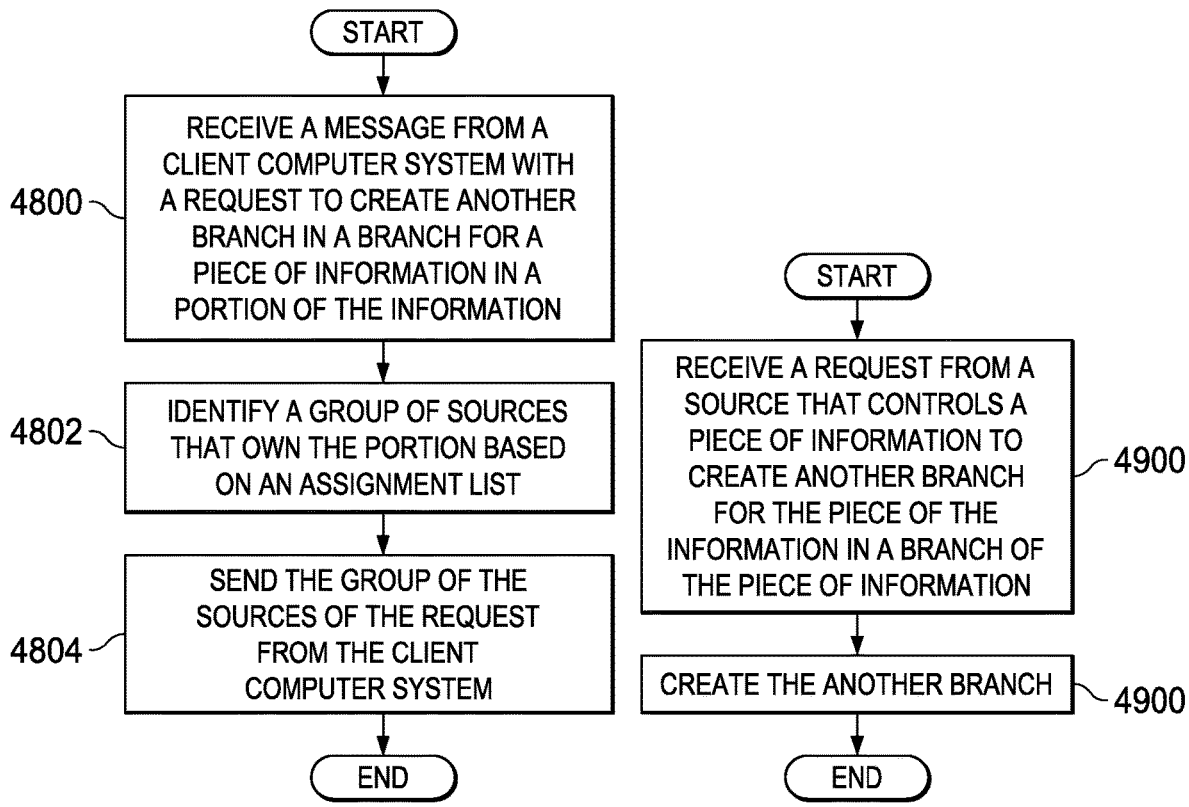
FIG. 48
FIG. 49

INFORMATION SYSTEM WITH VERSIONING DESCENDING NODE SNAPSHOT

CROSS-REFERENCE TO RELATED APPLICATIONS

This application is related to the following patent applications: entitled "Subscription-Based Information System," Ser. No. 14/707,323, now U.S. Pat. No. 10,075,386, and entitled "Information System with Temporal Data," Ser. No. 14/707,408, each filed even date herewith, each assigned to the same assignee, and each incorporated herein by reference in its entirety.

BACKGROUND INFORMATION

1. Field

The present disclosure relates generally to an improved computer system, and in particular, to a method and apparatus for accessing information. Still more particularly, the present disclosure relates to a method and apparatus for accessing information that may be usable at different times in an information system.

2. Background

Information systems are used for many different purposes. Many types of information may be located in the information systems for use by an organization.

For example, an information system may have information in the form of payroll information. This payroll information is used to process payroll to generate paychecks for employees in an organization.

Additionally, an information system also may include personnel information used by a human resources department to maintain benefits and other records about employees. For example, a human resources department may manage health insurance, wellness plans, and other programs and organizations using benefits information in the information system. As another example, this type of information may be used to determine when to hire new employees, assign employees to projects, perform reviews for employees, and other suitable operations for the organization.

Further, the information may come from many sources. The sources may be different departments, organizations, or other sources of the information. These sources may also be in different locations. The information from the different sources may be in information systems for the different sources.

Making information available for use by customers may be more difficult than desired. The information in the information systems may be in different formats. These formats may include, for example, the way the information is stored or the amount of information.

For example, payroll information may be received from different locations. These locations may send information for payroll information for states, regions, countries or other locations.

Accessing the payroll information may be more difficult than desired for use in performing operations for an organization. For example, the payroll information may be formatted differently between some or all of the different locations. Different amounts of information may also be present.

For example, payroll information from a first state that has an income tax may include information about state income taxes. Payroll information from a second state that does not have state taxes does not include this information. The number of fields may be different since the first payroll information from one state includes state tax income information and the second payroll information from the other state does not include state income tax information.

As another example, the information received from two states may be the same type of information. The formatting of the information, however, may be different. For example, a currency symbol may be placed before or after the value. Further, the value may or may not have decimal places. As another example, the names of the fields may be different.

Also, in addition to formatting, the type of currency may be different for different locations. Payroll information from locations in the United States is in dollars, while payroll information from the United Kingdom is in pounds. Payroll information from Germany is in Euros.

With this situation, the information from the two states may be more difficult for the consumer to use than desired. For example, the consumer may wish to aggregate the payroll information from the first state and the second state.

The consumer often changes the format of the payroll information from the format as received into one useable by the consumer. For example, when multiple formats for payroll information are present, these formats are converted such that all of the payroll information has the same format. A consumer accessing this payroll information may find this process more difficult than desired.

Further, receiving information in the same format from different sources is one solution. However, different consumers may need to have the same information in different formats. As a result, having the information in a single format may work for one consumer. Another consumer, however, may need to change the format to one used by that consumer or multiple versions of the information may need to be in the formats needed by the different consumers.

Maintaining multiple versions of information may take more resources than desired. For example, managing updates to multiple versions may be more complex and resource-intensive than desired.

Therefore, it would be desirable to have a method and apparatus that take into account at least some of the issues discussed above, as well as other possible issues. For example, it would be desirable to have a method and apparatus that overcome the technical problem of managing different versions of information in an information system.

SUMMARY

An embodiment of the present disclosure provides a method for accessing information. A computer system receives a request for a piece of the information from a client computer system. The computer system identifies a branch for the piece of the information using an identifier in the request. The branch is part of branches in a hierarchical structure and the branches are versions of the piece of information. The computer system sends a response to the client computer system. The response includes the piece of the information with a group of changes made to the branch by a transaction for the piece of the information at a time period for the request.

Another embodiment of the present disclosure provides a computer system comprising an information manager. The information manager receives a request for a piece of information from a client computer system. The information manager identifies a branch for the piece of the information using an identifier in the request. The branch is part of branches in a hierarchical structure and the branches are versions of the piece of the information. The information manager sends a response to the client computer system. The response includes the piece of the information with a group of changes made to the branch by a transaction for the piece of the information at a time period for the request.

Another embodiment of the present disclosure provides a computer program product for accessing information. The computer program product comprises a computer readable storage media, and first program code, second program code, and third program code stored on the computer readable storage media. The first program code receives a request for a piece of the information from a client computer system. The second program code identifies a branch for the piece of the information using an identifier in the request. The branch is part of branches in a hierarchical structure and the branches are versions of the piece of the information. The third program code sends a response to the client computer system. The response includes the piece of the information with a group of changes made to the branch by a transaction for the piece of the information at a time period for the request.

Yet another embodiment of the present disclosure provides a method for accessing information. A request to change a piece of the information is received from a source. A branch for the piece of the information is identified using an identifier in the request. The branch is part of branches in a hierarchical structure and the branches are versions of the piece of the information. The identifier identifies the branch. The branch is changed when the request is from a source that controls a portion of the information. The branches for the piece of the information are located in a location and the source is part of sources that control portions of the information in the location.

Still another embodiment of the present disclosure provides a computer system comprising an information manager. The information manager receives a request to change a piece of information from a source. The information manager identifies a branch for the piece of the information using an identifier in the request. The branch is part of branches in a hierarchical structure and the branches are versions of the piece of the information. The identifier identifies the branch. The information manager changes the branch when the request is from a source that controls a portion of the information. The branches for the piece of the information are located in a location and the source is part of sources that control portions of the information in the location.

Another embodiment of the present disclosure provides a computer program product for accessing information. The computer program product comprises a computer readable storage media, and first program code, second program code, and third program code located on the computer readable storage media. The first program code receives a request to change a piece of the information from a source. The second program code identifies a branch for the piece of the information using an identifier in the request. The branch is part of branches in a hierarchical structure and the branches are versions of the piece of the information. The identifier identifies the branch. The third program code changes the branch when the request is from the source that controls a portion of the information. The branches for the piece of the information are located in a location and the source is part of sources that control portions of the information in the location.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 47 is an illustration of a flowchart of a process for accessing information in accordance with an illustrative embodiment;

FIG. 48 is an illustration of a flowchart of a process for managing messages about information in accordance with an illustrative embodiment;

FIG. 49 is an illustration of a flowchart of a process for adding a branch to a piece of information in accordance with an illustrative embodiment;

DETAILED DESCRIPTION

The illustrative embodiments recognize and take into account one or more different considerations. For example, the illustrative embodiments recognize and take into account that reducing the number of formats for a particular type of information may result in easier access and processing of information by a consumer. The illustrative embodiments also recognize and take into account that the reduction in the number of formats may occur through reducing the number of parties that control formats for a particular type of information that may be accessed by a consumer. A consumer is a person, organization, or entity that may access information using computers or other data processing devices.

Figure 1:
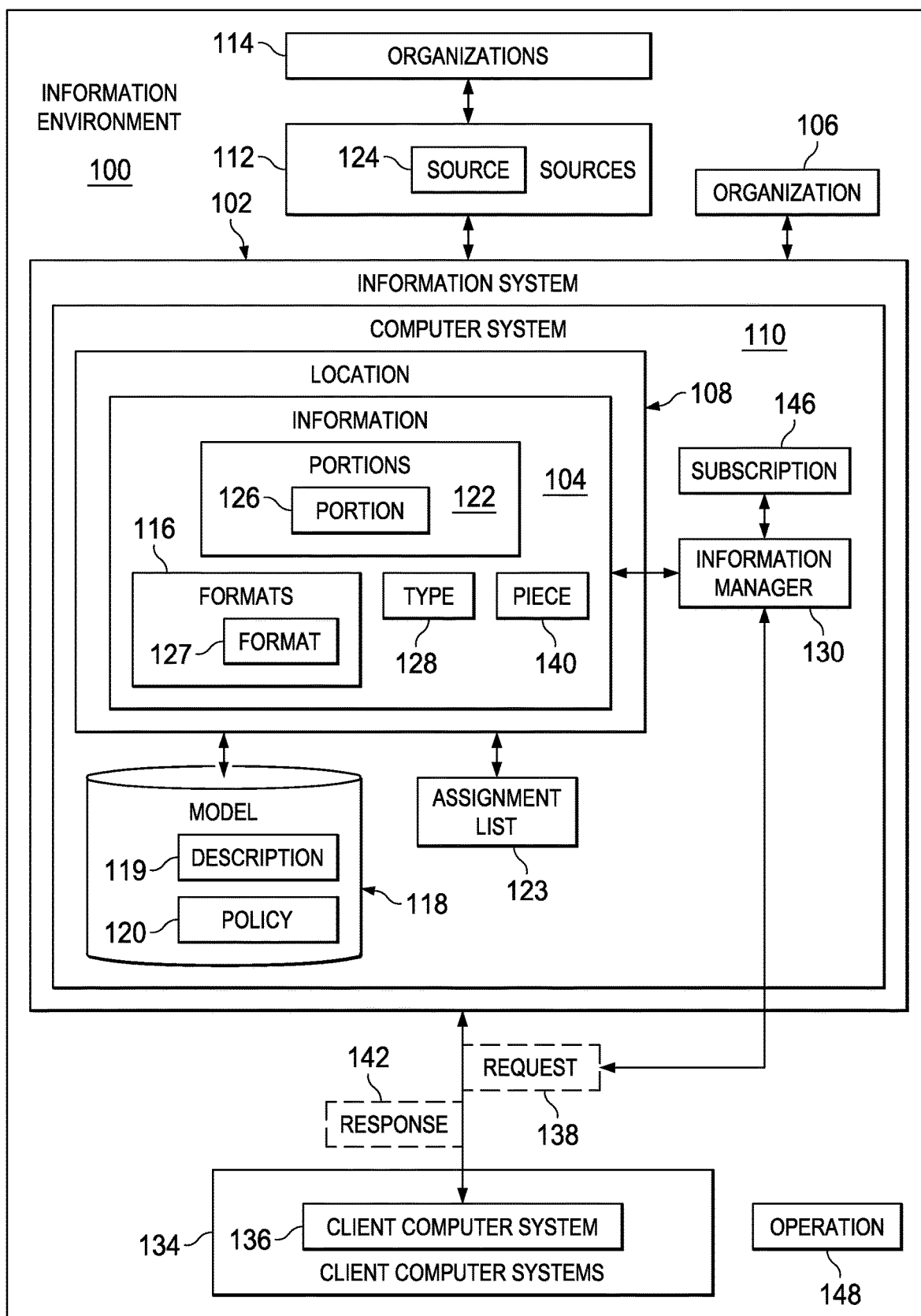
FIG. 1 is an illustration of a block diagram of an information environment in accordance with an illustrative embodiment.

With reference now to the figures, and in particular, with reference to FIG. 1, an illustration of a block diagram of an information environment is depicted in accordance with an illustrative embodiment. In this illustrative example, information environment 100 includes information system 102. Information system 102 manages information 104 about organization 106.

As depicted, information system 102 is used to manage information 104. This management of information 104 may include at least one of writing, modifying, deleting, distributing, partitioning, sharing, assigning ownership, accessing, or otherwise manipulating information 104.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In the illustrative example, organization 106 may take various forms. For example, organization 106 may be a company, a charity, an educational group, a social group, a team, a government entity, a group of businesses, or some other suitable organization.

As depicted, information 104 is stored in location 108 in computer system 110. Computer system 110 is a hardware system that includes one or more data processing systems. In this illustrative example, information 104 is stored in one or more data processing systems in location 108 in computer system 110.

When more than one data processing system is present in computer system 110, those data processing systems may be in communication with each other using a communications medium. The communications medium may be a network. The data processing systems may be in more than one location. The data processing systems may be selected from at least one of a computer, a server computer, or some other suitable data processing system for storing information 104 in location 108. Location 108 may be at least one of a computer, a storage system, a hard disk drive system, or some other part of computer system 110 that may store information 104. Location 108 may function as a hub for receiving and distributing information 104.

In this illustrative example, information 104 is received from a group of sources 112. "A group of," as used herein, when used with reference to items, means one or more items. For example, a group of sources 112 is one or more of sources 112.

As depicted, sources 112 are organizations 114 that send information 104 to location 108 in computer system 110. A portion of sources 112 may be part of organization 106 or may belong to organizations 114.

In this illustrative example, information 104 has formats 116. A format is the manner in which information 104 is organized. For example, a format for information 104 may include at least one of a file format for encoding information for storage in a computer file, an audio format, a video format, a data type, a primitive type, a numeric type, a type of data structure, a structure for a record, a structure for a table, a name of a field in a data structure, a type of encryption, a message format, a date format, a type of currency, a font type, a font size, a language, or other suitable formats that may be used to organize information 104.

In this illustrative example, model 118 is a description of entities and relationships between the entities. As depicted, description 119 in model 118 describes formats 116 for information 104 in location 108. Additionally, model 118 includes policy 120. Policy 120 is a group of rules and also may include information used to apply the group of rules.

In this illustrative example, policy 120 describes how sources 112 may be assigned to a group of portions 122 of information 104. For example, each of sources 112 is assigned to control a group of portions 122 of information 104 based on policy 120 in model 118.

As depicted, assignment list 123 identifies which ones of sources 112 are assigned to particular ones of portions 122. Assignment list 123 is generated when policy 120 is applied to identify the assignment of sources 112 to portions 122.

In the illustrative example, source 124 is assigned to control portion 126 in portions 122. In other words, source 124 controls information 104 in portion 126. As depicted, source 124 decides what information is present in portion 126, format 127 in formats 116 used for information 104 in portion 126, the size of portion 126, when information 104 in portion 126 is updated, and other suitable parameters with respect to portion 126.

In this illustrative example, information 104 present in portion 126 is based on type 128 of information 104. For example, all of information 104 in portion 126 may be information 104 about benefits. Benefits are ones of type 128 of information 104.

Type 128 of information 104 may take different forms. For example, type 128 of information 104 is selected from one of accounting, research, business planning, accounts receivable, accounts payable, sales, marketing, payroll, benefits, taxes, education, or other suitable classifications for information 104.

As depicted, information 104 in location 108 is managed by information manager 130. In this example, information manager 130 may be implemented in software, hardware, firmware, or a combination thereof. When software is used, the operations performed by information manager 130 may be implemented in program code configured to run on hardware, such as a processor unit. When firmware is used, the operations performed by information manager 130 may be implemented in program code and data and stored in persistent memory to run on a processor unit. When hardware is employed, the hardware may include circuits that operate to perform the operations in information manager 130.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

For example, in managing information 104 in location 108, information manager 130 may perform various functions to manage information 104. For example, information manager 130 receives information 104 from sources 112. In particular, information manager 130 may receive information 104 from sources 112 for distribution to client computer systems 134. Information 104 may be received from sources 112 in formats 116 as described by model 118. In other words, information 104 may be placed into formats 116 by sources 112.

Information manager 130 places information 104 into location 108. Information 104 may be distributed to client computer systems 134.

Additionally, information manager 130 also facilitates the control of information 104 by sources 112. For example, information manager 130 may determine which ones of sources 112 may make changes to different ones of portions 122 of information 104. Information manager 130 may determine whether source 124 is allowed to change information 104 in portion 126 when source 124 sends a request to change information 104 in portion 126. This determination is made using assignment list 123, generated using policy 120.

Furthermore, information manager 130 also functions to distribute information 104 as part of managing information 104. In this illustrative example, information manager 130 may distribute information 104 to client computer systems 134. Client computer system 136 in client computer systems 134 is one or more data processing systems. The data processing system may be selected from at least one of a computer, a server computer, a workstation, a laptop computer, a tablet computer, a mobile phone, or some other suitable type of data processing system. Client computer systems 134 are consumers of information 104 in this depicted example.

For example, information manager 130 may receive request 138 from client computer system 136 in client computer systems 134. In this example, request 138 is for piece 140 of information 104.

Information manager 130 identifies piece 140 of information 104 that corresponds to request 138. Information manager 130 returns response 142 to request 138 for information 104 to client computer system 136. In this manner, access to information 104 in different formats may be simplified.

In this illustrative example, client computer systems 134 are aware of formats 116 for portions 122 of information 104. For example, client computer systems 134 may access model 118 and receive description 119 for formats 116. Client computer systems 134 may request description 119 in model 118 from information manager 130 in the illustrative example.

As depicted, client computer systems 134 may be made aware of changes to information 104. Client computer system 136 in client computer systems 134 may register with information manager 130 to obtain subscription 146.

For example, client computer system 136 may subscribe to one or more of portions 122 of information 104 controlled by sources 112. With subscription 146, information manager 130 notifies client computer system 136 subscribing to the group of portions 122 of information 104 of an occurrence of at least one of a change in format for the group of portions 122, an addition of information 104 to the group of portions 122, a deletion of information 104 from the group of portions 122, a modification of information 104 in the group of portions 122, a change of the group of sources 112 controlling the group of portions 122, or some other change to the group of portions 122. In this manner, information system 102 is a subscription-based information system.

Further, subscription 146 may be obtained when client computer system 136 first contacts information manager 130 to access information 104. In this example, subscription 146 results in information manager 130 sending description 119 of format 127 for portion 126 of information 104 to client computer system 136.

Thus, the technical problem of information 104 having different formats in information system 102 is solved through one or more technical solutions in the illustrative examples. In one illustrative example, a technical solution is present in which formats 116 for portions 122 are controlled by a limited number of sources 112. In the depicted example, each portion in portions 122 is controlled by a source in sources 112. Further, each portion has a type of information 104. As a result, when client computer system 136 requests a particular type of information 104 in portion 126, client computer system 136 knows what number of formats 116 to expect for information 104 when obtaining information 104 from portion 126.

In this manner, operation 148 may be performed. Operation 148 may be performed by client computer systems 134, organization 106, organizations 114, or some other suitable type of entity. Thus, portion 126 in portions 122 of information 104 is type 128 of information 104 that may be used to perform operation 148 for organization 106. As depicted, operation 148 may be, for example, hiring, benefits administration, research, forming a team, performing performance evaluations, manufacturing a product, or some other suitable type of operation.

The source controls format or formats used in the portion assigned to the source. As a result, a technical effect in which a reduced number of formats 116 are present for each of portions 122 occurs through reducing the number of sources 112 that control formats 116 for each of portions 122. By having source 124 control portion 126 of information 104, uniformity in formats 116 for portion 126 of information 104 may be achieved.

As a result, computer system 110 operates as a special purpose computer system in which information manager 130 in computer system 110 enables easier access to information 104 by client computer systems 134. The easier access occurs in one illustrative example through assigning control of portions 122 of information 104 to particular ones of sources 112. This assignment is made such that the number of formats 116 that are used in portions 122 is reduced. For example, portion 126 may use format 127 that is controlled by source 124. In this particular example, other ones of sources 112 do not supply portion 126 of information 104. As a result, conflicts with type 128 of information 104 in portion 126 from different formats may be avoided. In particular, information manager 130 transforms computer system 110 into a special purpose computer system as compared to currently available general computer systems that do not have information manager 130.

Computer system 110 in location 108 performs a transformation of information 104. For example, computer system 110 aggregates information 104 from sources 112 into location 108. As depicted, location 108 is between sources 112 and the consumers of information 104, client computer systems 134. In this example, client computer systems 134 may access information 104 more easily from location 108 knowing formats 116. As described above, description 119 of formats 116 may be obtained by client computer systems 134.

Figure 2:
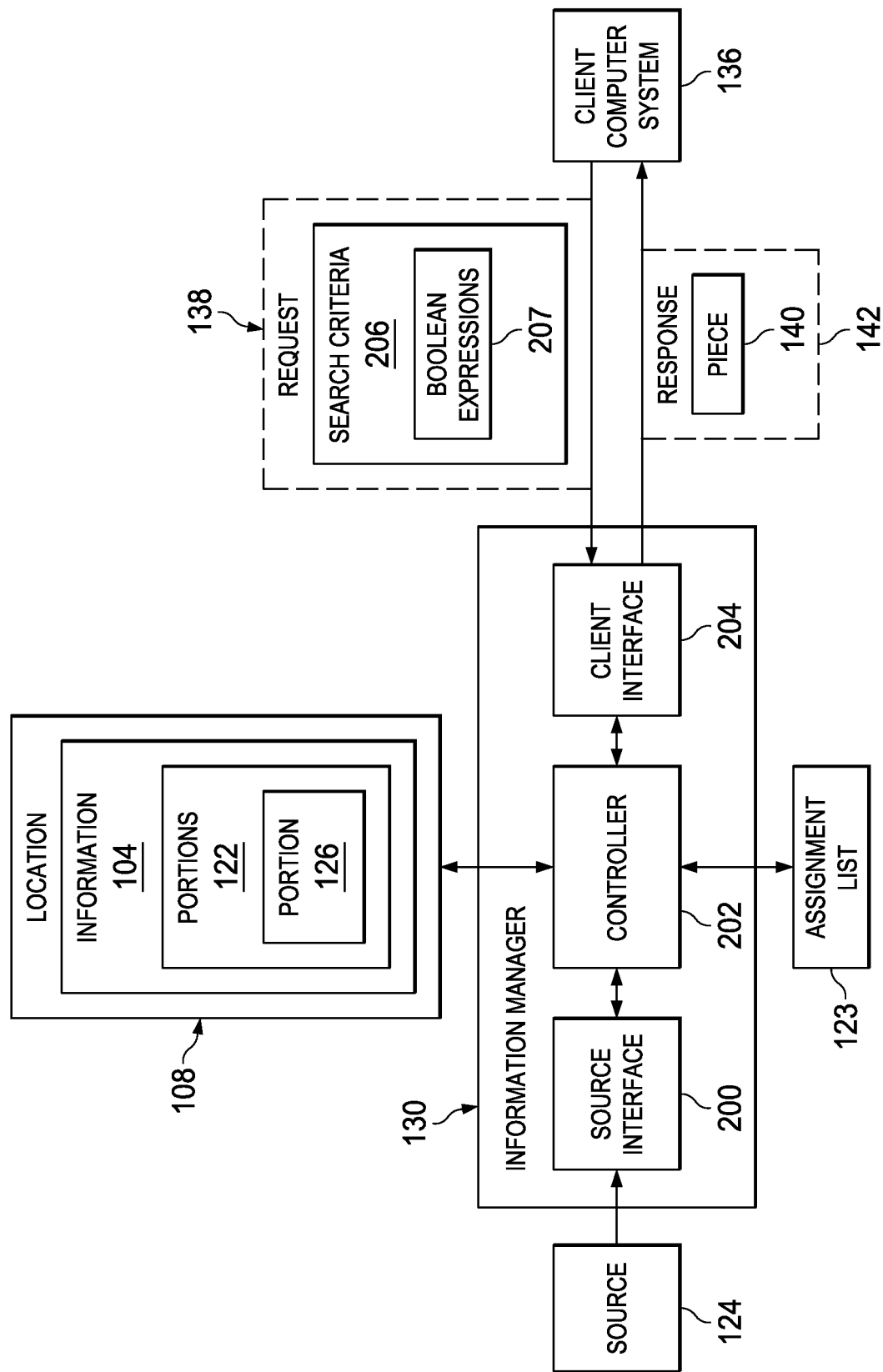
FIG. 2 is an illustration of a block diagram of data flow for accessing information in accordance with an illustrative embodiment.

With reference next to FIG. 2, an illustration of a block diagram of data flow for accessing information is depicted in accordance with an illustrative embodiment. In this figure, an example of data flow for a process for accessing piece 140 of information 104 through information manager 130 is shown. In the illustrative examples, the same reference numeral may be used in more than one figure. This reuse of a reference numeral in different figures represents the same element in the different figures.

In this illustrative example, information manager 130 has a number of different components. As depicted, information manager 130 includes source interface 200, controller 202, and client interface 204. In this illustrative example, each of source interface 200 and client interface 204 is at least one of web services, representational state transfer services, durable queues, or some other suitable type of service interface.

As depicted, controller 202 receives request 138 through client interface 204. In this illustrative example, request 138 includes search criteria 206. Search criteria 206 indicate a group of portions 122 of information 104. As depicted, search criteria 206 may be in the form of a query. For example, the query may be defined using a query by example (QBE) standard.

Search criteria 206 includes a group of boolean expressions 207. The group of boolean expressions 207 are tests for values in the group of portions 122 of information 104. The group of boolean expressions 207 includes at least one of a wild card or text. A wild card indicates matching text is variable for the portion indicated by the wild card. Wild cards in search criteria 206 are selected from at least one of "★", "?", or other suitable types of wild cards.

For example, search criteria 206 may include a boolean expression indicating the name value pair "employee": "★Smith." In this example, search criteria 206 is a request for portions 122 of information 104 indicated by a name value pair with the name "employee" and a value that matches any text that ends with "Smith." For example, when a value for a named value pair with the name "employee" in a portion of the information includes the value "Tom Smith," the portion indicates a match for search criteria 206.

Controller 202 identifies piece 140 of information 104 in location 108 based on search criteria 206. In this illustrative example, location 108 in computer system 110 may organize information 104 in a number of different ways. For example, at least one of a graph database, a relational database, a file system, or some other suitable type mechanism for organizing information 104 may be used.

Controller 202 then generates response 142. In this illustrative example, controller 202 includes piece 140 in response 142. Controller 202 then sends response 142 to client computer system 136 through client interface 204.

Figure 3:
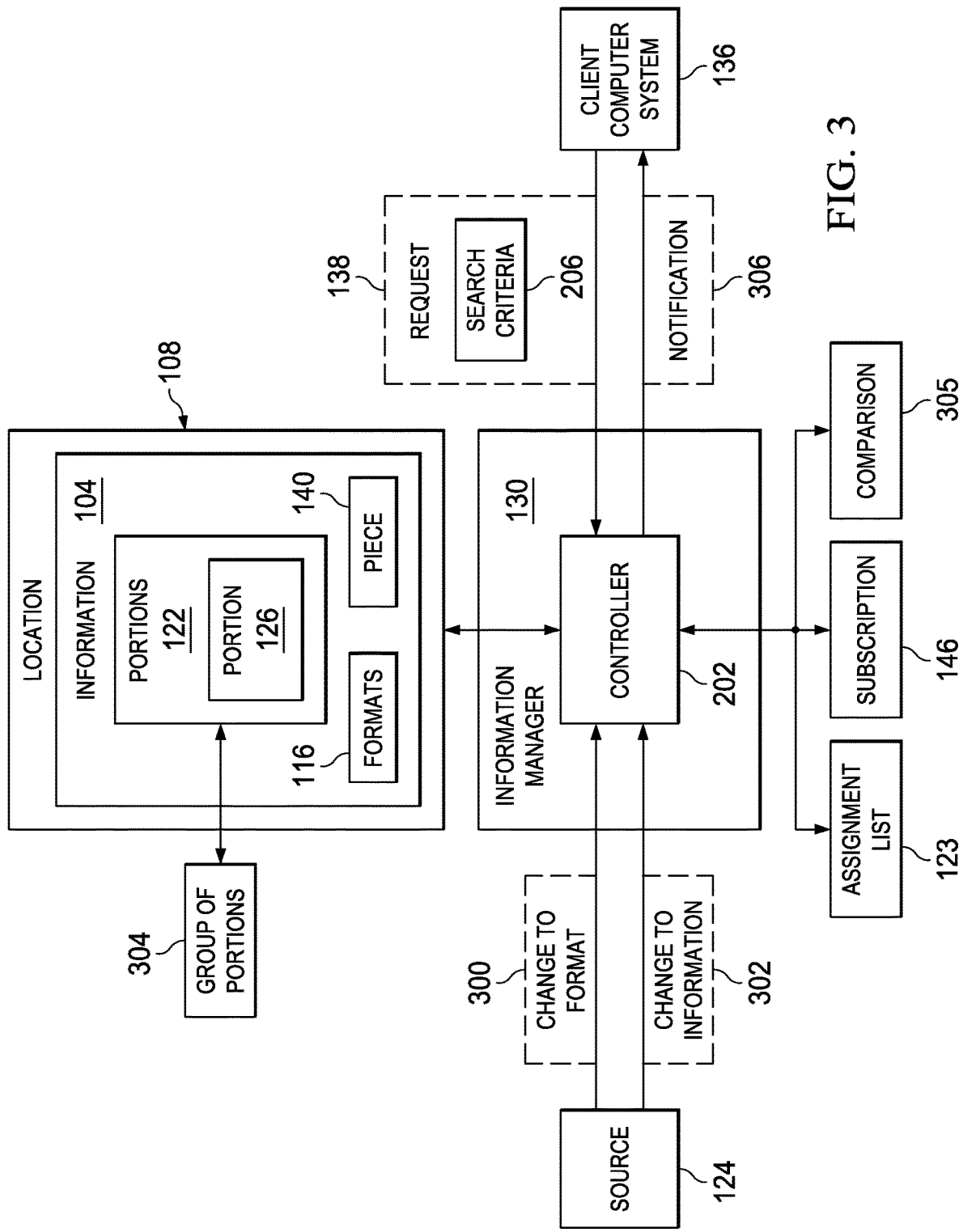
FIG. 3 is an illustration of a block diagram of data flow for processing subscriptions to portions of information in accordance with an illustrative embodiment.

Turning to FIG. 3, an illustration of a block diagram of data flow for processing subscriptions to portions of information is depicted in accordance with an illustrative embodiment. In this figure, an example of data flow for a process for processing subscription 146 through information manager 130 is shown.

In processing subscription 146, controller 202 receives request 138. Request 138 includes search criteria 206. In this illustrative example, controller 202 stores search criteria 206 in subscription 146. Controller 202 stores search criteria 206 in subscription 146 when controller 202 receives request 138.

In this illustrative example, controller 202 receives at least one of change to format 300 for group of portions 304 in portions 122 or change to information 302 for group of portions 304. Change to information 302 is at least one of information for group of portions 304, an addition of additional information for group of portions 304, a modification of information 104 in group of portions 304, or a deletion of information 104 from group of portions 304. Change to format 300 is at least one of an additional format in formats 116 for group of portions 304, modifications to a format in formats 116 for group of portions 304, or a removal of a format in formats 116 for group of portions 304.

Controller 202 compares source 124 to assignment list 123 for group of portions 304. Controller 202 determines whether source 124 is allowed to change group of portions 304 based on the comparison. Controller 202 stores at least one of change to format 300 for group of portions 304 in portions 122 or change to information 302 for group of portions 304 in location 108 when source 124 is allowed to change group of portions 304.

Controller 202 generates comparison 305 between search criteria 206 and the change allowed to group of portions 304.

In this illustrative example, comparison 305 is an indication of a match between search criteria 206 and the change allowed to group of portions 304. For example, when search criteria 206 includes a boolean expression indicating the name value pair "accounting data": "★", comparison 305 indicates portions of the change located in accounting data in information 104.

Controller 202 identifies piece 140 of information 104 based on comparison 305. For example, piece 140 may include a portion of the change allowed to group of portions 304.

Controller 202 generates notification 306 when piece 140 of information 104 is identified in comparison 305. In this illustrative example, controller 202 includes at least one of a copy of piece 140, a pointer to piece 140, or other suitable information in notification 306. Controller 202 also includes an indication of at least one of change to format 300 or change to information 302 in notification 306. Controller 202 then sends notification 306 to client computer system 136.

Figure 4:
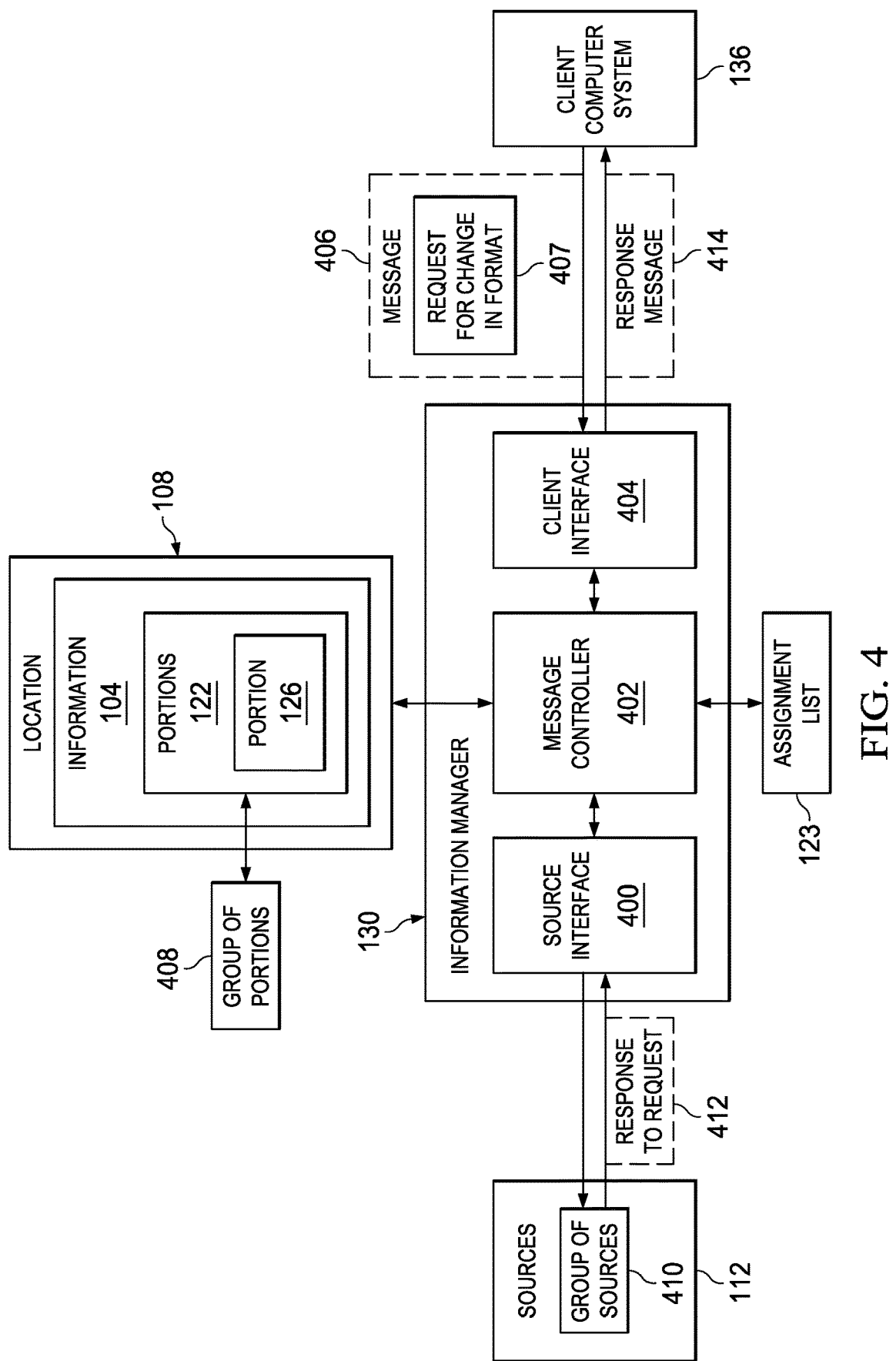
FIG. 4 is an illustration of a block diagram of data flow for managing messages between client computer systems and sources of information in accordance with an illustrative embodiment.

Turning now to FIG. 4, an illustration of a block diagram of data flow for managing messages between client computer systems and sources of information is depicted in accordance with an illustrative embodiment. In this figure, an example of data flow for a process for managing messages through information manager 130 is shown.

In this illustrative example, information manager 130 has a number of different components. As depicted, information manager 130 includes source interface 400, message controller 402, and client interface 404.

As depicted, client interface 404 is at least one of an email service, an instant messaging service, or other suitable type of messaging service. Source interface 400 is at least one of a web service, a representational state transfer service, a durable queue, an email service, an instant messaging service, or other suitable type of service interface.

Message controller 402 receives message 406 from client computer system 136. As depicted, message 406 includes request for change in format 407 for group of portions 408.

Message controller 402 identifies group of sources 410 that own portion 126 based on assignment list 123. Message controller 402 sends group of sources 410 request for change in format 407 through source interface 400.

Message controller 402 receives response to request 412 from group of sources 410. Message controller 402 generates response message 414. Message controller 402 includes an indication of response to request 412 in response message 414. Message controller 402 then sends response message 414 to client computer system 136 through client interface 404.

For example, request for change in format 407 may be a request to change a field in portion 126 from using United States dollar format to Euro format. Request for change in format 407 may also include a request to change the order of fields in portion 126. Request for change in format 407 may further include a request to add additional fields to portion 126.

When these changes are for performing operation 148 in FIG. 1, these changes may save organization 106 time because portion 126 would be closer to what is needed to perform operation 148. In this illustrative example, an employee of organization 106 does not need to know who to talk to in sources 112 to make request for change in format 407 for portion 126.

Figure 5:
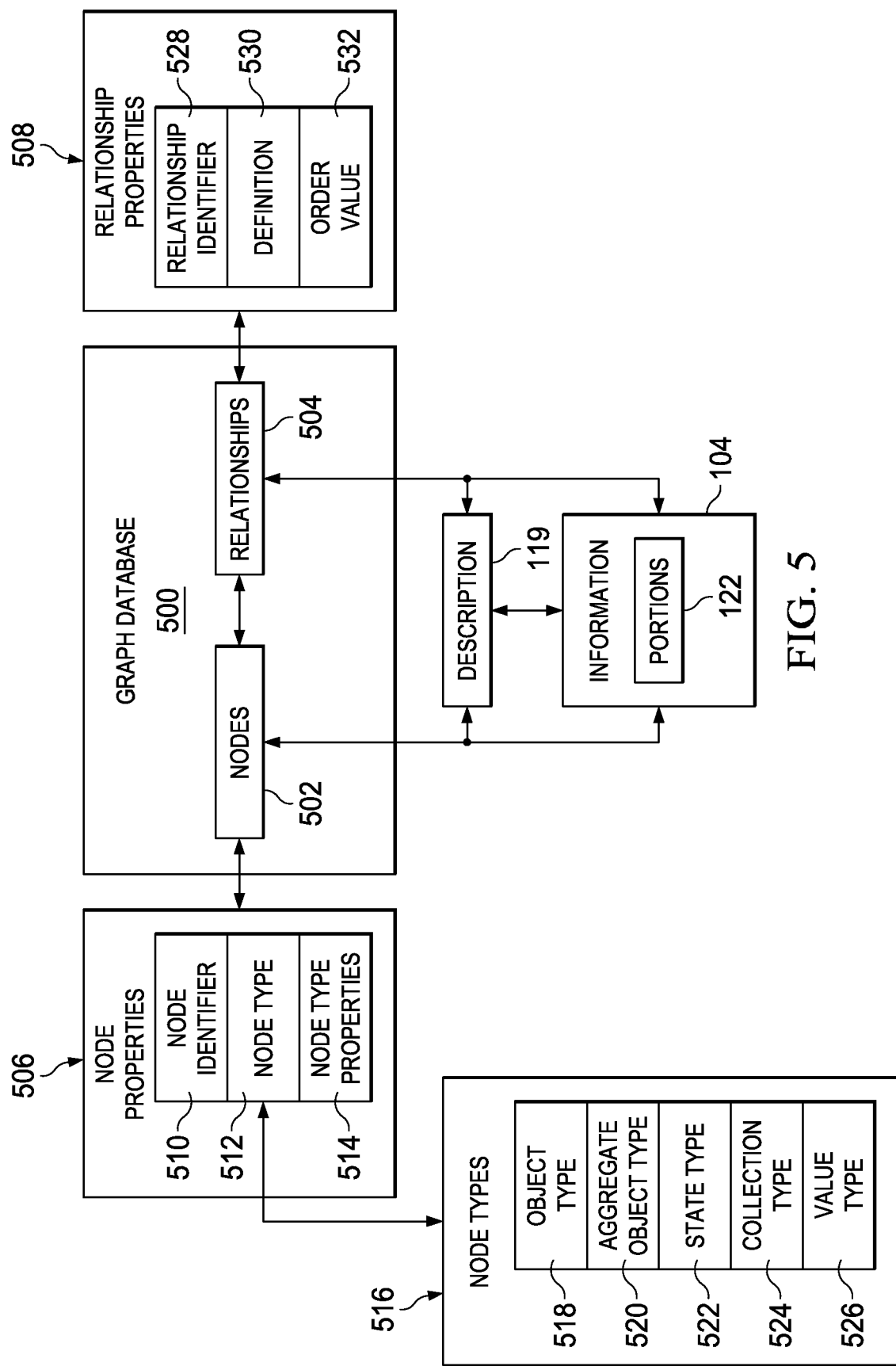
FIG. 5 is an illustration of a block diagram of a graph database in accordance with an illustrative embodiment.

With reference to FIG. 5, an illustration of a block diagram of a graph database is depicted in accordance with an illustrative embodiment. In this illustration, graph database 500 is an example of a data structure that may be used in location 108 in FIGS. 1-4. Graph database 500 may store information 104.

As depicted, graph database 500 includes nodes 502 and relationships 504. In this illustrative example, nodes 502 indicate description 119 of formats 116 for portions 122 of information 104. Nodes 502 also indicate values for portions 122 of information 104. Nodes 502 may represent at least one of accounting, research, business planning, accounts receivable, accounts payable, sales, marketing, payroll, benefits, taxes, education, or other suitable classifications for information 104. As depicted, relationships 504 indicate the relationship between nodes 502.

In this illustrative example, nodes 502 have node properties 506. Additionally, relationships 504 have relationship properties 508.

As depicted, node properties 506 are the properties of nodes 502. These properties of nodes 502 identify description 119 of formats 116 for portions 122 of information 104. These properties also identify values for portions 122 of information. In this illustrative example, node properties 506 include node identifier 510, node type 512, and node type properties 514.

Node identifier 510 points to the node in which node identifier 510 is located. For example, node identifier 510 may be alpha numeric text that identifies the node in graph database 500.

Node type 512 indicates the type of the node in which node type 512 is located. Node type 512 also indicates the type of properties in node type properties 514.

In this illustrative example, node type 512 is selected from at least one of node types 516 or some other suitable type for representing portions 122 of information 104 as nodes 502 in graph database 500. As depicted, node types 516 include object type 518, aggregate object type 520, state type 522, collection type 524, and value type 526.

State type 522 is the node type of a node in nodes 502 for state. State is a group of named values for a portion of information 104.

Object type 518 is the node type of a node in nodes 502 for an object. An object is a data structure that contains data. The data is a portion of the information. For example, when the portion of information includes a name formed by a first name and a last name, the name is an object with the first name and the last name.

As another illustrative example, when the portion of information 104 includes a customer list with names and contact information, the customer list is an object that includes a list of names and contact information. In this example, the contact information may also be an object.

Aggregate object type 520 is an example of node types 516 used for an aggregate object. An aggregate object is an object with a key. The key in an aggregate object is a pointer to the aggregate object for a portion of information. The key is used to access the portion through client interface 204.

Collection type 524 is an example of node types 516. In this illustrative example, collection type 524 is used for a collection. A collection is a sequence of portions of information. The sequence includes at least one of objects, collections, or values.

Value type 526 is an example of node types 516 for a value. This value is a value in a portion of information.

Node type properties 514 indicate at least one of the format or the values of portions 122 of information 104. Node type properties 514 include at least one of attributes, values, references, or other suitable types of properties. For example, a node type property for a node may be at least one of an attribute of the node, a value for the node, or a reference pointing to the node.

In the illustrated example, relationship properties 508 are the properties of relationships 504. These properties are the properties of the relationship between two nodes. As depicted, relationship properties 508 include relationship identifier 528, definition 530, and order value 532.

Relationship identifier 528 points to the relationship in which relationship identifier 528 is located. For example, relationship identifier 528 may be alpha numeric text that identifies the relationship in graph database 500.

As depicted, definition 530 defines the relationship between two nodes. Definition 530 includes pointers to the two nodes. Definition 530 indicates the two nodes are related to each other.

For example, when the first of the two nodes is an object, definition 530 defines a relationship between the object and at least one of another object, a state of the object, a collection of the object, or a value of the object. As another example, when the first node of the two nodes is a collection, definition 530 defines a relationship between the collection and at least one of another collection in the collection, an object in the collection, a group of states in the collection, or a value in the collection.

In this illustrative example, order value 532 is a value specifying relative order of a relationship in a sequence of relationships. For example, the value may be at least one of a number, an alphanumeric sequence of characters, or some other suitable value that indicates order in a sequence of relationships.

Figure 6:
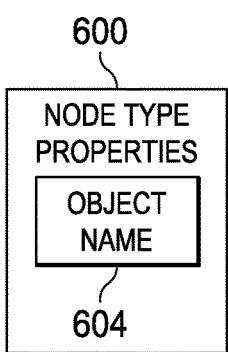
FIG. 6 is an illustration of a block diagram of node type properties for an object in accordance with an illustrative embodiment.

FIGS. 6-10 are illustrative examples of node type properties 514 in FIG. 5. With reference first to FIG. 6, an illustration of a block diagram of node type properties for an object is depicted in accordance with an illustrative embodiment. In this illustrative example, node type properties 600 are an example of node type properties 514 in node properties 506. In this illustration, node type properties 600 are for a node in nodes 502 that represents an object.

As depicted, node type properties 600 includes object name 604. Object name 604 is the name of a portion of information in portions 122 of information 104 in FIGS. 1-5. For example, when description 119 of formats for portions 122 of information 104 is in JavaScript object notation (JSON), the portion is an object that is defined using JavaScript object notation. In this example, object name 604 is the name of the object defined using JavaScript object notation. Description 119 of formats for portions 122 of information 104 may be in a language selected from at least one of extensible markup language (XML), standard generalized markup language (SGML), or some other suitable type of standard for defining formats of information.

Figure 7:
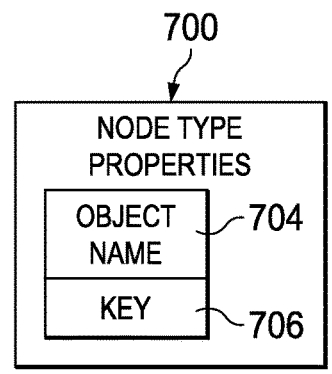
FIG. 7 is an illustration of a block diagram of node type properties for an aggregate object in accordance with an illustrative embodiment.

With reference next to FIG. 7, an illustration of a block diagram of node type properties for an aggregate object is depicted in accordance with an illustrative embodiment. In this illustrative example, node type properties 700 are an example of node type properties 514 in node properties 506 in FIG. 5. In this illustration, node type properties 700 are for a node in nodes 502 that represents an aggregate object.

As depicted, node type properties 700 include object name 704 and key 706. Object name 704 is the name of a portion of information in portions 122 of information 104 in FIGS. 1-5. Key 706 is a name of the portion that may be used to access the portion through client interface 204. For example, key 706 may be a universal resource locator that points to the portion.

Figure 8:
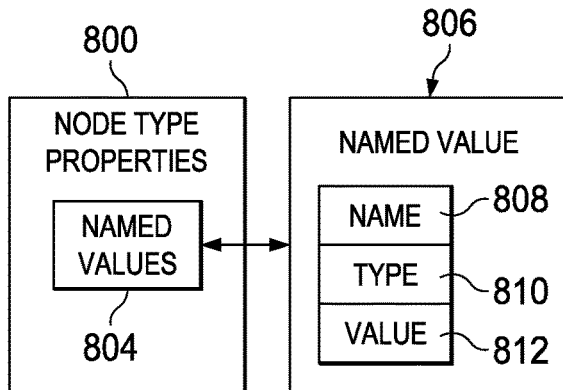
FIG. 8 is an illustration of a block diagram of node type properties for a state in accordance with an illustrative embodiment.

With reference now to FIG. 8, an illustration of a block diagram of node type properties for a state is depicted in accordance with an illustrative embodiment. In this illustrative example, node type properties 800 are an example of node type properties 514 in node properties 506 in FIG. 5. In this illustration, node type properties 800 are for a node in nodes 502 that represents a state.

As depicted, node type properties 800 include a group of named values 804. Named value 806 is an example of a named value in the group of named values 804. Named value 806 includes name 808, type 810, and value 812.

Name 808 is the name of value 812 for a portion of information in portions 122 of information 104 in FIGS. 1-5. Type 810 is the type of value 812. In this illustrated example, type 810 is selected from at least one of string, number, integer, double, Boolean, or some other suitable type of value for the portion.

As depicted, value 812 is the value for the portion of information in portions 122 of information 104 named by name 808. For example, named values 804 may be name value pairs for a portion of information in portions 122 of information 104.

Figure 9:
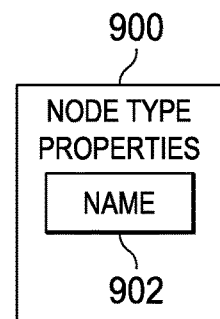
FIG. 9 is an illustration of a block diagram of node type properties for a collection in accordance with an illustrative embodiment.

Turning next to FIG. 9, an illustration of a block diagram of node type properties for a collection is depicted in accordance with an illustrative embodiment. In this illustrative example, node type properties 900 are an example of node type properties 514 in FIG. 5. In this illustration, node type properties 900 are for a collection.

As depicted, node type properties 900 include name 902. Name 902 is the name for an array of at least one of objects, collections, or values for a portion of information in portions 122 of information 104 in FIGS. 1-5.

For example, when description 119 of formats 116 for portions 122 of information 104 is in JavaScript object notation (JSON), this portion is an array that is defined using JavaScript object notation. In this example, name 902 is the name of the array defined using JavaScript object notation.

Figure 10:
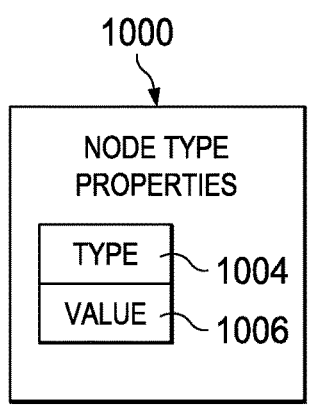
FIG. 10 is an illustration of a block diagram of node type properties for a value in accordance with an illustrative embodiment.

Turning now to FIG. 10, an illustration of a block diagram of node type properties for a value is depicted in accordance with an illustrative embodiment. In this illustrative example, node type properties 1000 are an example of node type properties 514 in FIG. 5. In this illustration, node type properties 1000 are for a value.

As depicted, node type properties 1000 include type 1004 and value 1006. Type 1004 is the type of value 1006 for a portion of information in portions 122 of information 104 in FIGS. 1-5. In this illustrated example, type 1004 is selected from at least one of string, number, integer, double, Boolean, or some other suitable type of value for the portion of information. As depicted, value 1006 is the value for the portion of information.

The illustration of information environment 100 and the different components in FIGS. 1-10 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, one or more of sources 112 may be assigned to portion 126 in addition to source 124. For example, two organizations in organizations 114 may have sources 112 that send information 104 to portion 126. Both of these organizations may control format 127 for portion 126. Format 127 is used for all of information 104 in portion 126 in this illustrative example.

In another illustrative example, information 104 may be located in one or more locations in addition to in place of location 108. In other words, information 104 may be stored in a distributed manner.

As another example, at least one of source interface 200 or client interface 204 may be located in controller 202. As still another example, source interface 200 may include a first portion located in source 124 and a second portion located in controller 202.

As a further example, node types 516 may include at least one of additional node types, fewer node types, or different node types. For example, aggregate object type 520 may be removed from node types 516. In this example, key 706 may be at least one of added to node type properties 600 or added as a state in nodes 502.

Figure 11:
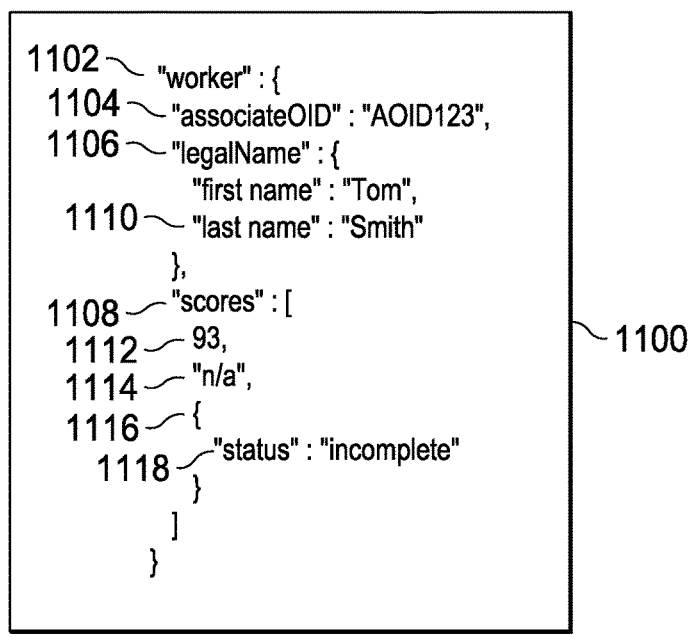
FIG. 11 is an illustration of a portion of information in accordance with an illustrative embodiment.

With reference to FIG. 11, an illustration of a portion of information is depicted in accordance with an illustrative embodiment. In this illustration, portion 1100 is an example of portion 126 in information 104 in FIG. 1. As depicted, portion 1100 is shown in text using JavaScript object notation.

In this illustrative example, portion 1100 is at least one of received from a source in sources 112 or sent to a client computer system in client computer systems 134 in FIG. 1. In this illustrative example, portion 1100 includes object 1102. Object 1102 has the name "worker." Object 1102 includes named value 1104, object 1106, and collection 1108. Named value 1104 indicates "associateOID" has the value "AOID123."

As depicted, object 1106 has the name "legalName." Object 1106 includes named values 1110. Named values 1110 indicate "first name" has the value "Tom" and "last name" has the value "Smith."

Collection 1108 has the name "scores" in this illustrative example. Collection 1108 includes value 1112, value 1114, and object 1116. As depicted, value 1112 is the first item in collection 1108, value 1114 is the second item in collection 1108, and object 1116 is the third item in collection 1108. Value 1112 indicates the first item in collection 1108 has the value "93." Value 1114 indicates the second item in collection 1108 has the value "n/a." Object 1116 includes named value 1118. Named value 1118 indicates "status" has the value "incomplete." Thus, object 1116 indicates the third item in collection 1108 has named value 1118 that indicates "status" has the value "incomplete."

Figure 12:
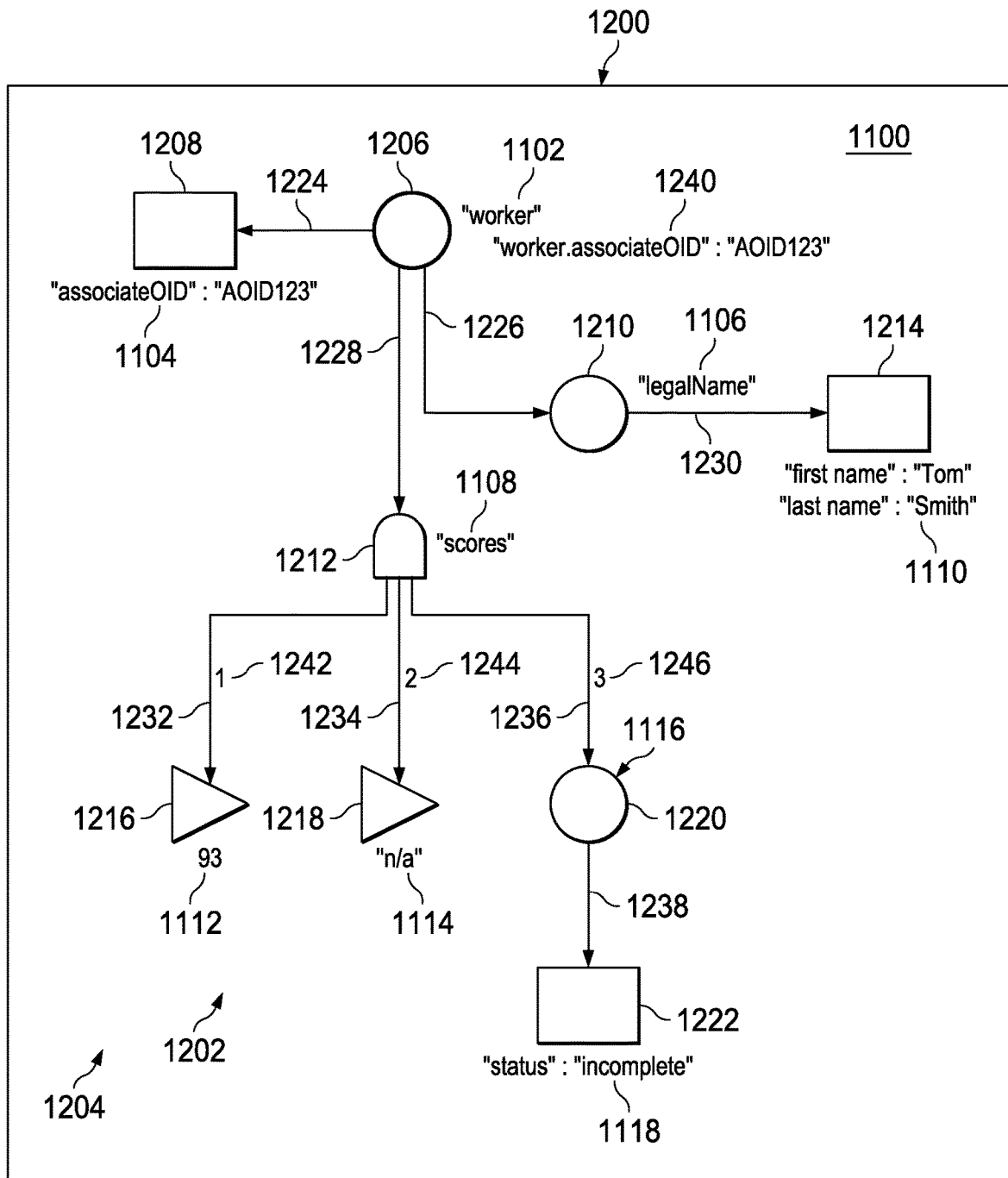
FIG. 12 is an illustration of a graph of information in accordance with an illustrative embodiment.

With reference next to FIG. 12, an illustration of a graph of information is depicted in accordance with an illustrative embodiment. In this illustration, graph 1200 shows nodes 1202 and relationships 1204.

As depicted, nodes 1202 are an example of nodes 502 in graph database 500 and relationships 1204 are an example of relationships 504 in graph database 500 in FIG. 5. In particular, graph 1200 shows where information manager 130 stores portion 1100 of information 104 in graph database 500.

As depicted, nodes 1202 include aggregate object 1206, state 1208, object 1210, collection 1212, state 1214, value 1216, value 1218, object 1220, and state 1222. Aggregate object 1206 is the node in graph database 500 where object 1102 is stored. State 1208 is where named value 1104 is stored. Object 1210 is where object 1106 is stored. Collection 1212 is where collection 1108 is stored. State 1214 is where named values 1110 are stored. Value 1216 is where value 1112 is stored. Value 1218 is where value 1114 is stored. Object 1220 is where object 1116 is stored. State 1222 is where named value 1118 is stored.

In this illustrative example, relationships 1204 include relationship 1224 between aggregate object 1206 and state 1208; relationship 1226 between aggregate object 1206 and object 1210; relationship 1228 between aggregate object 1206 and collection 1212; relationship 1230 between object 1210 and state 1214; relationship 1232 between collection 1212 and value 1216; relationship 1234 between collection 1212 and value 1218; relationship 1236 between collection 1212 and object 1220; and relationship 1238 between object 1220 and state 1222.

Aggregate object 1206 includes key 1240. Key 1240 is an example of key 706 in node type properties 700 in FIG. 7. In this illustrated example, key 1240 is a named value. Key 1240 indicates "worker.associateOID" has the value "AOID123." Aggregate object 1206 may be accessed through client interface 204 with key 1240.

As depicted, relationship 1232 has value 1242, relationship 1234 has value 1244, and relationship 1236 has value 1246. Value 1242, value 1244, and value 1246 are examples of order value 532 in relationship properties 508 in FIG. 5. In this illustrative example, value 1242 in relationship 1232 indicates value 1216 is the first item in collection 1212; value 1244 in relationship 1234 indicates value 1218 is the second item in collection 1212; and value 1246 in relationship 1236 indicates object 1220 is the third item in collection 1212.

The illustrative embodiments also recognize and take into account that changes in information may make it more difficult than desired for a customer to use the information. For example, the illustrative embodiments recognize and take into account that knowing when information is usable is helpful in knowing whether to use the information in identifying operations to be performed. An operation identified using the information may be different if it is known that a piece of the information is not yet usable for identifying the operation.

For example, information about a zoning change in a location that has not yet occurred may be relevant in identifying a real estate development operation. Knowing when the information is useful may be relevant in identifying a real estate development operation involving the location.

In another example, the illustrative embodiments recognize and take into account that knowing when information changes is often useful in analyzing information. For example, the illustrative embodiments recognize and take into account that changes in information may result in restarting an analysis if the analysis is ongoing when the change occurs. Additionally, another analysis may need to be performed if the information changes after the analysis is completed.

For example, forming an analysis in payroll for a one month period may not be as accurate as desired if some information about payroll is added after the information has been treated for analysis. Knowing when changes to the payroll information occur is useful in knowing when to request information about payroll.

Thus, the illustrative embodiments recognize and take into account that it would be helpful to provide data about the usability, changes, or both usability and changes to information in an information system. In one illustrative example, a method for accessing information receives a request for the information, wherein temporal data is associated with the information and indicates when the different portions of information are useable. A time period is identified for the request using the temporal data. A piece of the information corresponding to the request and corresponding to the time period is identified. A response to the request for the information is returned. The response includes the piece of the information, enabling performing an operation using the information with increased accuracy.

Figure 13:
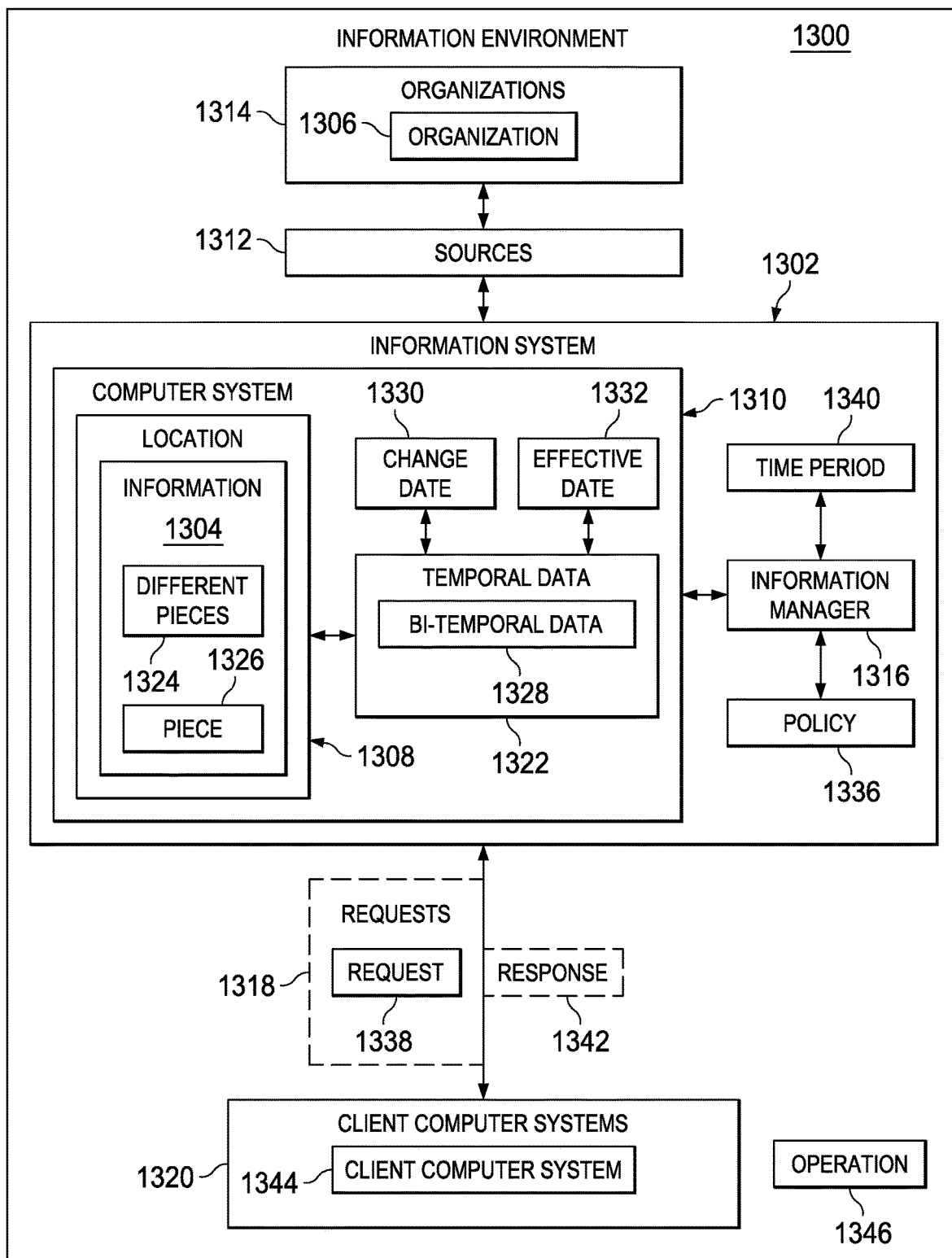
FIG. 13 is an illustration of a block diagram of an information environment in accordance with an illustrative embodiment.

With reference now to FIG. 13, an illustration of a block diagram of an information environment is depicted in accordance with an illustrative embodiment. In this illustrative example, information environment 1300 includes information system 1302. Information system 1302 manages information 1304 about organization 1306.

As depicted, information 1304 is stored in location 1308 in computer system 1310. Computer system 1310 is a hardware system that includes one or more data processing systems. In this illustrative example, information 1304 is stored in one or more data processing systems in location 1308 in computer system 1310. Information 1304 may be stored in one or more databases, or other storage architectures in the one or more data processing systems in location 1308.

In this illustrative example, information system 1302 receives information 1304 from a group of sources 1312. As depicted, sources 1312 are organizations 1314 that send information 1304 to location 1308 in computer system 110. A portion of sources 1312 may be controlled by organization 1306 or may be controlled by organizations 1314.

In this illustrative example, information manager 1316 manages information 1304 in location 1308. For example, information manager 1316 handles receiving and storing information 1304 received from sources 1312. Further, information manager 1316 also handles processing requests 1318 for information 1304 received from client computer systems 1320.

In this illustrative example, the usability of information 1304 is enhanced in information system 1302. As depicted, temporal data 1322 is associated with information 1304 in location 1308 in computer system 1310.

As depicted, temporal data 1322 provides information about information 1304. For example, temporal data 1322 indicates when different pieces 1324 of information 1304 are usable. Further, temporal data 1322 may be associated with all or some of information 1304.

In this illustrative example, information 1304 may be the same as information 104 in FIG. 1. However, different pieces 1324 of information 1304 may be different from portions 122 of information 104 in FIG. 1.

For example, portions 122 of information 104 are parts of information 104 that are controlled by different ones of sources 112. Different pieces 1324 of information 1304 may be in a single portion or multiple portions in portions 122 as depicted in FIG. 1. For example, multiple ones of different pieces 1324 of information 1304 may be in portion 126 of information 104 or piece 1326 of information 1304 may be portion 126 of information 104.

In addition to or in place of indicating when information is usable, temporal data 1322 may indicate when information 1304 changes. For example, temporal data 1322 may indicate when information 1304 was changed.

In this illustrative example, temporal data 1322 is bi-temporal data 1328 when temporal data 1322 indicates at least one of change date 1330 or effective date 1332. In other words, bi-temporal data 1328 may have two types of data with respect to describing information 1304 over time.

As depicted, change date 1330 indicates when information 1304 was changed. Change date 1330 is a date-time that identifies when a physical change to data has occurred. For example, change date 1330 may be a date-time when a transaction that has changed information 1304 occurs. Effective date 1332 indicates when information 1304 is useable.

As depicted, it may be desirable to have some or all of information 1304 associated with temporal data 1322. In this illustrative example, information manager 1316 manages associating temporal data 1322 with information 1304 when temporal data 1322 is needed.

For example, piece 1326 of information 1304 may not be associated with temporal data 1322. In this example, information manager 1316 identifies piece 1326 of information 1304 without temporal data 1322. Information manager 1316 identifies temporal data 1322 for piece 1326 of information 1304. This identification is made in this example based on policy 1336. Policy 1336 is one or more rules used to identify temporal data 1322 that should be associated with piece 1326 of information 1304. Policy 1336 may also include data that is applied to the rules in policy 1336.

Information manager 1316 associates temporal data 1322 identified for piece 1326 of information 1304 with piece 1326 of information 1304. With this processing, information 1304 may be in a form more desirable for use in responding to requests 1318 for information 1304 from client computer systems 1320.

For example, during operation of information manager 1316, information manager 1316 may associate temporal data 1322 with information 1304 received from sources 1312 of information 1304 that does not have temporal data 1322 when received from sources 1312. In this manner, the usability of information 1304 may be increased.

For example, temporal data 1322 may enable performing operation 1346 with increased accuracy. Temporal data 1322 may be taken into account with information 1304 to identify operation 1346, perform operation 1346, or both identify and perform operation 1346.

As depicted, information manager 1316 may respond to requests 1318 for information 1304 having temporal data 1322 associated with information 1304. For example, information manager 1316 may receive request 1338 for information 1304 from client computer system 1344 in client computer systems 1320.

As depicted, temporal data 1322 is associated with information 1304. In this illustrative example, temporal data 1322 indicates when information 1304 is useable. Information manager 1316 identifies piece 1326 of information 1304 corresponding to request 1338 using temporal data 1322.

Information manager 1316 returns response 1342 to request 1338 to client computer system 1344. In this example, response 1342 includes piece 1326 of information 1304, enabling performing operation 1346 using information 1304 with increased accuracy. In some illustrative examples, response 1342 may also include temporal data 1322 for piece 1326 of information 1304.

In one illustrative example, identifying piece 1326 of information 1304 by information manager 1316 may include identifying time period 1340 for request 1338 using temporal data 1322. Information manager 1316 identifies piece 1326 of information 1304 corresponding to request 1338 and corresponding to time period 1340 identified.

Thus, the illustrative example provides one or more technical solutions to the technical problem of information being usable at different times, changing over time, or both being usable at different times and changing over time in an information system. In one illustrative example, the technical solution uses temporal data 1322 to identify information 1304 to be returned to client computer system 1344.

In this manner, the usability and when changes are made to information 1304 may be taken into account in requests 1318 for information 1304 by client computer systems 1320. Additionally, temporal data 1322 may be returned with information 1304 that is responsive to requests 1318. This temporal data may be used or taken into account when using information 1304 to identify or perform operation 1346.

As a result, computer system 1310 operates as a special purpose computer system in which information manager 1316 in computer system 1310 enables easier access to information 1304 by client computer systems 1320. The easier access occurs in one illustrative example through the use of temporal data 1322. The access also includes identifying time period 1340 for request 1338 using temporal data 1322. Thus, information manager 1316 transforms computer system 1310 into a special purpose computer system as compared to currently available general computer systems that do not have information manager 1316.

Computer system 1310 in location 1308 performs a transformation of information 1304. For example, computer system 1310 aggregates information 1304 from sources 1312 into location 1308. As depicted, location 1308 is between sources 1312 and the consumers of information 1304, client computer systems 1320. Further, temporal data 1322 may be identified and associated with information 1304. In this example, client computer systems 1320 may access and use information 1304 more easily from location 1308 with the association of temporal data 1322 with information 1304. As described above, temporal data 1322 may or may not be returned with information 1304 that is responsive to requests 1318.

Figure 14:
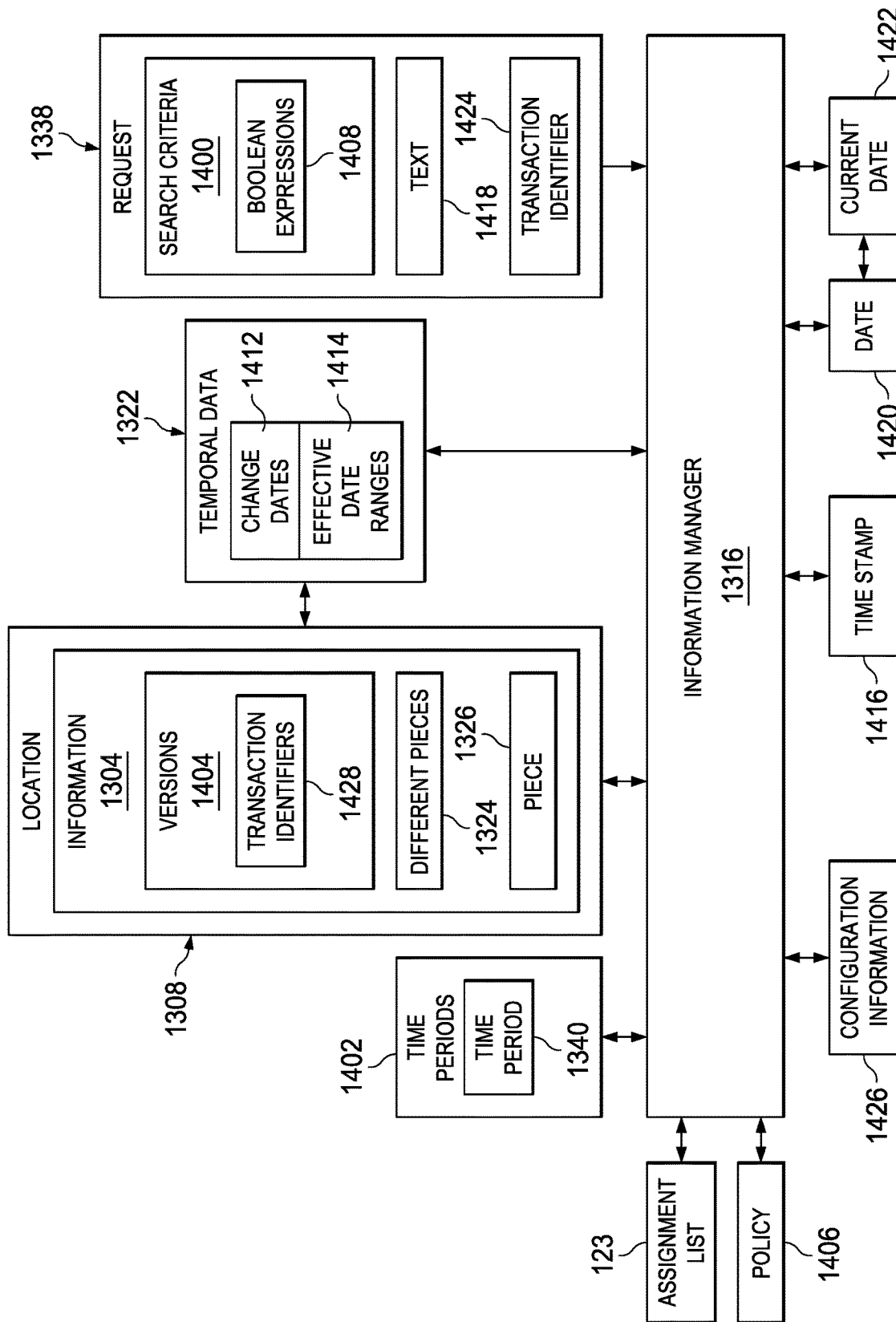
FIG. 14 is an illustration of a block diagram of data flow for identifying a time period for a request in accordance with an illustrative embodiment.

Turning to FIG. 14, an illustration of a block diagram of data flow for identifying a time period for a request is depicted in accordance with an illustrative embodiment. In this figure, an example of data flow for a process for identifying time period 1340 for request 1338 through information manager 1316 is shown. In this illustration, information manager 1316 identifies time period 1340 for request 1338 using temporal data 1322. In this illustrative example, time period 1340 is selected from at least one of a change date or an effective date.

In this illustrative example, information manager 1316 identifies time period 1340 for request 1338. As depicted, information manager 1316 identifies piece 1326 of information 1304 in location 1308 based on search criteria 1400 for request 1338. Information manager 1316 also identifies a group of time periods 1402 from temporal data 1322 for piece 1326 in which a group of versions 1404 of piece 1326 of information 1304 are useable. Information manager 1316 further identifies time period 1340 from the group of time periods 1402 based on policy 1406 for selecting time periods for requests.

As depicted, information manager 1316 receives request 1338. In this illustrative example, request 1338 includes search criteria 1400. Search criteria 1400 is an example of search criteria 206 in FIG. 2. Search criteria 1400 includes a group of boolean expressions 1408. The group of boolean expressions 1408 is an example of the group of boolean expressions 207 in FIG. 2. Information manager 1316 identifies piece 1326 of information 1304 in location 1308 based on the group of boolean expressions 1408 in search criteria 1400.

For example, search criteria 1400 may include a boolean expression indicating the name value pair "employee": "★Smith." In this example, search criteria 1400 is a request for piece 1326 of information 1304 indicated by a name value pair with the name "employee" and a value that matches any text that ends with "Smith." For example, when a value for a named value pair with the name "employee" in a portion of the information includes the value "Tom Smith," the portion indicates a match for search criteria 1400.

In this illustrative example, information 1304 includes versions 1404 of data objects in location 1308. A version of a data object is a form of the data object that is different from other versions of the data object. The difference between two versions of a data object is selected from at least one of a change to the format of the information in the data object and a change to the information in the data object.

For example, when the data object is a full name of a person and the full name of the person changes on a certain date, the first version of the full name is the name before the change and the second version of the full name is the name after the change. In this example, when the format of the full name changes after the full name of the person has changed, a third version of the full name is the version of the full name in the changed format.

As depicted, temporal data 1322 includes change dates 1412 for versions 1404 and effective date ranges 1414 for versions 1404. Change dates 1412 are examples of change date 1330 in FIG. 13. Effective date ranges 1414 specify when the versions of data objects are useable.

Information manager 1316 identifies the group of versions 1404 of piece 1326 in information 1304. Information manager 1316 next identifies the group of time periods 1402 for the group of versions 1404 of piece 1326 of information 1304 from effective date ranges 1414 for versions 1404.

As depicted, time period 1340 is in the group of time periods 1402. In this example, information manager 1316 identifies time period 1340 from the group of time periods 1402 based on policy 1406 for selecting time periods for requests.

In this illustrative example, policy 1406 uses at least one of time stamp 1416 for when the request was created or received, text 1418 in request 1338 that identifies date 1420 relative to current date 1422, transaction identifier 1424 corresponding to request 1338, configuration information 1426 for at least one of a client computer system that sent request 1338 or a source of the group of versions 1404 of piece 1326 of information 1304, or some other suitable type of information in information environment 1300 for identifying time period 1340.

Information manager 1316 identifies time stamp 1416. Time stamp 1416 is a date-time of request 1338. Time stamp 1416 is selected from at least one of when request 1338 was created or when request 1338 was received. When policy 1406 uses time stamp 1416 to identify time period 1340, time period 1340 is the time period in the group of time periods 1402 in which time stamp 1416 is useable. A date-time is useable in a time period when the date-time is within the time period. For example, when a time period is between yesterday and tomorrow, yesterday, today, and tomorrow are useable date-times within the time period.

Text 1418 in request 1338 is selected from at least one of latest useable effective date range, effective as of next week, effective as of next month, effective as of next quarter, effective as of next calendar year, or some other suitable text for identifying a date relative to current date 1422. Current date 1422 is the current system date of at least one of a client computer system that sent request 1338, a source of versions 1404 of piece 1326 of information 1304, computer system 1310, or some other suitable current system date for information environment 1300. The current system date of a computer system is the date currently set for the computer system.

Information manager 1316 identifies date 1420 based on current date 1422 and text 1418. For example, when text 1418 is "effective as of next month" and current date 1422 is Apr. 23, 2015, information manager 1316 sets date 1420 to May 1, 2015. When policy 1406 uses text 1418 to identify time period 1340, time period 1340 is the time period in the group of time periods 1402 in which date 1420 is useable.

In this illustrative example, versions 1404 include transaction identifiers 1428. A transaction identifier is an identifier that points to a group of versions of a group of data objects. For example, the transaction identifier may be alpha numeric text that represents a group of changes to a group of data objects.

Information manager 1316 identifies transaction identifier 1424 in request 1338. When policy 1406 uses transaction identifier 1424 to identify time period 1340, time period 1340 is the time period in time periods 1402 in which a version of piece 1326 in the group of versions 1404 of piece 1326 includes transaction identifier 1424 as an identifier of the transaction that created the version.

As depicted, information manager 1316 identifies configuration information 1426 for at least one of a client computer system that sent request 1338, a source of versions 1404 of piece 1326 of information 1304, or some other suitable computer system or organization in information environment 1300. As depicted, configuration information 1426 selects when policy 1406 uses at least one of time stamp 1416 for when the request was created or received, text 1418 in request 1338 that identifies date 1420 relative to current date 1422, or transaction identifier 1424 corresponding to request 1338 to identify time period 1340.

Figure 15:
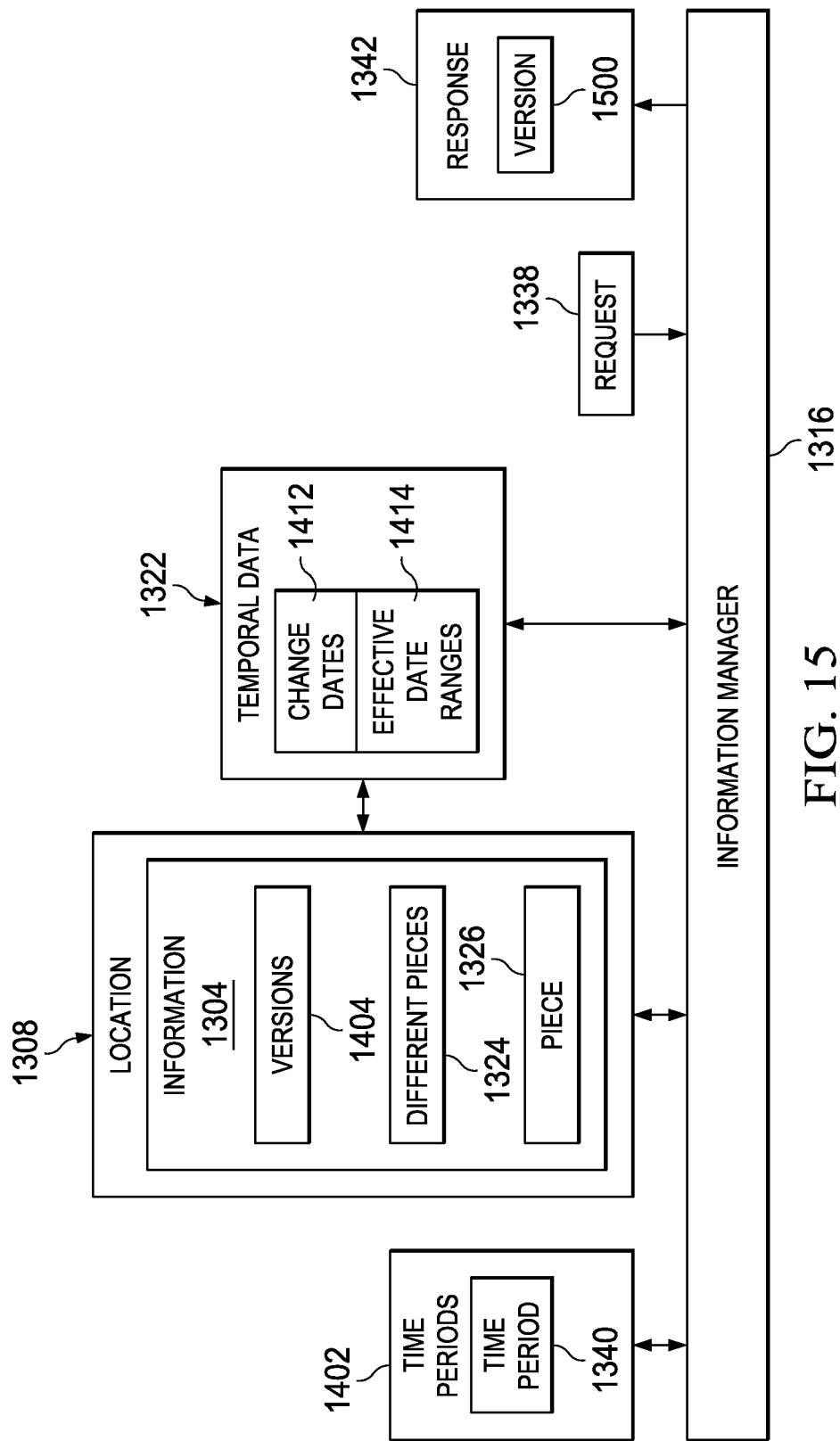
FIG. 15 is an illustration of a block diagram of data flow for identifying a piece of information corresponding to a time period in accordance with an illustrative embodiment.

Turning next to FIG. 15, an illustration of a block diagram of data flow for identifying a piece of information corresponding to a time period is depicted in accordance with an illustrative embodiment. In this figure, an example of data flow for a process for identifying piece 1326 of information 1304 through information manager 1316 is shown. In this illustrative example, information manager 1316 identifies piece 1326 of information 1304 corresponding to request 1338 and corresponding to time period 1340.

As depicted, information manager 1316 identifies version 1500 of piece 1326 from the group of versions 1404 of piece 1326. Version 1500 is the version of piece 1326 that is useable during time period 1340.

Information manager 1316 generates response 1342. In this illustrative example, information manager 1316 includes version 1500 of piece 1326 in response 1342.

Figure 16:
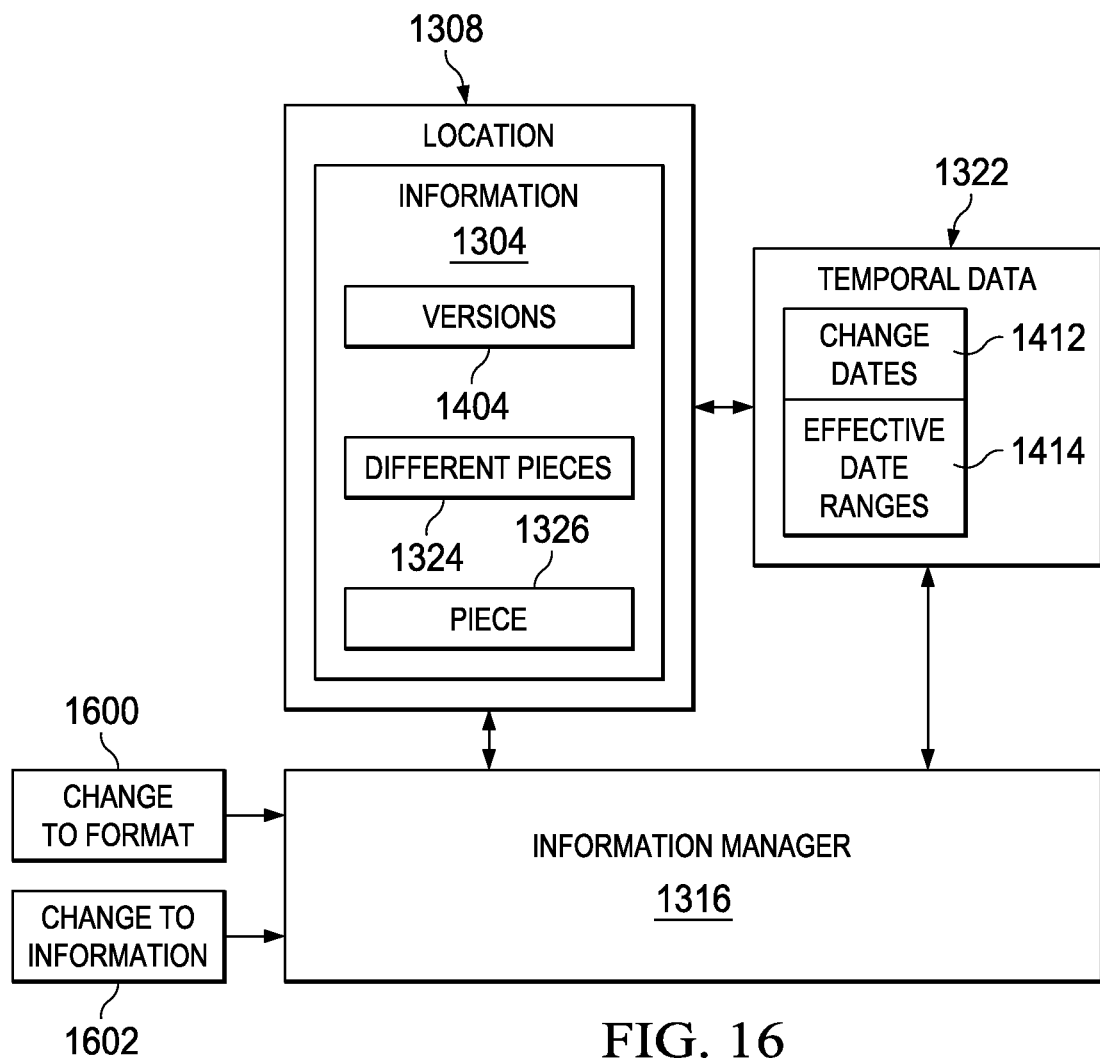
FIG. 16 is an illustration of a block diagram of data flow for identifying a piece of information without temporal data in accordance with an illustrative embodiment.

Turning now to FIG. 16, an illustration of a block diagram of data flow for identifying a piece of information without temporal data is depicted in accordance with an illustrative embodiment. In this figure, an example of data flow for a process for identifying piece 1326 of information 1304 without temporal data 1322 through information manager 1316 is shown.

In this illustrative example, information manager 1316 searches information 1304 for piece 1326 of information 1304 without temporal data 1322. Piece 1326 of information 1304 without temporal data 1322 is a piece of information 1304 in which at least one of a change date is not present in temporal data 1322 for a version of the piece or an effective date range is not present in temporal data 1322 for a version of the piece.

As depicted, information manager 1316 also identifies when change to format 1600 for a piece of information 1304 does not include temporal data 1322 for the change. Information manager 1316 further identifies when change to information 1602 for a piece of information 1304 does not include temporal data 1322 for the change. Information manager 1316 identifies the piece as piece 1326 of information 1304 without temporal data 1322 when these changes do not include temporal data 1322 for the change to the piece of information 104.

Figure 17:
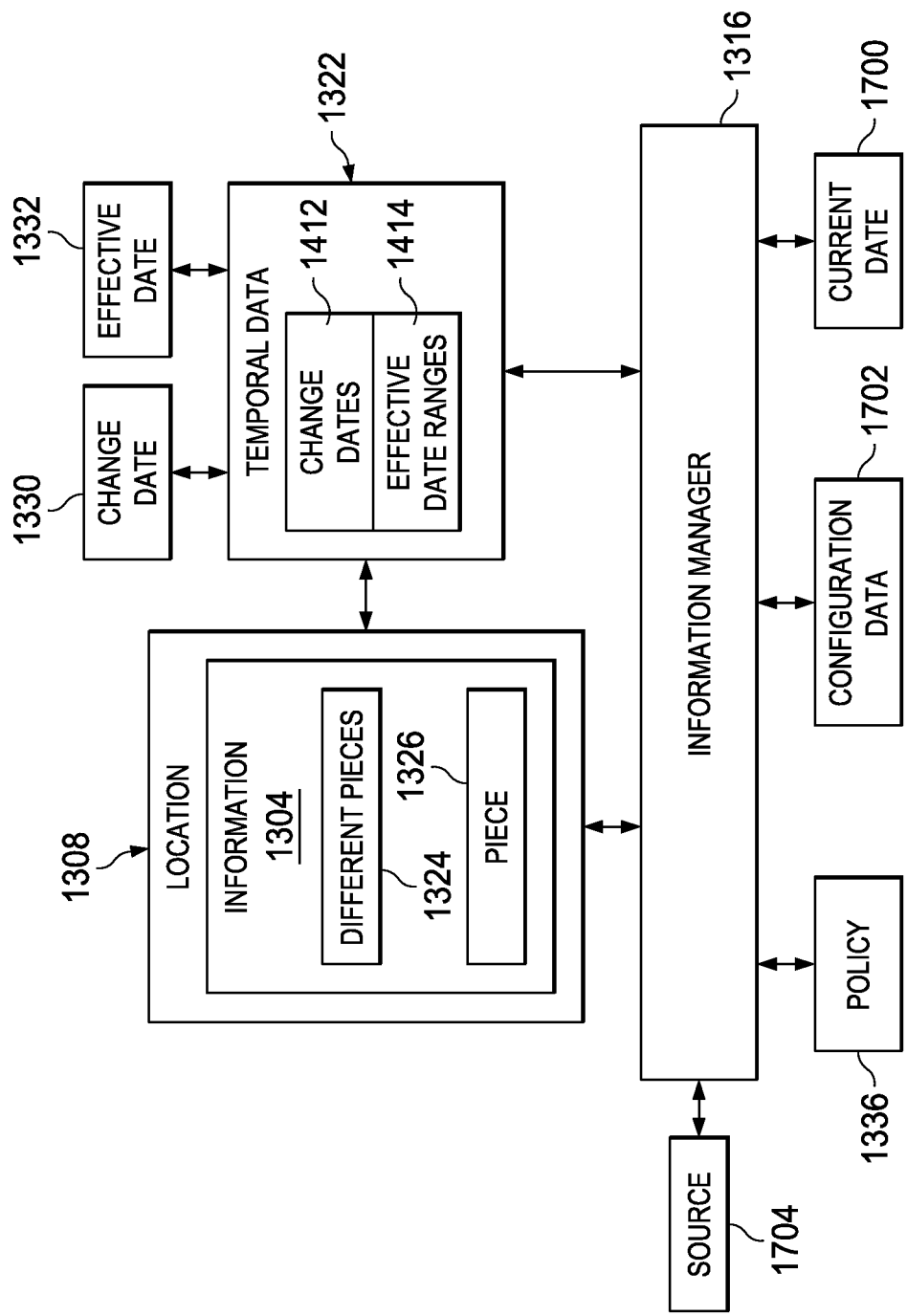
FIG. 17 is an illustration of a block diagram of data flow for identifying temporal data in accordance with an illustrative embodiment.

In FIG. 17, an illustration of a block diagram of data flow for identifying temporal data is depicted in accordance with an illustrative embodiment. In this figure, an example of data flow for a process for identifying temporal data 1322 for piece 1326 of information 1304 through information manager 1316 is shown. In this illustrative example, information manager 1316 identifies temporal data 1322 based on policy 1336.

As disclosed above in FIG. 13, policy 1336 identifies temporal data 1322 for piece 1326 of information 1304. In this illustrative example, policy 1336 uses at least one of current date 1700, configuration data 1702 for source 1704 of piece 1326 of information 1304, or some other suitable type of information in information environment 1300 for identifying temporal data 1322 for piece 1326 of information 1304.

In this illustrative example, current date 1700 is the current system date of at least one of source 1704 of piece 1326 of information 1304, computer system 1310, or some other suitable current system date for information environment 1300. Source 1704 is an example of a source in sources 1312. When policy 1336 uses current date 1700 to identify temporal data 1322, change date 1330 for piece 1326 is set to current date 1700 and effective date 1332 for piece 1326 is also set to current date 1700.

As depicted, configuration data 1702 for source 1704 is program code that identifies temporal data 1322 for piece 1326 of information 1304. In this illustrative example, configuration data 1702 may identify temporal data 1322 for piece 1326 of information 1304 when temporal data 1322 is unavailable from source 1704. When policy 1336 uses configuration data 1702 to identify temporal data 1322, the program code in configuration data 1702 for source 1704 is executed to set current date 1700 and effective date 1332 for piece 1326.

Figure 18:
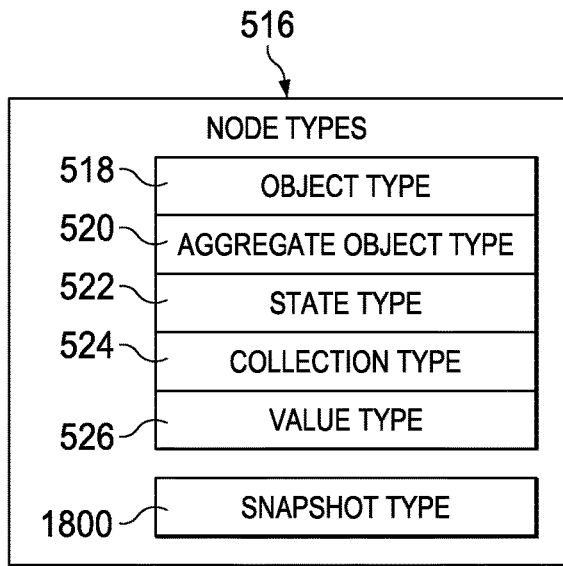
FIG. 18 is an illustration of a block diagram of node types in accordance with an illustrative embodiment.

With reference next to FIG. 18, an illustration of a block diagram of node types is depicted in accordance with an illustrative embodiment. In this illustration, node types 516 include object type 518, aggregate object type 520, state type 522, collection type 524, value type 526, and snapshot type 1800. As disclosed above in FIG. 5, each node type 512 of a node in nodes 502 in graph database 500 is selected from at least one of node types 516 or some other suitable type for representing portions of information as nodes 502 in graph database 500.

Snapshot type 1800 is the node type of nodes in nodes 502 in which versions of different pieces 1324 of information 1304 are stored in graph database 500. A snapshot is a version of an object that is located in a database.

As another illustrative example, when multiple versions are present for piece 1326 of information 1304, multiple snapshots contained in the object correspond to the multiple versions of piece 1326. In this example, each version of piece 1326 is contained in a snapshot that represents the version of piece 1326 of information 1304.

For example, when piece 1326 of information 1304 includes a name formed by a first name and a last name, the name is an object with the first name and the last name. In this example, the name may be a first version of the name for a first snapshot. If the name is changed, a second version of the name may be stored as a second version of the name for a second snapshot.

As another illustrative example, when piece 1326 of information 1304 includes a customer list with names and contact information, the customer list is an object that includes a list of names and contact information. In this example, the contact information is also an object. When the contact information is changed for a customer in the customer list, a first snapshot may be created for the original contact information and a second snapshot may be created for the changed contact information.

Figure 19:
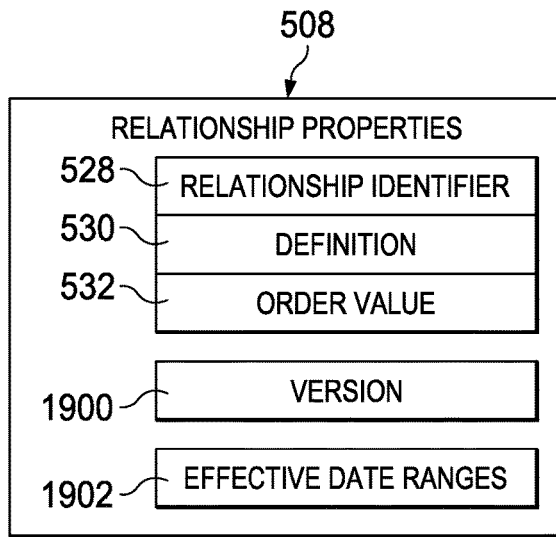
FIG. 19 is an illustration of a block diagram of relationship properties in accordance with an illustrative embodiment.

With reference now to FIG. 19, an illustration of a block diagram of relationship properties is depicted in accordance with an illustrative embodiment. In this illustration, relationship properties 508 include relationship identifier 528, definition 530, order value 532, version 1900, and effective date ranges 1902. As disclosed above in FIG. 5, relationship properties 508 are the properties of relationships 504 in graph database 500.

As depicted, version 1900 is a value specifying the version of a snapshot of an object. The value specifying the version of the snapshot is at least one of a number, an alphanumeric sequence of characters, or some other suitable value that indicates the order in a sequence of snapshots contained in an object. As another example, when piece 1326 of information 1304 has two versions, version 1900 for the first version may specify a value of "1" and version 1900 for the second version may specify a value of "2."

In this illustrative example, effective date ranges 1902 are dates specifying at least one of when pieces of information are useable or when pieces of information are unusable. For example, when piece 1326 of information 1304 has two versions, effective date ranges 1902 for the first version may specify a first range of dates for when the first version is useable, and effective date ranges 1902 for the second version may specify a second range of dates for when the second version is useable.

Figure 20:
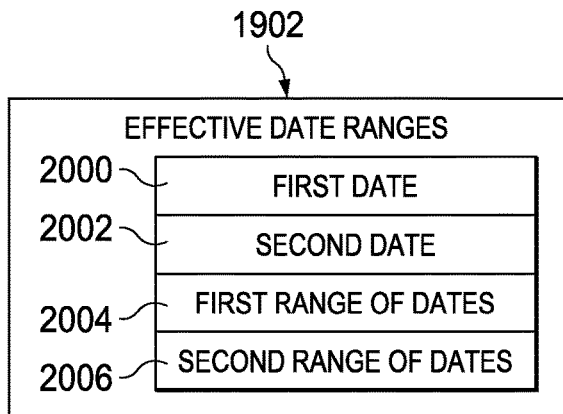
FIG. 20 is an illustration of a block diagram of effective date ranges in accordance with an illustrative embodiment.

Turning to FIG. 20, an illustration of a block diagram of effective date ranges is depicted in accordance with an illustrative embodiment. In this illustration, a number of properties of effective date ranges 1902 that specify when pieces of information are useable are shown. In this illustrative example, effective date ranges 1902 include first date 2000 indicating when a piece of information becomes useable, second date 2002 indicating when the piece of information becomes unusable, first range of dates 2004 during which the information is useable, and second range of dates 2006 during which the information is unusable.

Figure 21:
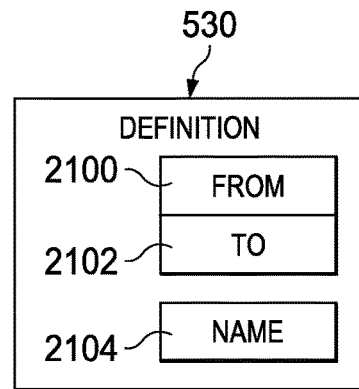
FIG. 21 is an illustration of a block diagram of a definition in accordance with an illustrative embodiment.

Turning next to FIG. 21, an illustration of a block diagram of a definition is depicted in accordance with an illustrative embodiment. In this illustration, a number of properties of definition 530 are shown. As discussed above in the description of FIG. 5, definition 530 defines the relationship between two nodes in graph database 500.

In this illustrative example, definition 530 includes from 2100, to 2102, and name 2104. From 2100 is a pointer to a first node from which a relationship is defined. To 2102 is a pointer to a second node for which the relationship is defined. Name 2104 is the name of the second node. For example, when to 2102 points to a node that represents a "legal name," name 2104 is "legal name."

Figure 22:
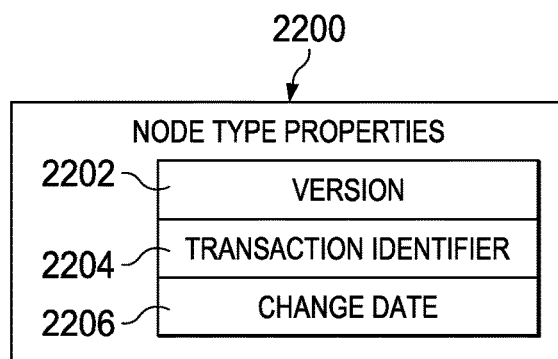
FIG. 22 is an illustration of a block diagram of node type properties for a snapshot in accordance with an illustrative embodiment.

Turning now to FIG. 22, an illustration of a block diagram of node type properties for a snapshot is depicted in accordance with an illustrative embodiment. In this illustrative example, node type properties 2200 are an example of node type properties 514 in node properties 506 in FIG. 5. In this illustration, node type properties 2200 are for a node in nodes 502 that represents a snapshot of an object.

As depicted, node type properties 2200 include version 2202, transaction identifier 2204, and change date 2206. In this illustrative example, version 2202 is a value specifying the version of the snapshot. Transaction identifier 2204 is a pointer to a change for which the snapshot was created. For example, transaction identifier 2204 may point to change to information 1602. In this illustrative example, change date 2206 is the change date for the snapshot.

The illustrations of information environment 1300 and the different components in information environment 1300 in FIGS. 13-22 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, temporal data 1322 may be associated with all of information 1304 or temporal data 1322 may be associated only with some of information 1304. In one illustrative example, a first piece of information 1304 may not be associated with temporal data 1322, while a second piece of information 1304 may be associated with temporal data 1322. In this manner, performing an operation may be made easier when the operation is identified using information that has been identified, analyzed, or both identified and analyzed using temporal data.

In the illustrative example, information manager 1316 is described as managing information 1304 and temporal data 1322. In different illustrative examples, information manager 1316 may also perform functions as described for information manager 130 in FIG. 1. For example, information manager 1316 may also facilitate the control of information 1304 by sources 1312. For example, information manager 1316 may determine which ones of sources 1312 may make changes to different ones of portions of information 1304.

Figure 23:
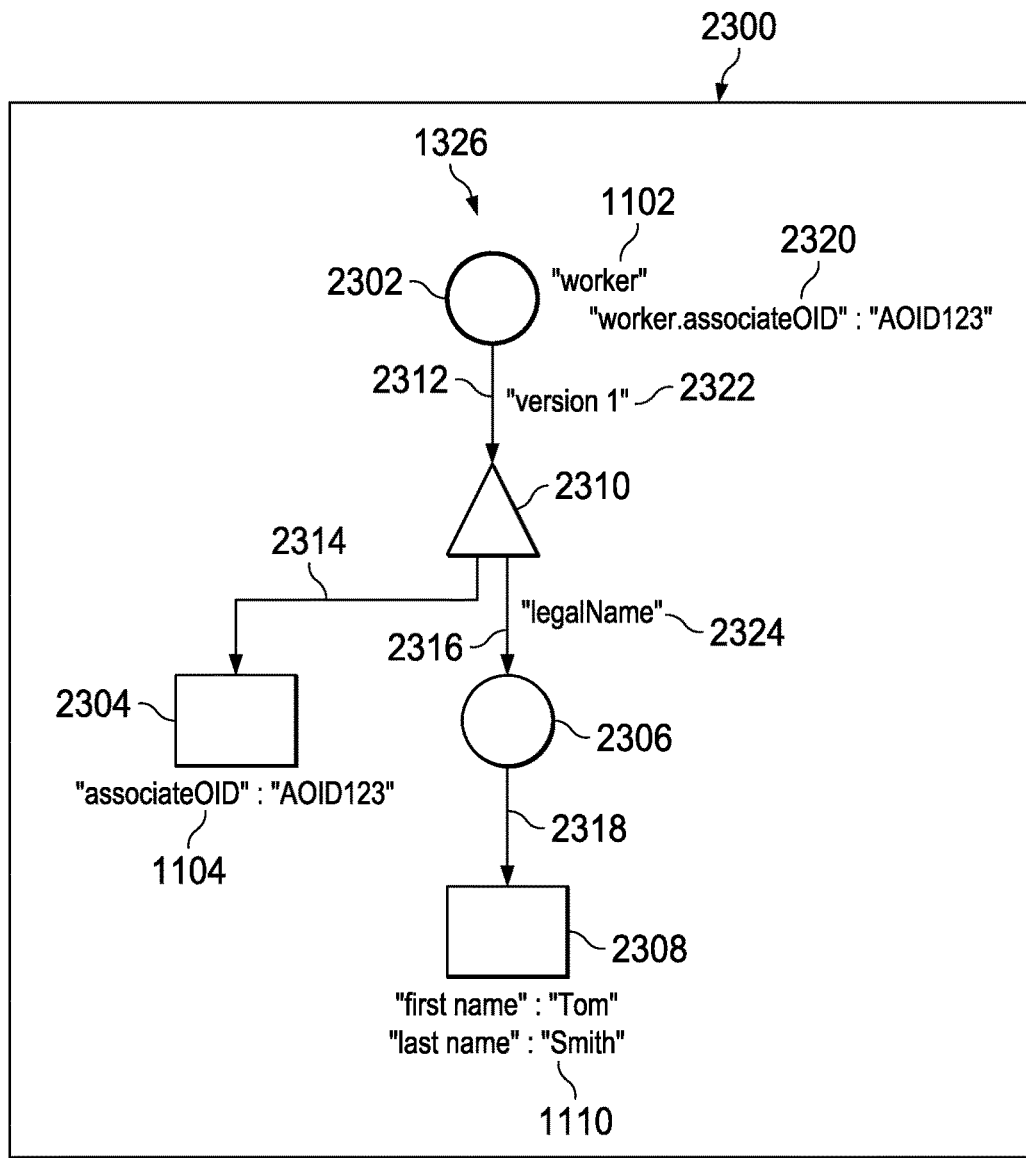
FIG. 23 is an illustration of a graph of information in accordance with an illustrative embodiment.

With reference to FIG. 23, an illustration of a graph of information is depicted in accordance with an illustrative embodiment. In this illustration, graph 2300 shows nodes 502 and relationships 504 of graph database 500 in FIG. 5. In particular, graph 2300 shows where information manager 1316 stores piece 1326 of information 1304 in graph database 500. In this illustrative example, piece 1326 includes information 104 from portion 1100 in FIG. 11.

As depicted, nodes 502 in graph 2300 include aggregate object 2302, state 2304, object 2306, state 2308, and snapshot 2310. Aggregate object 2302 is the node in graph database 500 where versions of piece 1326 are stored. In this illustrative example, piece 1326 is object 1102 from portion 1100. Snapshot 2310 is where version 1 of object 1102 is stored. In this illustrative example, version 1 of object 1102 includes information 1304 from portion 1100. State 2304 is where named value 1104 is stored. Object 2306 is where object 1106 is stored. State 2308 is where named values 1110 are stored.

In this illustrative example, relationships 504 in graph 2300 include relationship 2312 between aggregate object 2302 and snapshot 2310; relationship 2314 between snapshot 2310 and state 2304; relationship 2316 between snapshot 2310 and object 2306; and relationship 2318 between object 2306 and state 2308.

Aggregate object 2302 includes key 2320. Key 2320 is an example of key 706 in node type properties 700 in FIG. 7.

In this illustrated example, key 2320 is a named value. Key 2320 indicates "worker.associateOID" has the value "AOID123."

As depicted, relationship 2312 has version 2322. Version 2322 is an example of version 1900 in relationship properties 508 in FIG. 19. In this illustrative example, version 2322 in relationship 2312 indicates snapshot 2310 is the first snapshot for aggregate object 2302.

In this illustrative example, relationship 2316 has name 2324. Name 2324 is an example of name 2104 in definition 530 in FIG. 21.

Figure 24:
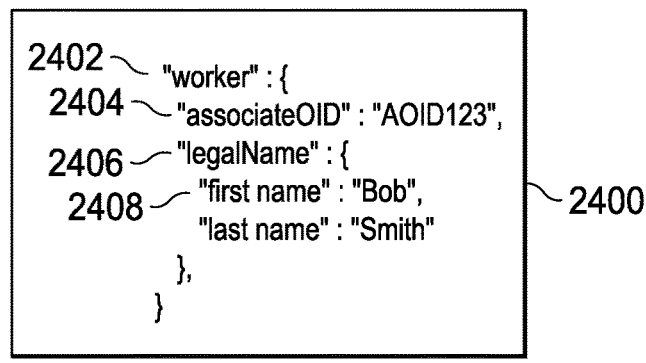
FIG. 24 is an illustration of a change to a portion of information in accordance with an illustrative embodiment.

With reference next to FIG. 24, an illustration of a change to a portion of information is depicted in accordance with an illustrative embodiment. In this illustration, change to information 2400 is an example of change to information 1602 in FIG. 16. As depicted, change to information 2400 is shown in text using JavaScript object notation. In particular, this figure shows text for an example of changing a legal name of a worker to "Bob Smith."

In this illustrative example, change to information 2400 includes object 2402. Object 2402 has the name "worker." Object 2402 includes named value 2404 and object 2406. Named value 2404 indicates "associateOID" has the value "AOID123."

As depicted, object 2406 has the name "legalName." Object 2406 includes named values 2408. Named values 2408 indicate "first name" has the value "Bob" and "last name" has the value "Smith."

Figure 25:
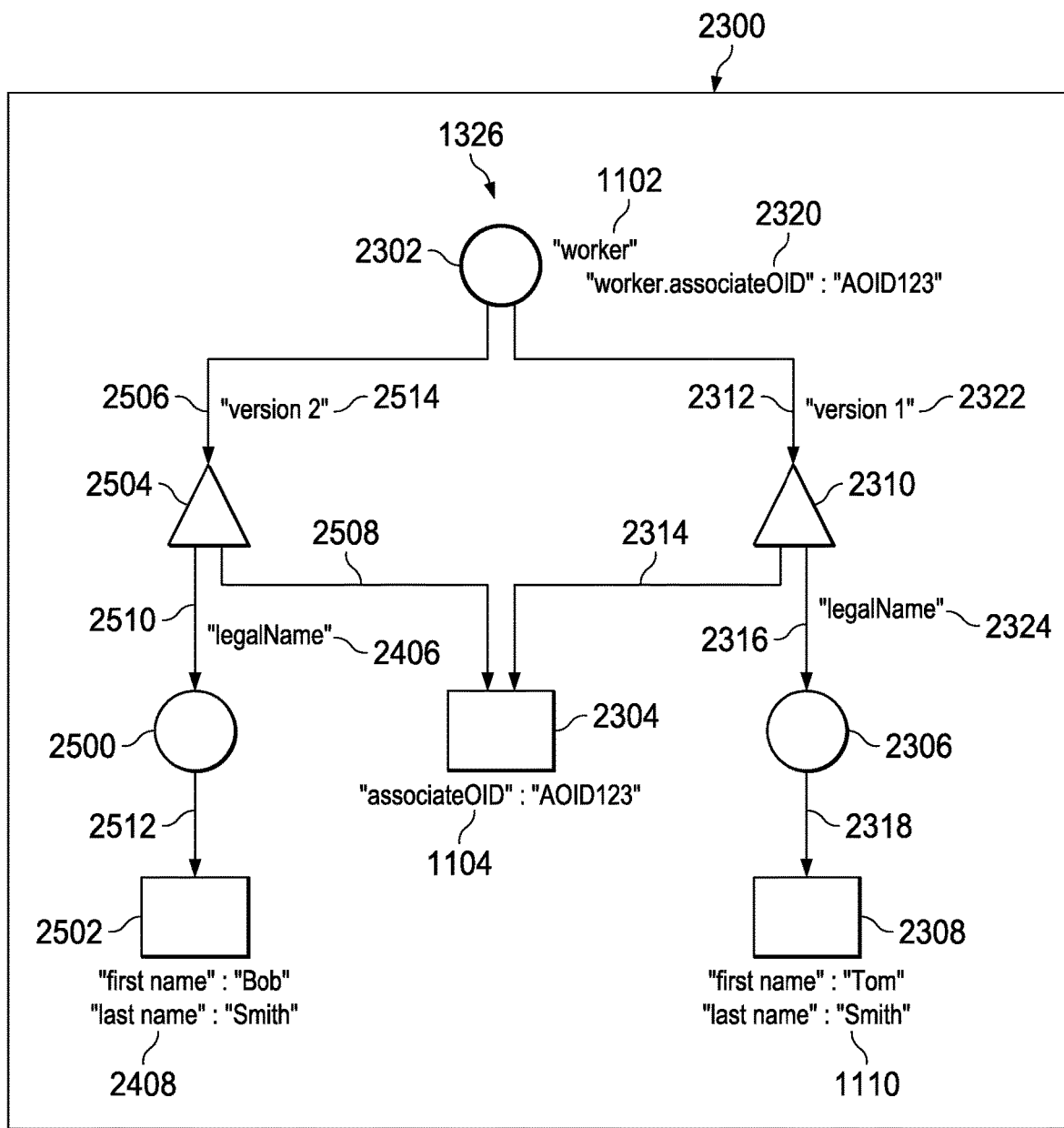
FIG. 25 is an illustration of a graph of information after a change to the information in accordance with an illustrative embodiment.

With reference now to FIG. 25, an illustration of a graph of information after a change to the information is depicted in accordance with an illustrative embodiment. In this illustration, graph 2300 shows nodes 502 and relationships 504 of graph database 500 in FIG. 5.

In this illustrative example, information manager 1316 has added change to information 2400 to graph 2300. In this illustrative example, version 2 of piece 1326 is from change to information 2400 in FIG. 24.

As depicted, nodes 502 in graph 2300 representing change to information 2400 include object 2500, state 2502, and snapshot 2504. Snapshot 2504 is where version 2 of object 1102 is stored. Object 2500 is where object 2406 is stored. State 2502 is where named values 2408 are stored.

In this illustrative example, relationships 504 in graph 2300 representing change to information 2400 include relationship 2506 between aggregate object 2302 and snapshot 2504; relationship 2508 between snapshot 2504 and state 2304; relationship 2510 between snapshot 2504 and object 2500; and relationship 2512 between object 2500 and state 2502. As depicted, relationship 2506 has version 2514. Version 2514 is an example of version 1900 in relationship properties 508 in FIG. 19. In this illustrative example, version 2514 in relationship 2506 indicates snapshot 2504 is the second snapshot for aggregate object 2302.

Figure 26:
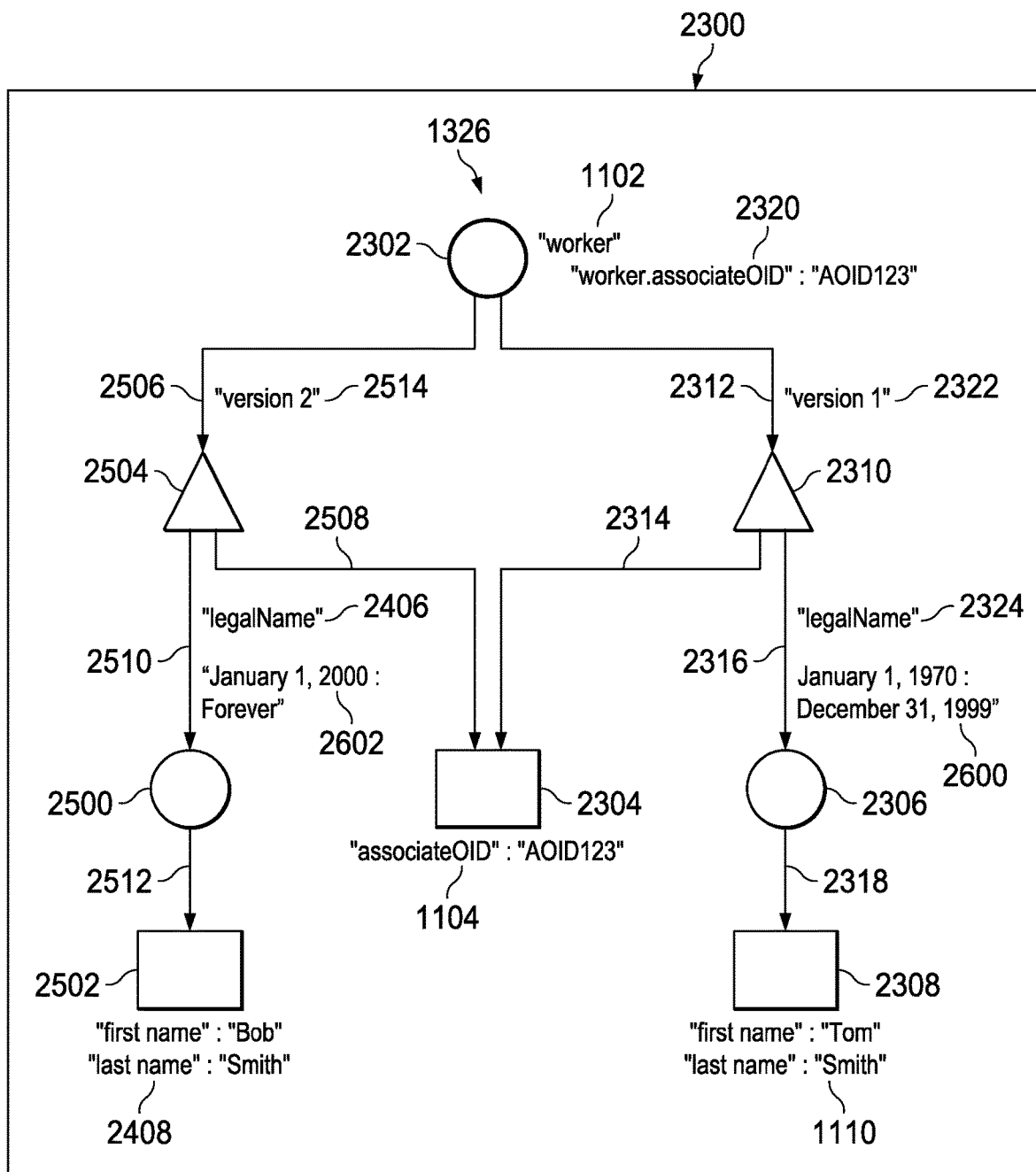
FIG. 26 is an illustration of a graph of information after a change to the information in accordance with an illustrative embodiment.

In FIG. 26, an illustration of a graph of information after a change to the information is depicted in accordance with an illustrative embodiment. In this illustration, examples of effective date ranges 1902 for a group of snapshots of aggregate object 2302 in graph 2300 are shown.

As depicted, range of dates 2600 for snapshot 2310 and range of dates 2602 for snapshot 2504 are examples of effective date ranges 1902 in FIG. 19. In this illustrative example, range of dates 2600 is between "Jan. 1, 1970" and "Dec. 31, 1999" and range of dates 2602 is between "Jan. 1, 2000" and "Forever." In this illustrative example, aggregate object 2302 has the first version of the legal name with first name Tom and last name Smith between the years 1970 and 1999 and the second version of the legal name with first name Bob and second name Smith from Jan. 1, 2000 to forever.

The illustration of graph 2300 in FIGS. 23, 25, and 26 does not limit the objects that can be in graph 2300. For example, additional information may also be shown in the graph as additional objects. As another example, some objects in graph 2300 may be omitted depending on information 1304. Further, graph 2300 may also be displayed in at least one of a graph or a table in a graphical user interface on a display of a computer system in information environment 1300.

The examples provided for data objects are not exhaustive. Additional examples may also work in addition to or in place of the ones provided. These examples may also be omitted depending on the implementation. For example, in FIG. 26 where piece 1326 of information 1304 has two versions, piece 1326 may also only have at least one of no versions, three versions, 10 versions, or any other suitable number of versions.

The illustrative embodiments also recognize and take into account that although source 124 in FIG. 1 may control formats 116 for portion 126 through information manager 130, different customers at client computer systems 134 may not want the format provided by source 124. In other words, the customers may want different formats for information 104 in portion 126 controlled by source 124. For example, two customers may want a different format for the same piece of information in portion 126.

The illustrative embodiments recognize and take into account that multiple versions of the piece of information in portion 126 may be created. Those embodiments also recognize and take into account that maintenance of multiple versions of information may use more resources and may be more complex than desired.

As used herein, versions of a piece of information are copies of the piece of information. Each of the versions may have changes from the original piece of information. For example, a first version may have a different format from a second version of the piece of information. In yet another example, a first version may have less information than a second version of the piece of information. In another example, one version may include less of the information in the piece of information than another version of the piece of information.

Thus, the illustrative embodiments provide a method and apparatus for accessing information in which multiple versions may be present. As mentioned above, accessing includes at least one of writing, reading, changing, or otherwise manipulating information.

In one illustrative example, a method is present for accessing information. A request is received for a piece of information from a client computer system. A branch for the piece of information is identified using an identifier in the request. The branch is part of branches in a hierarchical structure, and the branches are versions of the piece of information. A response is sent to the client computer system. The response includes the piece of information with a set of changes made to the branch by a transaction for the piece of information at a time period for the request.

As used herein, a "set of," when used with reference to items, means zero or more items. In other words, the set of items may be a null set in which items are not present. For example, a set of changes is zero or more changes.

Figure 27:
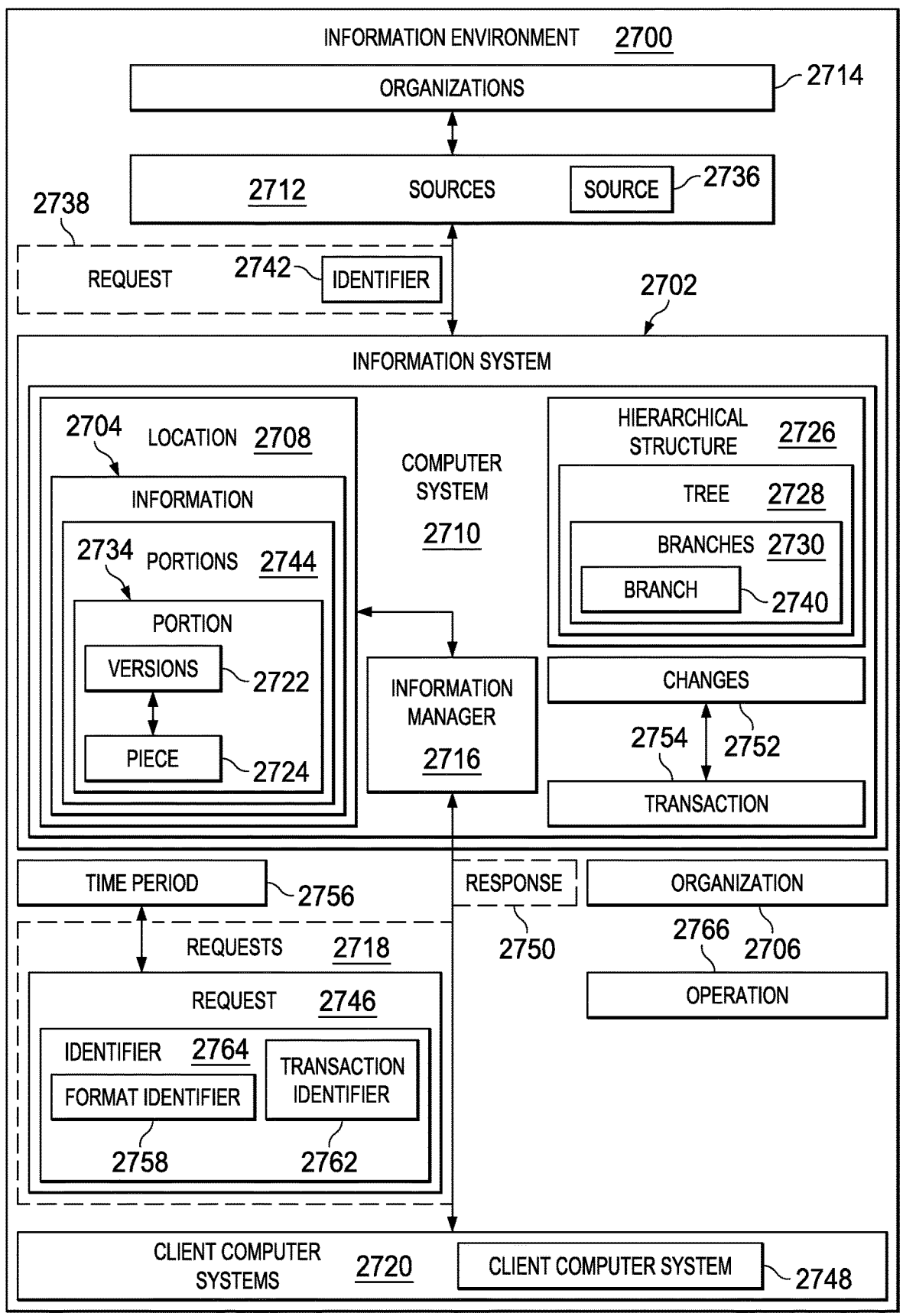
FIG. 27 is an illustration of a block diagram of an information environment in accordance with an illustrative embodiment.

With reference now to FIG. 27, an illustration of a block diagram of an information environment is depicted in accordance with an illustrative embodiment. In this illustrative example, information environment 2700 includes information system 2702. As depicted, information system 2702 manages information 2704 about organization 2706.

As depicted, information 2704 is stored in location 2708 in computer system 2710. Computer system 2710 is a hardware system that includes one or more data processing systems. In this illustrative example, information 2704 is stored in one or more data processing systems in location 2708 in computer system 2710. Information 2704 may be stored in one or more databases or other storage architectures in the one or more data processing systems in location 2708.

In this illustrative example, information system 2702 receives information 2704 from a group of sources 2712. As depicted, sources 2712 are organizations 2714 that send information 2704 to location 2708 in computer system 2710. A portion of sources 2712 may be controlled by organization 2706 or may be controlled by organizations 2714.

In this illustrative example, information manager 2716 may be implemented in software, hardware, firmware, or a combination thereof, and may manage information 2704 in location 2708. For example, information manager 2716 handles receiving and storing information 2704 received from sources 2712. Further, information manager 2716 also handles processing requests 2718 for information 2704 received from client computer systems 2720.

In this illustrative example, the usability of information 2704 is enhanced in information system 2702. In this particular example, versions 2722 of information 2704 may be present in information system 2702 in location 2708.

For example, versions 2722 are present for piece 2724 of information 2704. Versions 2722 are organized in hierarchical structure 2726.

In this example, hierarchical structure 2726 takes the form of tree 2728 having branches 2730. Branches 2730 are versions 2722 of piece 2724 of information 2704. In other words, each branch represents a version of piece 2724 of information 2704.

In the illustrative example, information manager 2716 provides sources 2712 access to information 2704. In this example, sources 2712 control portions 2744 of information 2704 in a similar manner as described with respect to sources 112 in FIG. 1.

Piece 2724 of information 2704 is located in portion 2734 of information 2704 controlled by source 2736 in sources 2712. Sources 2712 control portions 2744 of information 2704 in location 2708. Information manager 2716 receives request 2738 from source 2736 to change piece 2724 of information 2704.

As depicted, information manager 2716 identifies branch 2740 in branches 2730 for piece 2724 of information 2704 using identifier 2742 in request 2738. Branch 2740 is part of branches 2730 in hierarchical structure 2726. In this example, branches 2730 are versions 2722 of piece 2724 of information 2704 in which identifier 2742 identifies branch 2740.

In this example, information manager 2716 changes branch 2740 when request 2738 is from source 2736 that controls portion 2734 of information 2704 in which branches 2730 for piece 2724 of information 2704 are located in location 2708 and source 2736 is part of sources 2712 that control portions 2744 of information 2704 in the location 2708. In other words, information manager 2716 may limit access to change piece 2724 of information 2704 in source 2736. Other ones of sources 2712 that are not assigned to control portion 2734 are unable to make changes to piece 2732 of information 2704.

Additionally, information manager 2716 provides access to information 2704 to client computer systems 2720. This access may include returning different ones of branches 2730 to client computer systems 2720. For example, information manager 2716 may receive request 2746 for piece 2724 of information 2704 from client computer system 2748 in client computer systems 2720.

Information manager 2716 identifies branch 2740 for piece 2724 of information 2704 using identifier 2764 in request 2746. As depicted, branch 2740 is part of branches 2730 in hierarchical structure 2726. In this example, branches 2730 are versions 2722 of piece 2724 of information 2704.

Identifier 2764 may take a number of different forms. In one example, identifier 2764 is format identifier 2758 and identifies a desired format for piece 2724 of information 2704. Information manager 2716 identifies branch 2740 as the branch in branches 2730 that has the desired format. In another example, identifier 2764 is transaction identifier 2762 and identifies transaction 2754 for a group of changes to piece 2724 of information 2704.

In the illustrative example, information manager 2716 sends response 2750 to client computer system 2748. Response 2750 includes piece 2724 of information 2704 with a set of changes 2752 made to branch 2740 by transaction 2754 for piece 2724 of information 2704 at time period 2756 for request 2746.

As a result, piece 2724 of information 2704 may be processed by client computer system 2748 to identify operation 2766. Operation 2766 may be for organization 2706 or for some other purpose. As depicted, operation 2766 may be, for example, hiring, benefits administration, research, forming a team, performing performance evaluations, manufacturing a product, or some other suitable type of operation.

Thus, the illustrative example provides one or more technical solutions that overcome the technical problem of managing different versions of information in an information system. Information manager 2716 organizes versions 2722 of information 2704 in hierarchical structure 2726. For example, versions 2722 of piece 2724 of information 2704 are organized as branches 2730 as part of tree 2728 in hierarchical structure 2726. With information manager 2716 using versions 2722 of information 2704 in hierarchical structure 2726, obtaining a desired version in versions 2722 of information 2704 organized in branches 2730 may be easier as compared to currently used systems.

Also, managing branches 2730 by sources 2712 is made easier by information manager 2716 as compared to currently available systems. More uniformity is provided by assigning sources 2712 to control portions 2744 of information 2704.

Furthermore, computer system 2710 operates as a special purpose computer system in which information manager 2716 in computer system 2710 enables easier access to information 2704 by client computer systems 2720. The easier access occurs in one illustrative example through assigning control of portions 2744 of information 2704 to particular ones of sources 2712, and organizing versions 2722 of information 2704 as branches 2730 in hierarchical structure 2726. In particular, information manager 2716 transforms computer system 2710 into a special purpose computer system as compared to currently available general computer systems that do not have information manager 2716.

Computer system 2710 in location 2708 performs a transformation of information 2704. For example, computer system 2710 aggregates information 2704 from sources 2712 into location 2708. As depicted, location 2708 is located between sources 2712 and the consumers of information 2704, client computer systems 2720. In this example, client computer systems 2720 may access information 2704 more easily from location 2708 knowing at least one of formats 116 in FIG. 1, versions 2722, or other information about piece 2724 of information 2704 in branches 2730.

Further, information 2704 is in a form for storage as branches 2730 in hierarchical structure 2726. Information 2704 in this form may be placed into a form that is sent to client computer systems 2720.

Figure 28:
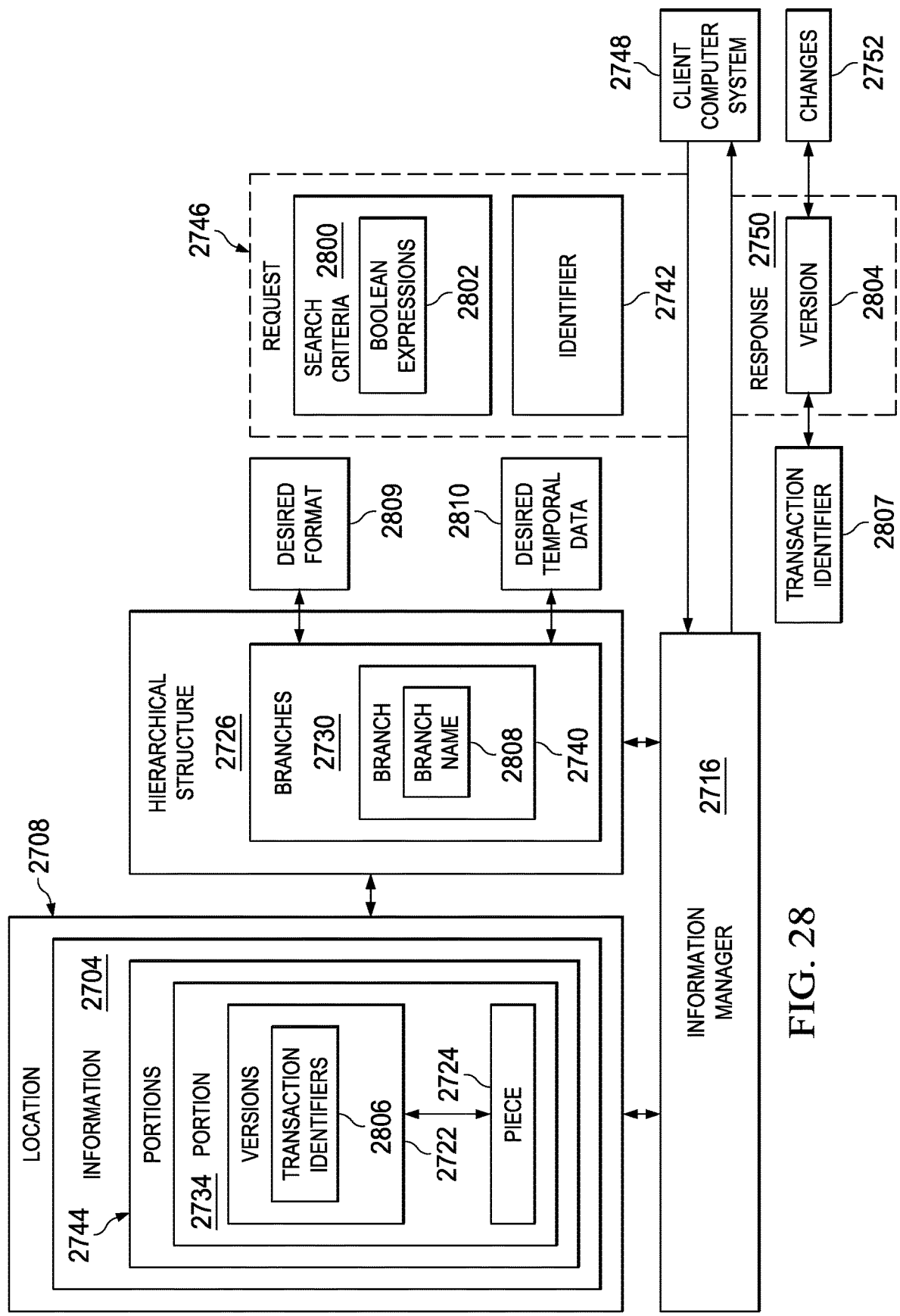
FIG. 28 is an illustration of a block diagram of data flow for providing access to information in accordance with an illustrative embodiment.

Turning to FIG. 28, an illustration of a block diagram of data flow for providing access to information is depicted in accordance with an illustrative embodiment. In this figure, an example of data flow for a process for processing request 2746 for piece 2724 of information 2704 from client computer system 2748 through information manager 2716 is shown.

As depicted, information manager 2716 receives request 2746 for piece 2724 of information 2704 from client computer system 2748. In this illustrative example, request 2746 includes search criteria 2800 and identifier 2742.

Information manager 2716 identifies branch 2740 for version 2804 of piece 2724 of information 2704 using search criteria 2800 and identifier 2742 in request 2746. Information manager 2716 uses search criteria 2800 to identify piece 2724 of information 2704. Information manager 2716 uses identifier 2742 to identify a version in versions 2722 of piece 2724 of information 2704.

Search criteria 2800 is similar to search criteria 206 in FIG. 2. Search criteria 2800 includes a group of boolean expressions 2802. The group of boolean expressions 2802 is an example of the group of boolean expressions 207 in FIG. 2. Information manager 2716 identifies piece 2724 of information 2704 in location 2708 based on the group of boolean expressions 2802 in search criteria 2800.

For example, search criteria 2800 may include a boolean expression indicating the name value pair "worker.associateOID": "AOI2423." In this example, search criteria 2800 is a request for piece 2724 of information 2704 indicated by a name value pair with the name "worker.associateOID" and a value that matches the text "AOI2423."

In this illustrative example, information 2704 includes versions 2722 of piece 2724 of information 2704. As depicted, versions 2722 include transaction identifiers 2806. Transaction identifiers 2806 identify the transaction in which versions 2722 are created. Branch 2740 is version 2804 in versions 2722 of piece 2724 of information 2704, in this illustrative example. Branch 2740 was created by transaction 2754 in FIG. 27. As depicted, transaction identifier 2807 is a pointer to transaction 2754.

As depicted, identifier 2742 in request 2746 is selected from at least one of transaction identifier 2807, desired temporal data 2810 for branch 2740, or branch name 2808 of branch 2740. Branch name 2808 is a name of branch 2740 in branches 2730. The names of branches 2730 are pointers to branches 2730 in hierarchical structure 2726. Branch name 2808 identifies branch 2740 in hierarchical structure 2726.

For example, branch name 2808 identifies branch 2740 as a name of branch 2740 or pointing to branch 2740. Branch name 2808 is selected from at least one of an alphanumeric string, a universal resource locator, or some other suitable type of name for identifying branch 2740 in hierarchical structure 2726.

Information manager 2716 identifies branch 2740 by matching identifier 2742 to branch name 2808 when identifier 2742 is branch name 2808. For example, branch name 2808 may be "branch1" or some other suitable alphanumeric text for branch 2740 of piece 2724 of information 2704. As another example, branch name 2808 may be selected from at least one of "worker.associateOID.formatB" or "formatB." Branch name 2808 of branch 2740 for piece 2724 is "formatB" in this illustrative example.

As still another example, when piece 2724 of information 2704 is an image, branch name 2808 may be selected from at least one of "image style A" or "image style B." In this example, these branches identify different versions of the image for piece 2724.

As a further example, branch name 2808 may be selected from at least one of a number of different plans of organization 2706. In this example, each of the different plans may result in at least one of different effective dates for piece 2724 of information 2704, different information in piece 2724 of information 2704, or different formats for piece 2724 of information 2704. For example, branch 2740 may have the name "planA" and another branch in branches 2730 may have the name "planB."

As depicted, branch 2740 is the branch in branches 2730 that has desired format 2809 for request 2746. Another version of piece 2724 in versions 2722 may have a format that is different than desired format 2809 of piece 2724 in version 2804 for branch 2740. In other words, versions 2722 may include versions that are not in desired format 2809.

In this illustrative example, when identifier 2742 is a branch name that indicates desired format 2809, identifier 2742 is an example of format identifier 2758 in FIG. 27. When identifier 2742 is a transaction identifier, identifier 2742 is an example of transaction identifier 2762 in FIG. 27.

As depicted, information manager 2716 identifies version 2804 of piece 2724 in versions 2722 by matching identifier 2742 to at least one of change date of version 2804 or effective date range of version 2804 when identifier 2742 is desired temporal data 2810 for branch 2740. Identifying version 2804 using desired temporal data 2810 selects branch 2740 for piece 2724 of information 2704.

Information manager 2716 identifies version 2804 of piece 2724 in versions 2722 by matching identifier 2742 to transaction identifier 2807 in transaction identifiers 2806 for versions 2722 when identifier 2742 is transaction identifier 2807. As depicted, identifying version 2804 using transaction identifier 2807 selects branch 2740 for piece 2724 of information 2704.

As depicted, information manager 2716 generates response 2750. In this illustrative example, information manager 2716 includes version 2804 of piece 2724 in response 2750. Information manager 2716 then sends response 2750 to client computer system 2748.

As depicted, version 2804 includes the set of changes 2752 made to branch 2740 by transaction 2754 for piece 2724 of information 2704. For example, the set of changes 2752 may include changes made during at least one of time period 2756 for request 2746 or a time period before time period 2756 for request 2746.

Figure 29:
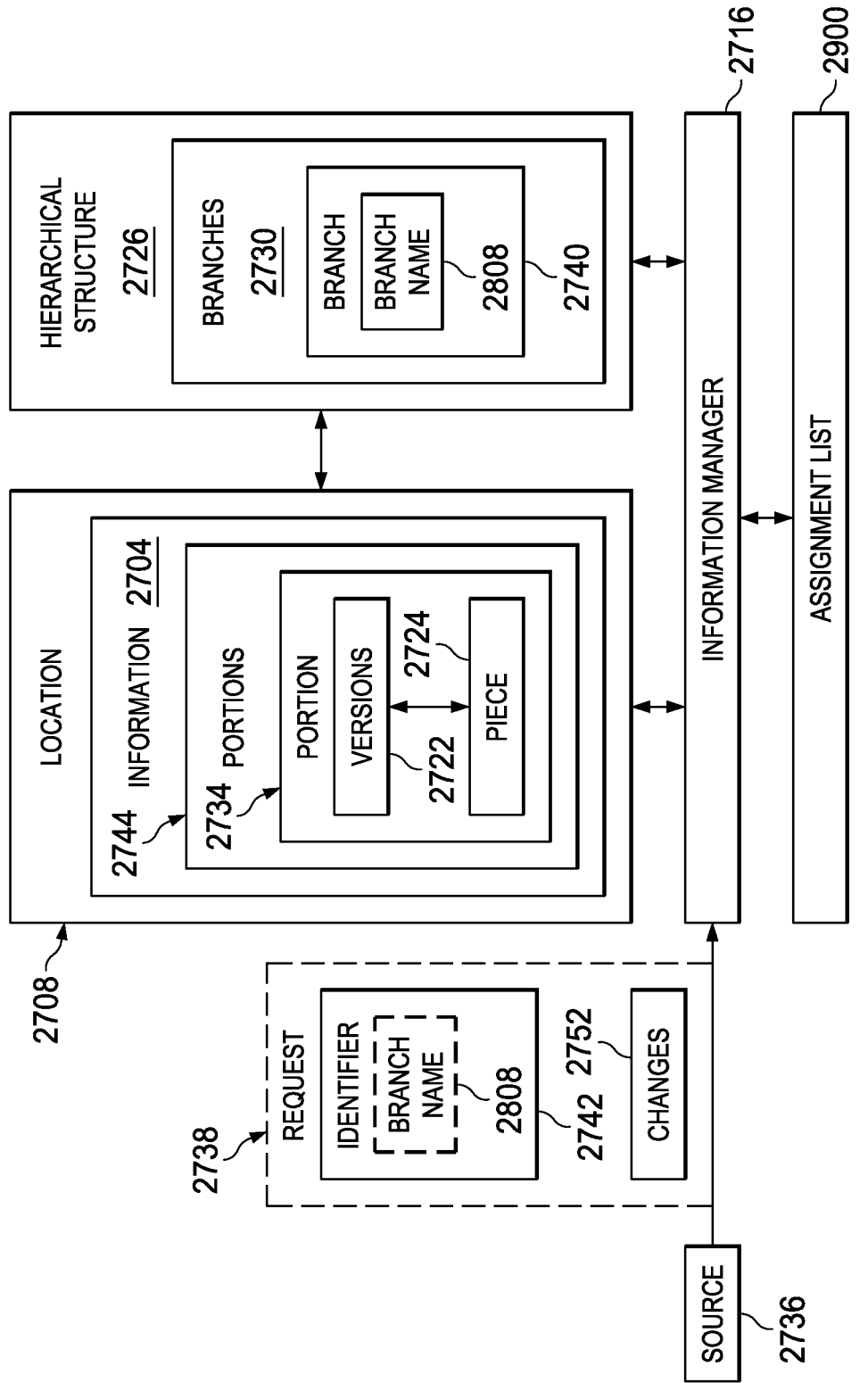
FIG. 29 is an illustration of a block diagram of data flow for providing access to information in accordance with an illustrative embodiment.

Turning next to FIG. 29, an illustration of a block diagram of data flow for providing access to information is depicted in accordance with an illustrative embodiment. In this figure, an example of data flow for a process for processing request 2738 from source 2736 to change piece 2724 of information 2704 through information manager 2716 is shown.

As depicted, information manager 2716 receives request 2738 to change piece 2724 of information 2704 from source 2736. In this illustrative example, request 2738 includes identifier 2742 and the set of changes 2752 for piece 2724 of information 2704. The set of changes 2752 for piece 2724 of information 2704 is at least one of a change to a format of piece 2724 or a change to information 2704 for piece 2724.

Information manager 2716 compares source 2736 to assignment list 2900 for portions 2744. Information manager 2716 determines whether source 2736 is allowed to change portion 2734 based on the comparison.

In this illustrative example, identifier 2742 includes branch name 2808 of branch 2740. Branch name 2808 may indicate the name of a branch in branches 2730 that is a parent of branch 2740. A parent of a branch is the branch from which the branch is created. For example, when branch name 2808 is "formatB\revision1," the branch name of the parent of branch 2740 is "formatB."

Information manager 2716 determines whether branch 2740 with branch name 2808 is already in branches 2730 in hierarchical structure 2726. For example, when branch 2740 is already in branches 2730, information manager 2716 identifies branch 2740 in branches 2730 by identifying which branch in branches 2730 has branch name 2808. In other words, branch name 2808 points to branch 2740 when branch 2740 is in branches 2730.

Information manager 2716 adds branch 2740 to branches 2730 when branch 2740 is not yet in branches 2730 and source 2736 is allowed to change portion 2734. In this illustrative example, when the set of changes 2752 are for a new format for piece 2724 that is different than a previous format for piece 2724, information manager 2716 uses request 2738 to create branch 2740 with the new format for piece 2724. For example, when branch name 2808 indicates the name of the branch in branches 2730 that is the parent of branch 2740, information manager 2716 creates branch 2740 in branches 2730 as a child branch of the parent branch.

In this example, access by a group of client computer systems 2720 to piece 2724 in the new format is enabled by including the branch name for the new format when accessing piece 2724. As depicted, the previous format for piece 2724 is provided when the branch name for the new format is not included by a client computer system accessing piece 2724.

Information manager 2716 makes the set of changes 2752 to branch 2740 for piece 2724 of information 2704 when source 2736 is allowed to change portion 2734. Thus, information manager 2716 enables source 2736 to make changes to at least one of an existing branch for piece 2724 of information 2704 in location 2708 or a new branch for piece 2724 of information 2704 in location 2708.

Figure 30:
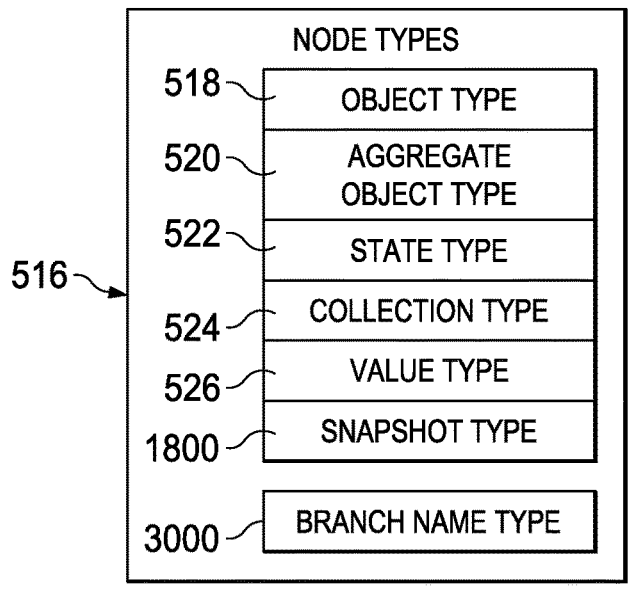
FIG. 30 is an illustration of a block diagram of node types in accordance with an illustrative embodiment.

Turning now to FIG. 30, an illustration of a block diagram of node types is depicted in accordance with an illustrative embodiment. In this illustration, node types 516 include object type 518, aggregate object type 520, state type 522, collection type 524, value type 526, snapshot type 1800, and branch name type 3000. As disclosed above in FIG. 5, each node type 512 of a node in nodes 502 in graph database 500 is selected from at least one of node types 516 or some other suitable type for representing portions of information as nodes 502 in graph database 500.

Branch name type 3000 is the node type of nodes in nodes 502 for branch names. Branch names are names of branches of different pieces of information stored in graph database 500. These branch names identify versions of pieces of information in graph database 500.

For example, when source 2736 of piece 2724 of information 2704 in graph database 500 makes a change to piece 2724 of information 2704, source 2736 may indicate that the change be made to a new branch for piece 2724 of information 2704. Source 2736 indicates that the change be made to the new branch by providing the branch name for the new branch in a request for the change that the source is making to change piece 2724 of information 2704. In this example, a first version of piece 2724 is the version before the change is made to the new branch and a second version of piece 2724 is the branch formed by the change to piece 2724 of information 2704.

Figure 31:
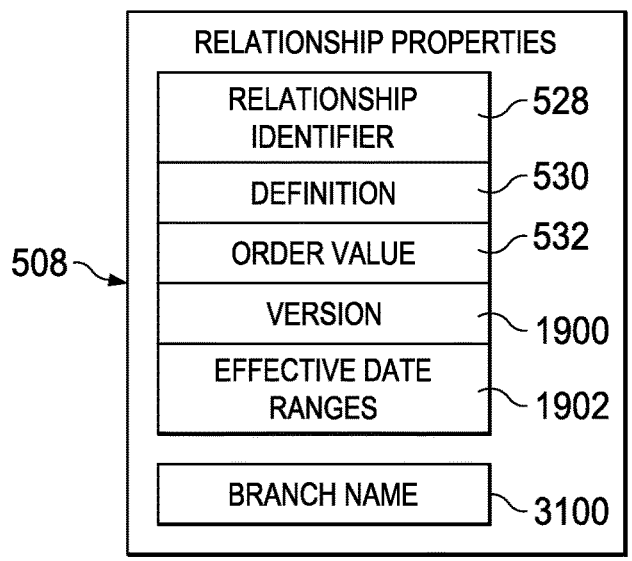
FIG. 31 is an illustration of a block diagram of relationship properties in accordance with an illustrative embodiment.

With reference to FIG. 31, an illustration of a block diagram of relationship properties is depicted in accordance with an illustrative embodiment. In this illustration, relationship properties 508 include relationship identifier 528, definition 530, order value 532, version 1900, effective date ranges 1902, and branch name 3100. As disclosed above in FIG. 5, relationship properties 508 are the properties of relationships 504 in graph database 500.

As depicted, branch name 3100 is a value specifying the name of a branch for a version of an object. The value specifying the name of the branch is selected from at least one of a number, an alphanumeric string, a universal resource locator, or some other suitable type of value for identifying the name of a branch for a version of an object. For example, when piece 2724 of information 2704 has two versions and the second version is a branch formed by changes to the format for piece 2724 of information 2704, branch name 3100 may specify a value of "format B" for the branch name of the second version.

Figure 32:
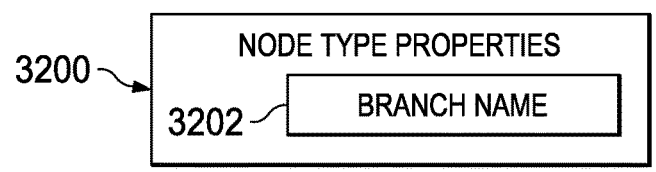
FIG. 32 is an illustration of a block diagram of node type properties for a branch name in accordance with an illustrative embodiment.

With reference next to FIG. 32, an illustration of a block diagram of node type properties for a branch name is depicted in accordance with an illustrative embodiment. In this illustrative example, node type properties 3200 are an example of node type properties 514 in node properties 506. In this illustration, node type properties 3200 are for a node in nodes 502 that represents a branch name for a version of an object.

As depicted, node type properties 3200 include branch name 3202. In this illustrative example, branch name 3202 is a value specifying the name of a branch for a version of an object. The value specifying the name of the branch is selected from at least one of a number, an alphanumeric string, a universal resource locator, or some other suitable type of value for identifying the name of a branch for a version of an object.

In other words, nodes in graph database 500 of the branch name type are nodes that include a branch name. A node of the branch name type in graph database 500 has a relationship in relationships 504 that points to a version of an object in graph database 500.

The illustrations of information environment 2700 and the different components in information environment 2700 in FIGS. 27-32 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, a group of portions 2744 of information 2704 may be located in one or more locations in addition to or in place of location 2708. In other words, information 2704 may be stored in a distributed manner.

As another example, information manager 2716 may receive request 2738 from source 2736 at substantially the same time as information manager 2716 receives request 2746 from client computer system 2748. In this example, information manager 2716 may process request 2738 from source 2736 before processing request 2746 from client computer system 2748.

Figure 33:
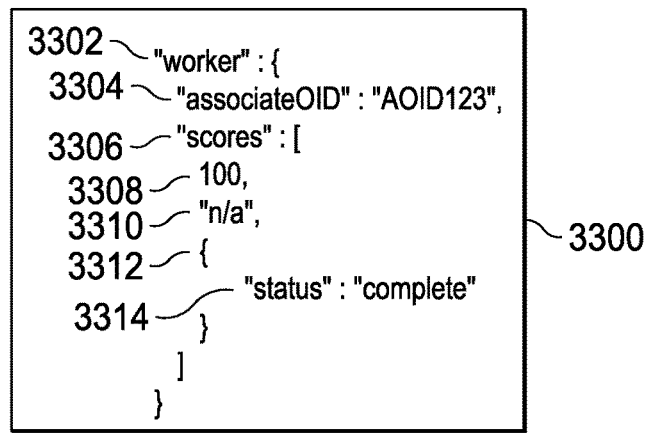
FIG. 33 is an illustration of a change to a piece of information in accordance with an illustrative embodiment.

Turning to FIG. 33, an illustration of a change to a piece of information is depicted in accordance with an illustrative embodiment. In this illustration, change 3300 is an example of one of changes 2752 to piece 2724 of information 2704 in FIG. 27. As depicted, change 3300 is shown in text using JavaScript object notation. In particular, this figure shows text for an example of changing the value of a score in a branch of piece 2724 of information 2704.

In this illustrative example, change 3300 includes object 3302. Object 3302 has the name "worker." Object 3302 includes named value 3304 and collection 3306. Named value 3304 indicates "associateOID" has the value "AOI2423."

Collection 3306 has the name "scores" in this illustrative example. Collection 3306 includes value 3308, value 3310, and object 3312. As depicted, value 3308 is the first item in collection 3306, value 3310 is the second item in collection 3306, and object 3312 is the third item in collection 3306. Value 3308 indicates the first item in collection 3306 has the value "100." Value 3310 indicates the second item in collection 3306 has the value "n/a." Object 3312 includes named value 3314. Named value 3314 indicates "status" has the value "complete." Thus, object 3312 indicates the third item in collection 3306 has named value 3314 that indicates "status" has the value "complete."

Figure 34:
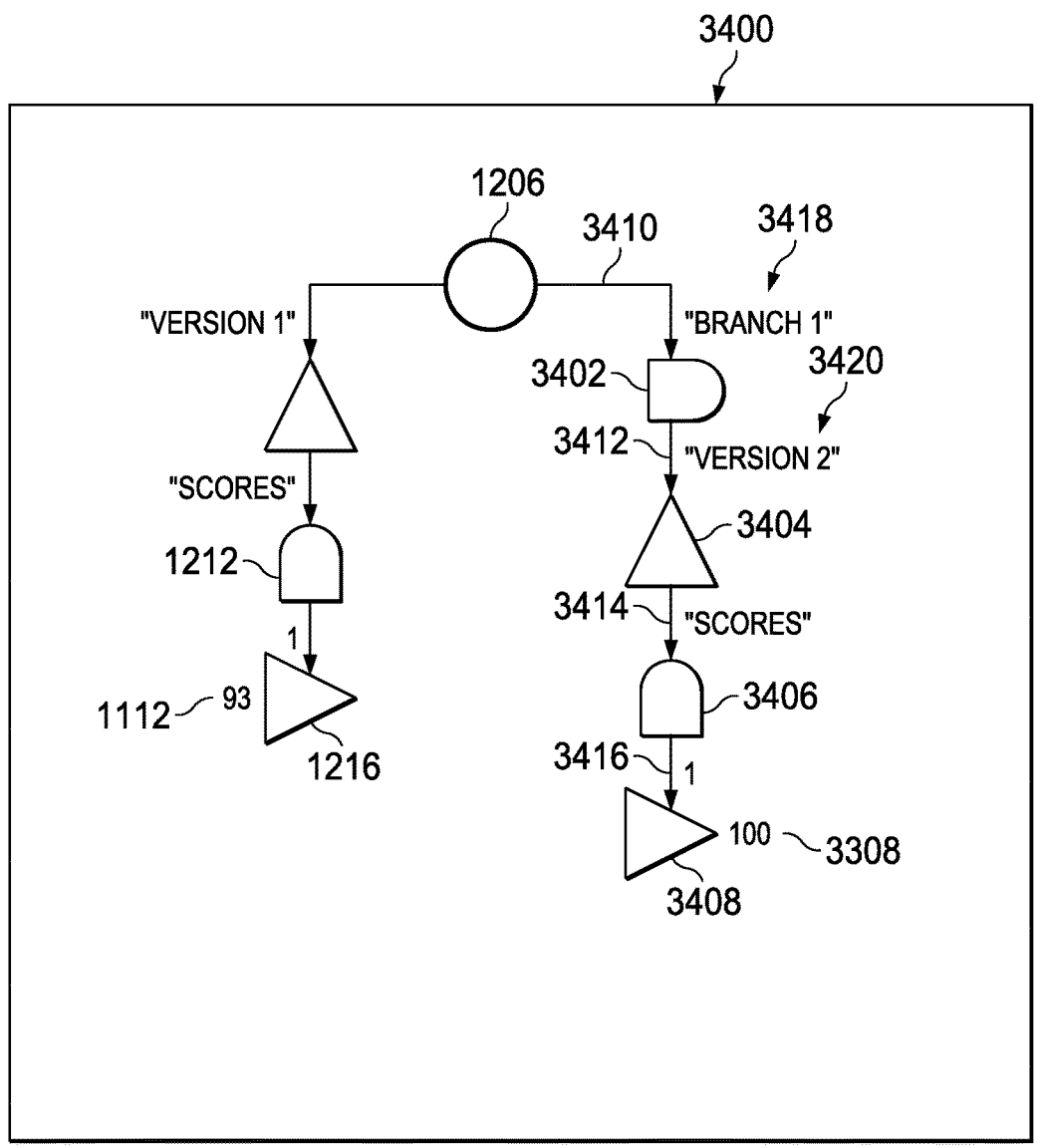
FIG. 34 is an illustration of a graph of information after a change to the information in accordance with an illustrative embodiment.

Turning next to FIG. 34, an illustration of a graph of information after a change to the information is depicted in accordance with an illustrative embodiment. In this illustration, graph 3400 shows nodes 502 and relationships 504 of graph database 500 in FIG. 5.

In this illustrative example, information manager 2716 has added change 3300 to piece 2724 of information 2704 to graph 3400. In this illustrative example, branch1 for version 2 of piece 2724 is from change 3300 in FIG. 33.

As depicted, nodes 502 in graph 3400 representing change 3300 to piece 2724 of information 2704 include branch name 3402, snapshot 3404, collection 3406, and value 3408. Branch name 3402 is where the branch name "branch1" is stored for "version 2" of "scores" for piece 2724 of information 2704. Snapshot 3404 is where version 2 of collection 3406 named "scores" is stored. Value 3408 is where value 3308 with the value "100" is stored.

In this illustrative example, relationships 504 in graph 3400 representing change 3300 to piece 2724 of information 2704 include relationship 3410 between aggregate object 1206 and branch name 3402; relationship 3412 between branch name 3402 and snapshot 3404; relationship 3414 between snapshot 3404 and collection 3406; and relationship 3416 between collection 3406 and value 3408.

As depicted, relationship 3410 has branch name 3418. Branch name 3418 is an example of branch name 3100 in relationship properties 508 in FIG. 31. Version 3420 in relationship 3412 indicates snapshot 3404 is the second snapshot for the "scores" collection in aggregate object 1206.

Figure 35:
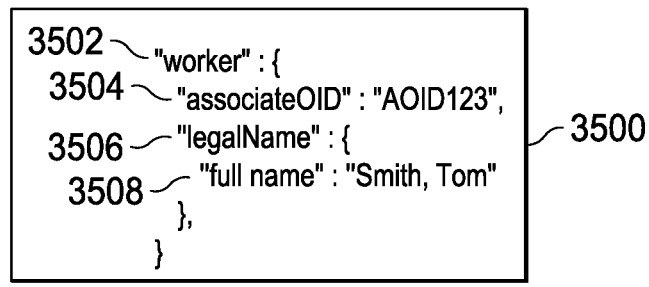
FIG. 35 is an illustration of a change to a piece of information in accordance with an illustrative embodiment.

Turning now to FIG. 35, an illustration of a change to a piece of information is depicted in accordance with an illustrative embodiment. In this illustration, change 3500 is an example of one of changes 2752 to piece 2724 of information 2704. As depicted, change 3500 is shown in text using JavaScript object notation. In particular, this figure shows text for an example of replacing the format of a legal name of a worker from first name "Tom" last name "Smith"

to full name "Smith, Tom." In this illustrative example, replacing the format of the legal name changes the format of the legal name in a branch.

In this illustrative example, change 3500 includes object 3502. Object 3502 has the name "worker." Object 3502 includes named value 3504 and object 3506. Named value 3504 indicates "associateOID" has the value "AOID123."

As depicted, object 3506 has the name "legalName." Object 3506 includes named value 3508. Named value 3508 indicates "full name" has the value "Smith, Tom."

Figure 36:
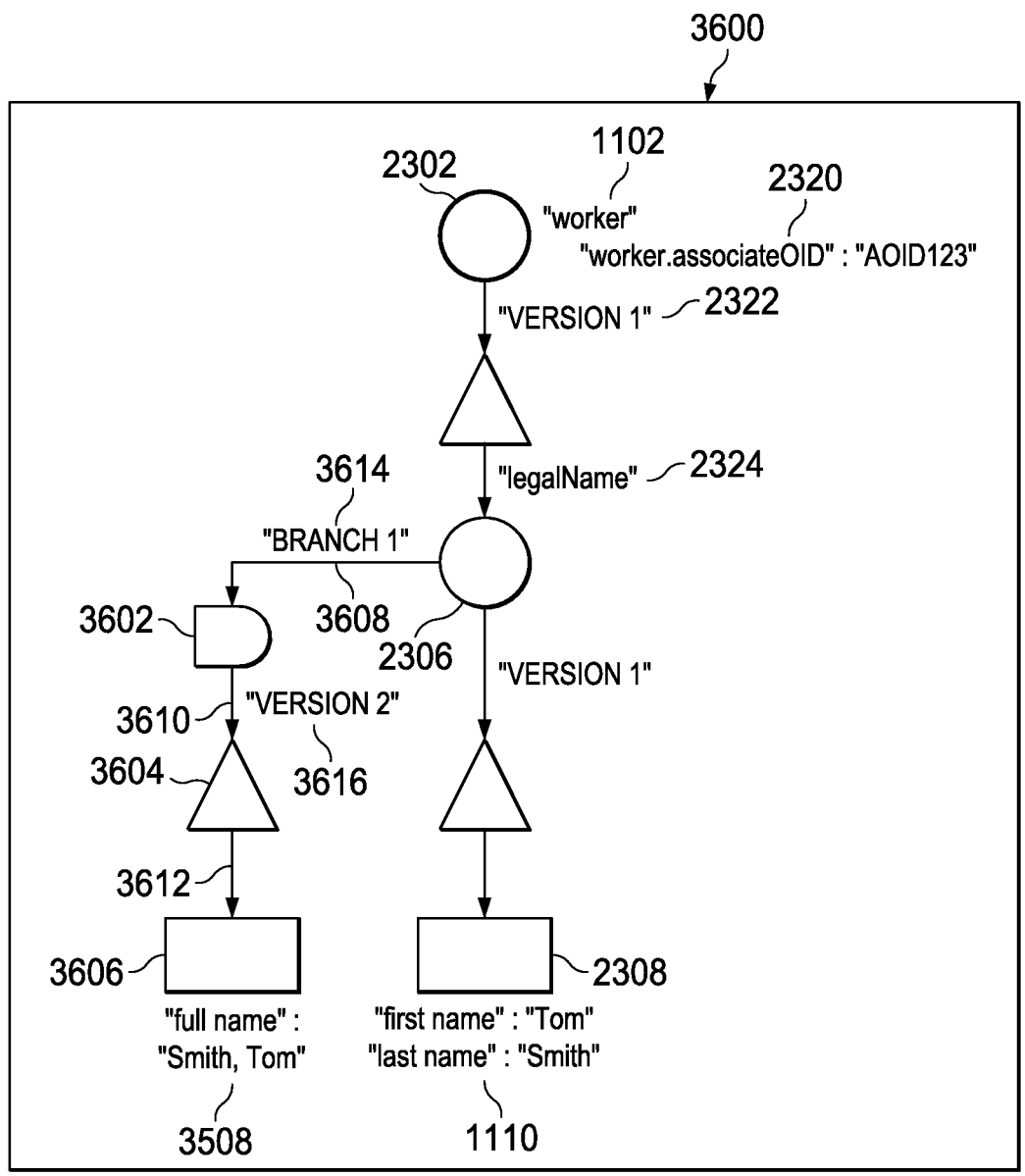
FIG. 36 is an illustration of a graph of information after a change to the information in accordance with an illustrative embodiment.

With reference to FIG. 36, an illustration of a graph of information after a change to the information is depicted in accordance with an illustrative embodiment. In this illustration, graph 3600 shows nodes 502 and relationships 504 of graph database 500 in FIG. 5.

In this illustrative example, information manager 2716 has added change 3500 to piece 2724 of information 2704 to graph 3600. In this illustrative example, branch1 for version 2 of piece 2724 is from change 3500 in FIG. 35.

As depicted, nodes 502 in graph 3600 representing change 3500 to piece 2724 of information 2704 include branch name 3602, snapshot 3604, and named value 3606. Branch name 3602 is where the branch name "branch1" is stored for "version 2" of "legalName" for piece 2724 of information 2704. Snapshot 3604 is where version 2 of "legalName" is stored. Named value 3606 is where full name "Smith, Tom" is stored.

In this illustrative example, relationships 504 in graph 3600 representing change 3500 to piece 2724 of information 2704 include relationship 3608 between object 2306 and branch name 3602; relationship 3610 between branch name 3602 and snapshot 3604; and relationship 3612 between snapshot 3604 and named value 3606. As depicted, relationship 3608 has branch name 3614. Branch name 3614 is an example of branch name 3100 in relationship properties 508 in FIG. 31. Version 3616 in relationship 3610 indicates snapshot 3604 is the second snapshot for the "legalName" of aggregate object 2302. In this illustrative example, "Branch1" for "version 2" of the "legalName" has a different format than "version 1" of the "legalName."

Figure 37:
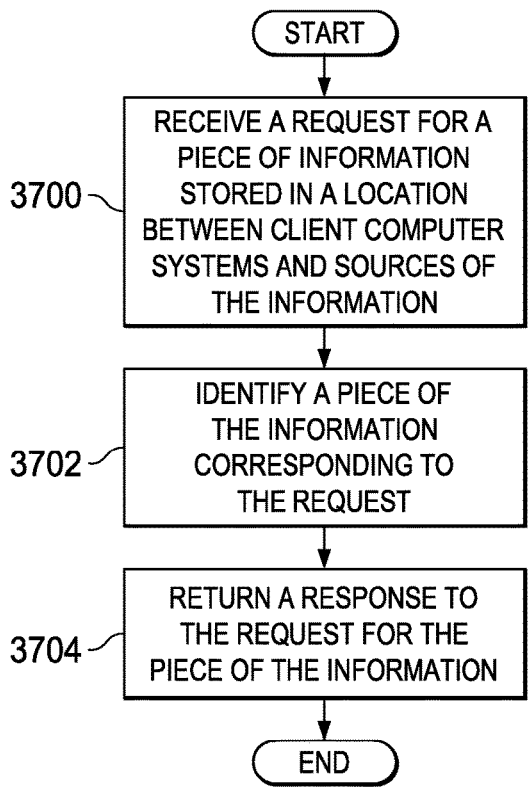
FIG. 37 is an illustration of a flowchart of a process for accessing information in accordance with an illustrative embodiment.

Turning next to FIG. 37, an illustration of a flowchart of a process for accessing information is depicted in accordance with an illustrative embodiment. The process illustrated in FIG. 37 may be implemented in information environment 100 in FIG. 1. In particular, the process may be implemented in information manager 130 in computer system 110.

The process begins by receiving a request for a piece of information stored in a location between client computer systems and sources of the information (step 3700). In step 3700, the information has formats for the information in the location and the formats for the information are controlled by the sources of the information. Also, each of the sources is assigned to control a group of portions of the information in the location.

The process identifies a piece of the information corresponding to the request (step 3702). The process returns a response to the request for the piece of the information (step 3704), with the process terminating thereafter. The process includes a technical solution to information having different formats and enables simplifying access to the information in different formats.

Figure 38:
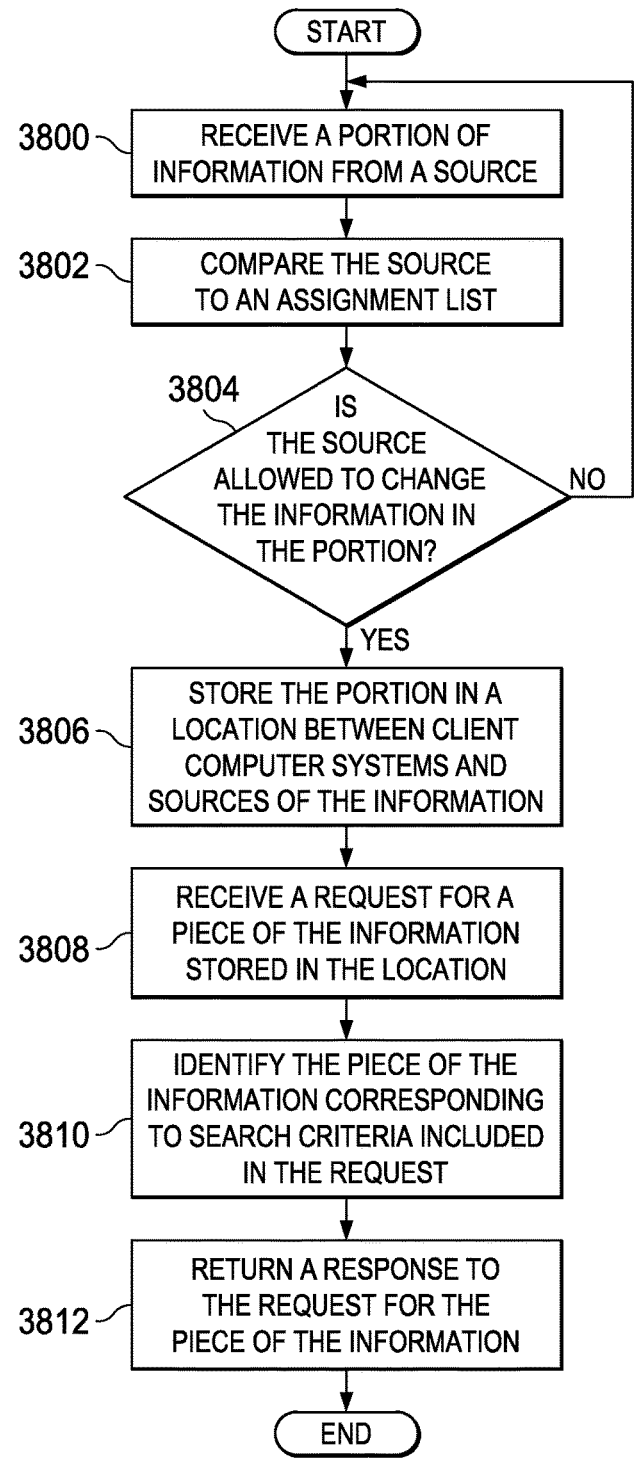
FIG. 38 is an illustration of a flowchart of a process for accessing information in accordance with an illustrative embodiment.

With reference to FIG. 38, an illustration of a flowchart of a process for accessing information is depicted in accordance with an illustrative embodiment. The process illustrated in FIG. 38 may be implemented in information environment 100 in FIG. 1. In particular, the process may be implemented in information manager 130 in computer system 110. These components may follow the data flow described in FIG. 2.

The process begins by receiving a portion of information from a source (step 3800). The process compares the source to an assignment list (step 3802). A determination is made as to whether the source is allowed to change the information in the portion (step 3804). If the source is not allowed to change the information in the portion, the process returns to step 3800.

As depicted, if the source is allowed to change information in the portion, the process stores the portion in a location between client computer systems and sources of the information (step 3806). The process next receives a request for a piece of the information stored in the location (step 3808).

The process identifies the piece of the information corresponding to search criteria included in the request (step 3810). The process returns a response to the request for the piece of the information (step 3812), with the process terminating thereafter.

Figure 39:
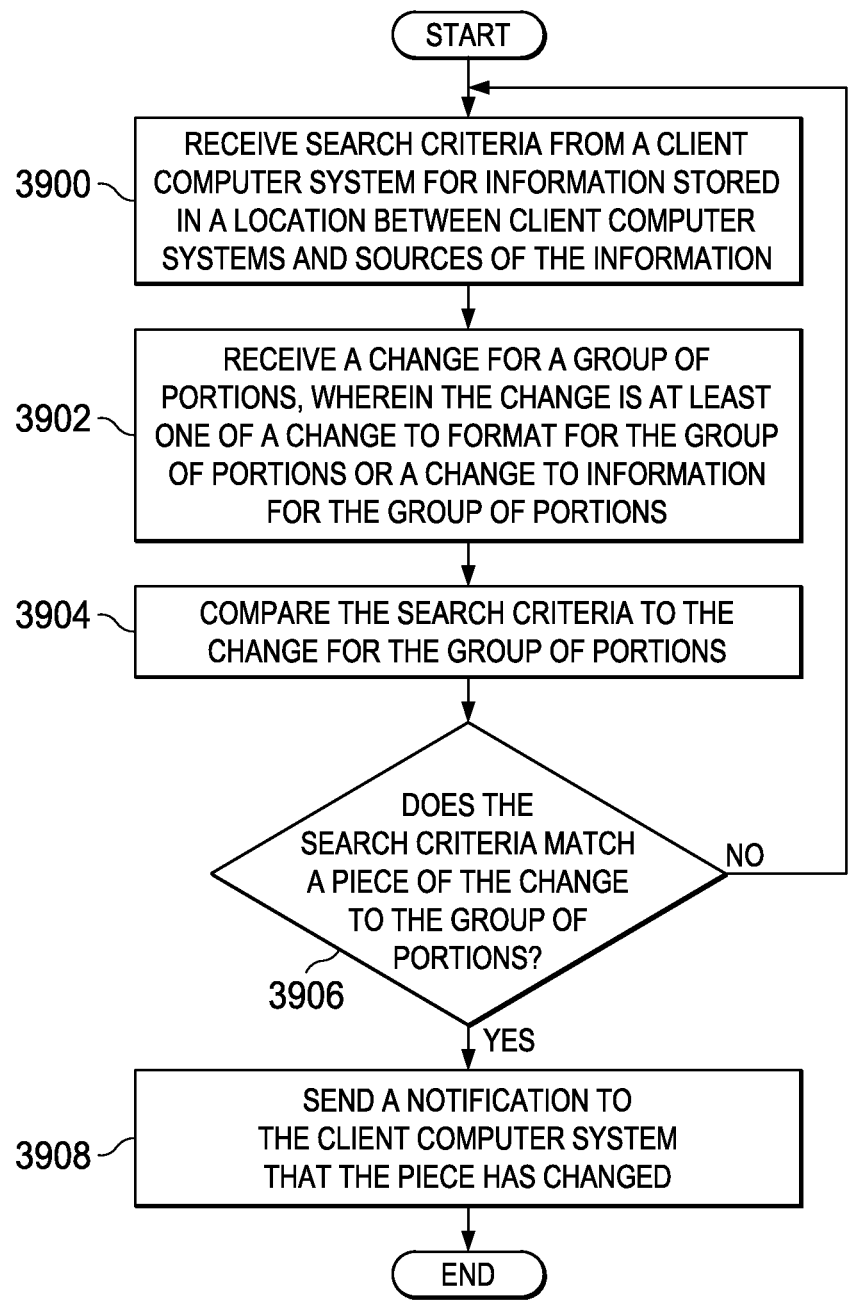
FIG. 39 is an illustration of a flowchart of a process for processing subscriptions in accordance with an illustrative embodiment.

With reference next to FIG. 39, an illustration of a flowchart of a process for processing subscriptions is depicted in accordance with an illustrative embodiment. The process illustrated in FIG. 39 may be implemented in information environment 100 in FIG. 1. In particular, the process may be implemented in information manager 130 in computer system 110. These components may follow the data flow described in FIG. 3.

The process begins by receiving search criteria from a client computer system for information stored in a location between client computer systems and sources of the information (step 3900). When the process receives the search criteria, the process may also receive a group of portions of the information to be sent to the client computer system when the search criteria is met.

The process next receives a change for a group of portions, wherein the change is at least one of a change to format for the group of portions or a change to information for the group of portions (step 3902). The process compares the search criteria to the change for the group of portions (step 3904). The process makes a determination of whether the search criteria matches a piece of the change to the group of portions (step 3906). If the search criteria do not match the piece of the change, the process returns to step 3900.

As depicted, when the search criteria matches the piece of the change, the process sends a notification to the client computer system that the piece has changed (step 1508), with the process terminating thereafter. The notification may include a copy of the group of portions of information requested to be sent to the client computer system when the search criteria is met.

Figure 40:
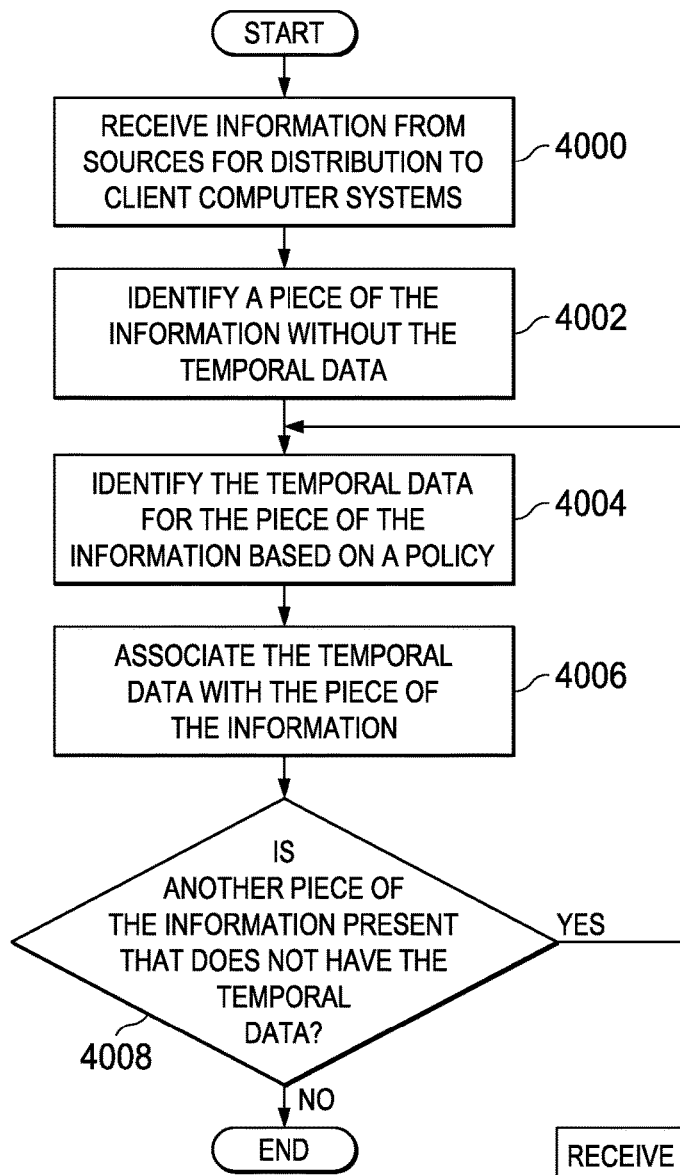
FIG. 40 is an illustration of a flowchart of a process for identifying temporal data for information in accordance with an illustrative embodiment.

With reference next to FIG. 40, an illustration of a flowchart of a process for identifying temporal data for information is depicted in accordance with an illustrative embodiment. The process illustrated in FIG. 40 may be implemented in information manager 1316 in computer system 1310 in FIG. 13.

The process begins by receiving information from sources for distribution to client computer systems (step 4000). The information may be information that is stored in a location or information that has been received for processing. In some cases, the temporal data may be associated with some of the information when information is received from the sources. In other cases, the temporal data may be completely absent when the information is received from the sources.

The process then identifies a piece of the information without the temporal data (step 4002). As depicted, step 4002 may be performed with respect to information located in location 1308 in computer system 1310 in FIG. 13.

The process identifies the temporal data for the piece of the information based on a policy (step 4004). The process associates the temporal data with the piece of the information (step 4006).

A determination is made as to whether another piece of information is present that does not have temporal data (step 4008). If another piece of information is present without temporal data, the process returns to step 4004. Otherwise the process terminates. This process may be repeated any number of times until temporal data is associated with as much of the information is desired.

Figure 41:
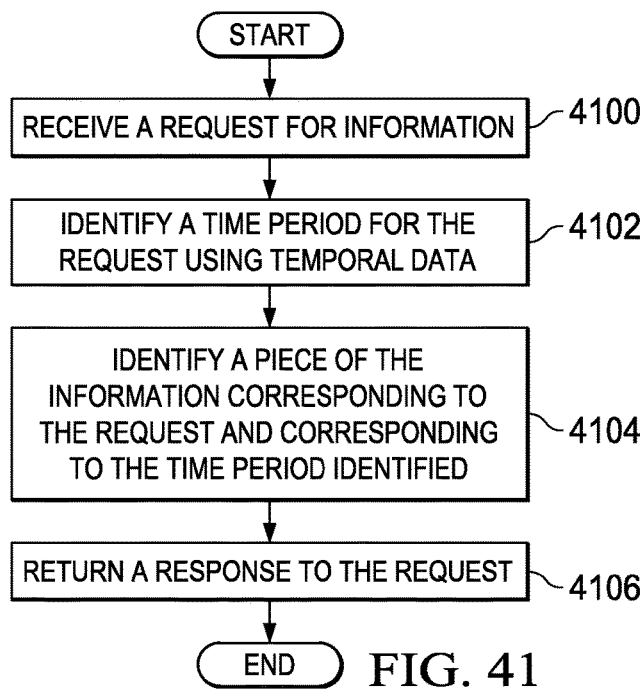
FIG. 41 is an illustration of a flowchart of a process for accessing information in accordance with an illustrative embodiment.

With reference now to FIG. 41, an illustration of a flowchart of a process for accessing information is depicted in accordance with an illustrative embodiment. The process illustrated in FIG. 41 may be implemented in information environment 1300 in FIG. 13. In particular, the process may be implemented in information manager 1316 in computer system 1310. This process takes into account when information is usable, when information is changed, or some combination thereof in responding to requests from a client computer system for information.

The process begins by receiving a request for the information (step 4100). In step 4100, temporal data is associated with the information. The temporal data indicates when the information is useable in this example. In other examples, temporal data also may indicate when a change occurs to the information.

The process identifies a time period for the request using temporal data (step 4102). The process identifies a piece of the information corresponding to the request and corresponding to the time period identified (step 4104).

The process returns a response to the request (step 4106), with the process terminating thereafter. The response returned in step 4106 includes the piece of the information. Thus, this process enables performing an operation using the information with increased accuracy. By having information of data, operations may be identified with increased accuracy. Further, when the temporal data is returned with the information, the temporal data may be taken into account in the analysis to increase accuracy in an identifying operation to be performed.

Figure 42:
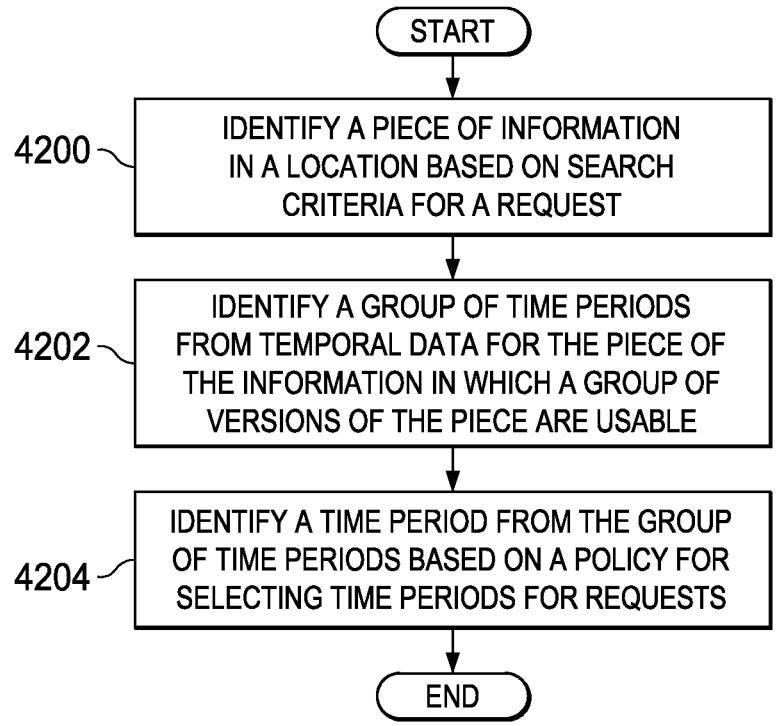
FIG. 42 is an illustration of a flowchart of a process for identifying a time period for a request in accordance with an illustrative embodiment.

With reference now to FIG. 42, an illustration of a flowchart of a process for identifying a time period for a request is depicted in accordance with an illustrative embodiment. The process illustrated in FIG. 42 may be implemented in information environment 1300 in FIG. 13. In particular, the process may be implemented in information manager 1316 in computer system 1310. The steps in this process are an example of steps that implement step 4102 in FIG. 41.

The process begins by identifying a piece of information in a location based on search criteria for a request (step 4200). The process next identifies a group of time periods from temporal data for the piece of the information in which a group of versions of the piece are useable (step 4202).

The process then identifies a time period from the group of time periods based on a policy for selecting time periods for requests (step 4204), with the process terminating thereafter. The policy in step 4204 is policy 1406 in FIG. 14.

Figure 43:
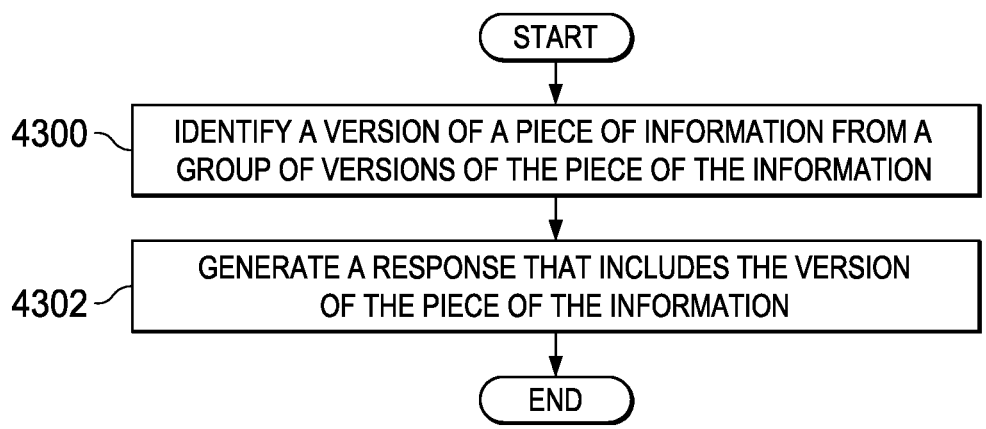
FIG. 43 is an illustration of a flowchart of a process for identifying a piece of information for a request corresponding to a request and corresponding to a time period in accordance with an illustrative embodiment.

With reference now to FIG. 43, an illustration of a flowchart of a process for identifying a piece of information for a request corresponding to a request and corresponding to a time period is depicted in accordance with an illustrative embodiment. The process illustrated in FIG. 43 may be implemented in information environment 1300 in FIG. 13. In particular, the process may be implemented in information manager 1316 in computer system 1310. The steps in this process are an example of steps that implement step 4104 in FIG. 41.

The process begins by identifying a version of a piece of information from a group of versions of the piece of the information (step 4300). The group of versions of the piece of the information correspond to a request. The version identified is the version of the piece of the information that is useable during a time period. Thus, the version of the piece identified corresponds to the time period. The process next generates a response that includes the version of the piece of the information (step 4302), with the process terminating thereafter.

Figure 44:
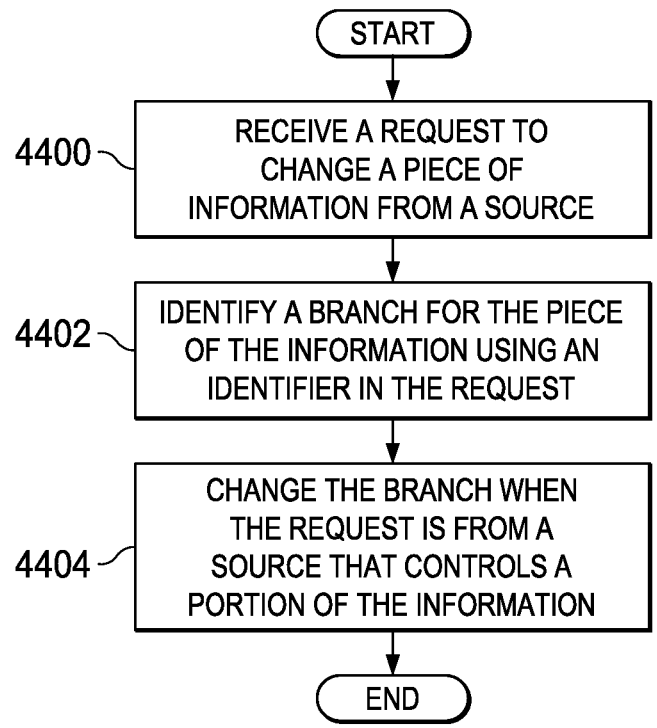
FIG. 44 is an illustration of a flowchart of a process for accessing information in accordance with an illustrative embodiment.

With reference to FIG. 44, an illustration of a flowchart of a process for accessing information is depicted in accordance with an illustrative embodiment. The process illustrated in FIG. 44 may be implemented in information system 2702 in information environment 2700. In particular, the process may be implemented in information manager 2716 in computer system 2710. The process illustrated in this example may be implemented to provide sources with access to information managed by information manager 2716.

The process begins by receiving a request to change a piece of information from a source (step 4400). The process identifies a branch for the piece of the information using an identifier in the request (step 4402). The branch is part of branches in a hierarchical structure and the branches are versions of the piece of the information. In step 4402, the identifier identities the branch.

The process changes the branch when the request is from a source that controls a portion of the information (step 4404), with the process terminating thereafter. The branches for the piece of the information are located in a location and the source is part of sources that control portions of the information in the location.

Figure 45:
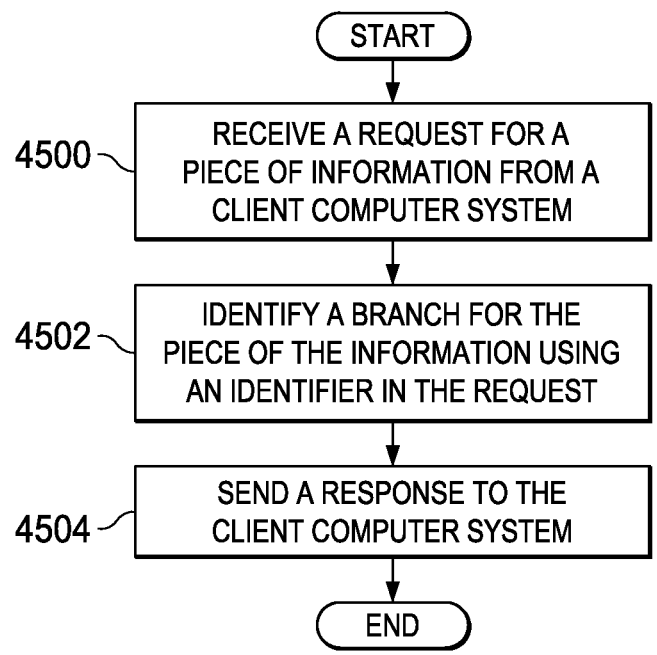
FIG. 45 is an illustration of a flowchart of a process for accessing information in accordance with an illustrative embodiment.

With reference now to FIG. 45, an illustration of a flowchart of a process for accessing information is depicted in accordance with an illustrative embodiment. In this example, the process may be implemented in information manager 2716 in computer system 2710. This process provides client computer systems 2720 access to information 2704.

The process begins by receiving a request for a piece of information from a client computer system (step 4500). The process identifies a branch for the piece of the information using an identifier in the request (step 4502). The branch is part of branches in a hierarchical structure and the branches are versions of the piece of information.

The process sends a response to the client computer system (step 4504), with the process terminating thereafter. The response includes the piece of the information with a set of changes made to the branch by a transaction for the piece of the information at a time period for the request.

Figure 46:
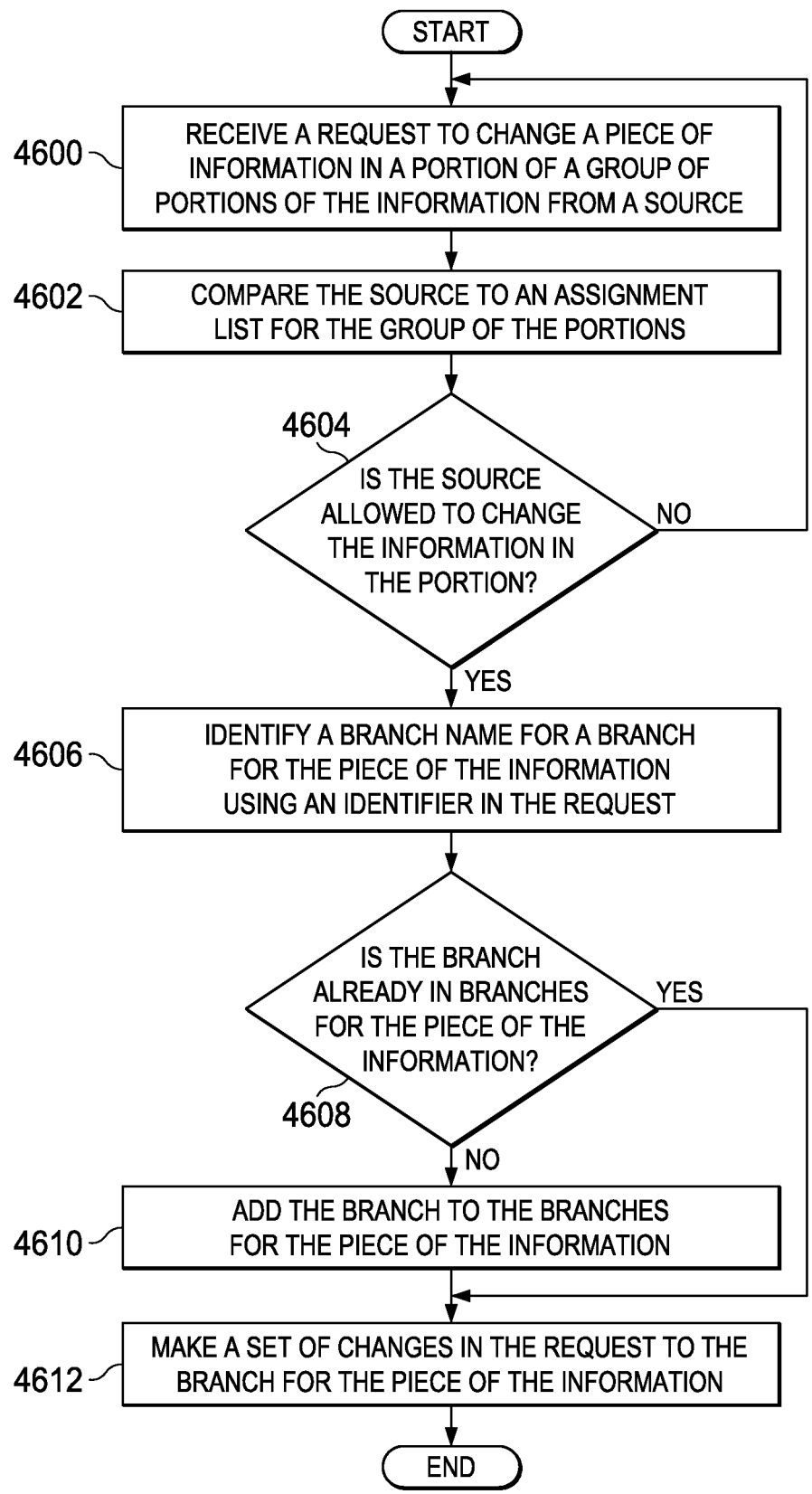
FIG. 46 is an illustration of a flowchart of a process for accessing information in accordance with an illustrative embodiment.

Turning to FIG. 46, an illustration of a flowchart of a process for accessing information is depicted in accordance with an illustrative embodiment. The process illustrated in FIG. 46 may be implemented in information system 2702 in information environment 2700. In particular, the process may be implemented in information manager 2716 in computer system 2710. The process illustrated in this example may be implemented to provide sources with access to information managed by information manager 2716.

The process begins by receiving a request to change a piece of information in a portion of a group of portions of the information from a source (step 4600). In step 4600, the request includes a set of changes for the piece of information in the portion. The set of changes for the piece of information is at least one of a change to format of the piece or a change to information for the piece.

The process compares the source to an assignment list for the group of the portions (step 4602). A determination is made as to whether the source is allowed to change the information in the portion (step 4604). If the source is not allowed to change the information in the portion, the process returns to step 4600.

As depicted, if the source is allowed to change the information in the portion, the process identifies a branch name for a branch for the piece of the information using an identifier in the request (step 4606). The branch is part of the branches in a hierarchical structure and the branches are versions of the piece of the information. The branches are identified by branch names.

A determination is made as to whether the branch is already in branches for the piece of the information (step 4608). As depicted, if the branch is already in the branches for the piece of the information, the process goes ahead to step 4612. If the branch is not already in branches for the piece of information, the process adds the branch to the branches for the piece of the information (step 4610).

The process then makes a set of changes in the request to the branch for the piece of the information (step 4612), with the process terminating thereafter. The branches for the piece of the information are located in a location and the source is part of the sources that control portions of the information in the location.

With reference now to FIG. 47, an illustration of a flowchart of a process for accessing information is depicted in accordance with an illustrative embodiment. In this example, the process may be implemented in information manager 2716 in computer system 2710. This process provides client computer systems 2720 with access to information 2704.

The process begins by receiving a request for a piece of information from a client computer system (step 4700). The process identifies the piece of information using search criteria in the request (step 4702).

The process identifies a branch for a version of the piece of the information using an identifier in the request (step 4704). In step 4704, the identifier is selected from at least one of a branch name or a transaction identifier. The branch is part of branches in a hierarchical structure and the branches are versions of the piece of information The process sends a response to the client computer system (step 4706), with the process terminating thereafter. The response includes the version of the piece of the information with a set of changes made to the branch by a transaction for the piece of information at a time period for the request.

With reference now to FIG. 48, an illustration of a flowchart of a process for managing messages about information is depicted in accordance with an illustrative embodiment. The process illustrated in FIG. 48 may be implemented in information system 2702 in information environment 2700. In particular, the process may be implemented in information manager 2716 in computer system 2710. The process illustrated in this example may be implemented to manage messages between client computer systems 2720 and sources 2712 of information 2704 managed by information manager 2716.

The process begins by receiving a message from a client computer system with a request to create another branch in a branch for a piece of information in a portion of the information (step 4800). The branch and the another branch are part of branches in a hierarchical structure and the branches are versions of the piece of information.

The process identifies a group of sources that own the portion based on an assignment list (step 4802). The process then sends the group of the sources the request from the client computer system (step 4804), with the process terminating thereafter.

With reference now to FIG. 49, an illustration of a flowchart of a process for adding a branch to a piece of information is depicted in accordance with an illustrative embodiment. The process illustrated in FIG. 49 may be implemented in information system 2702 in information environment 2700. In particular, the process may be implemented in information manager 2716 in computer system 2710.

The process begins by receiving a request from a source that controls a piece of information to create another branch for the piece of the information in a branch of the piece of information (step 4900). The request in step 4900 may be another request. For example, when the request is another request, the request may be a second of two requests. In this example, the first of the two requests may be the request in step 4610 in FIG. 46.

The process then creates the another branch (step 4902), with the process terminating thereafter. The steps in the process in FIG. 49 may be repeated to handle additional requests from sources to create branches.

Figure 50:
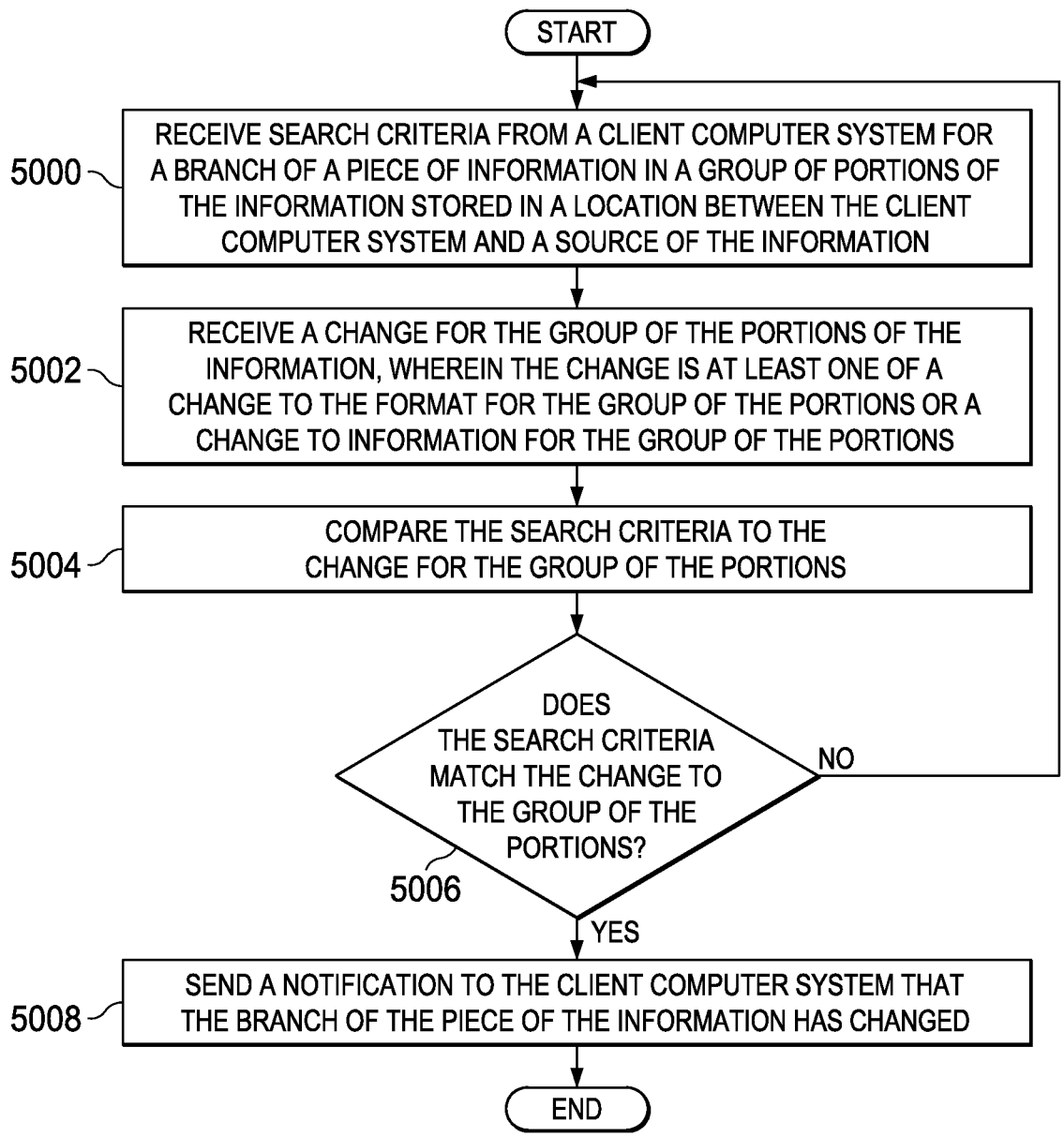
FIG. 50 is an illustration of a flowchart of a process for processing subscriptions in accordance with an illustrative embodiment.

With reference now to FIG. 50, an illustration of a flowchart of a process for processing subscriptions is depicted in accordance with an illustrative embodiment. The process illustrated in FIG. 50 may be implemented in information system 2702 in information environment 2700. In particular, the process may be implemented in information manager 2716 in computer system 2710.

The process begins by receiving search criteria from a client computer system for a branch of a piece of information in a group of portions of the information stored in a location between the client computer system and a source of the information (step 5000). The process next receives a change for the group of the portions of the information, wherein the change is at least one of a change to the format for the group of the portions or a change to information for the group of the portions (step 5002). The change to information in step 5002 may be selected from at least one of an addition of additional information to the piece of the information in the branch, a deletion of the piece of the information in the branch, a modification of the piece of the information in the branch, or a change of a source controlling the piece of the information in the branch.

The process compares the search criteria to the change for the group of the portions (step 5004). The process makes a determination of whether the search criteria matches the change to the group of the portions (step 5006). If the search criteria does not match the change, the process returns to step 5000. As depicted, when the search criteria matches the change, the process sends a notification to the client computer system that the branch of the piece of the information has changed (step 5008), with the process terminating thereafter.

The notification in step 5008 may include a copy of the group of portions of the information requested to be sent to the client computer system when the search criteria is met. The notification may also include information about the change received in step 5002. For example, the information about the change may include whether the notification is for an occurrence of at least of one a change in a format for the piece of the information in the branch, an addition of additional information to the piece of the information in the branch, a deletion of the piece of the information in the branch, a modification of the piece of the information in the branch, or a change of a source controlling the piece of the information in the branch.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, the process in FIG. 38 may perform steps 3800, 3802, 3804, and 3806 substantially concurrently with steps 3808, 3810, and 3812. In this example, the process processes the portion of information received from the source and the request from the client computer system substantially concurrently. As another example, the process in FIG. 38 may include an additional step to notify the source when the process has determined that the source is not allowed to change information in the portion.

In an illustrative example, step 4102 may be omitted. In this example, step 4104 may identify a piece of the information corresponding to the request based on when the information is useable as indicated by the temporal data associated with the information.

Figure 51:
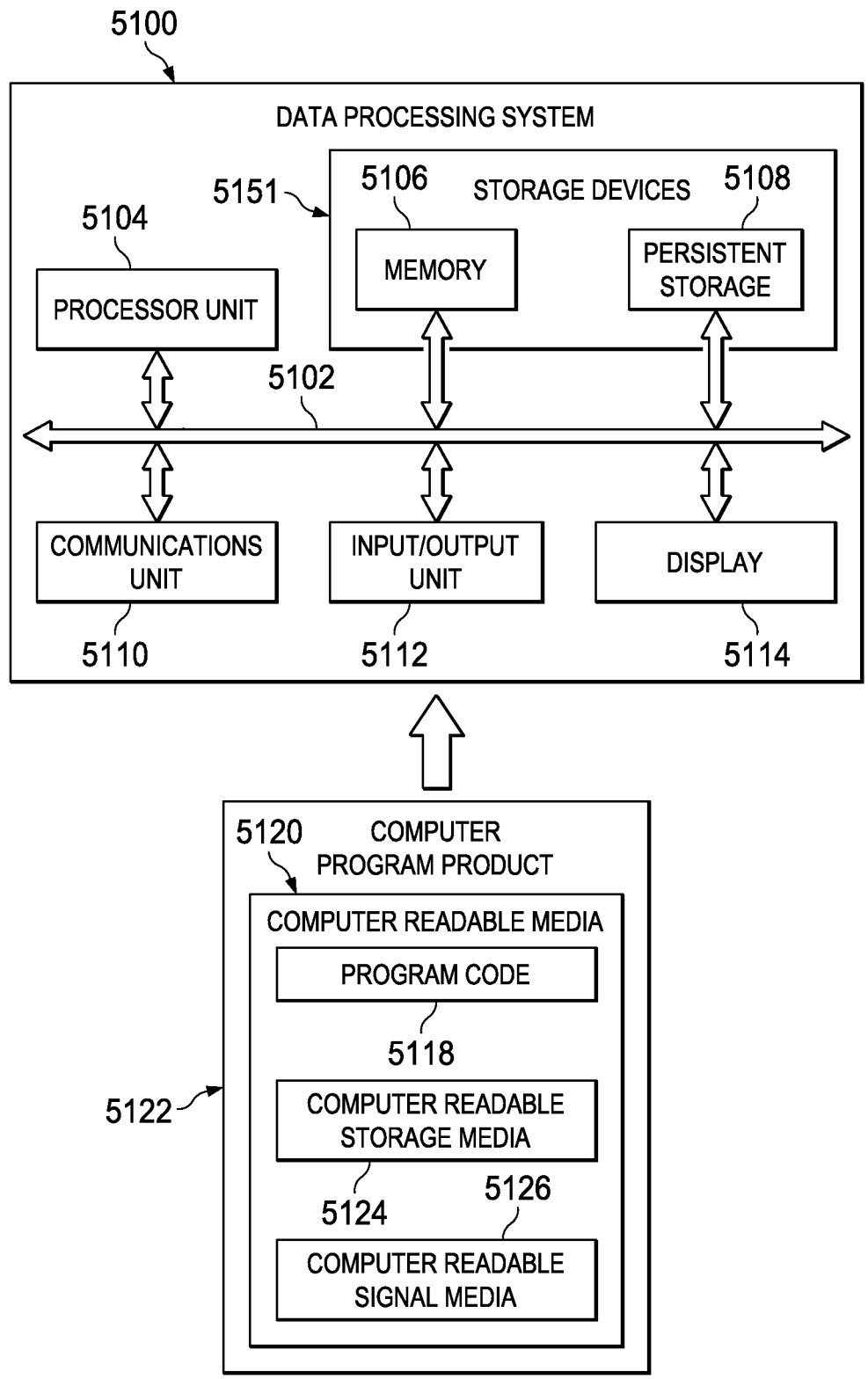
FIG. 51 is an illustration of a block diagram of a data processing system in accordance with an illustrative embodiment.

Turning now to FIG. 51, an illustration of a block diagram of a data processing system is depicted in accordance with an illustrative embodiment. Data processing system 5100 may be used to implement computer system 110 and client computer systems 134. In this illustrative example, data processing system 5100 includes communications framework 5102, which provides communications between processor unit 5104, memory 5106, persistent storage 5108, communications unit 5110, input/output (I/O) unit 5112, and display 5114. In this example, communications framework 5102 may take the form of a bus system.

Processor unit 5104 serves to execute instructions for software that may be loaded into memory 5106. Processor unit 5104 may be a number of processors, a multi-processor core, or some other type of processor, depending on the particular implementation.

Memory 5106 and persistent storage 5108 are examples of storage devices 5116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 5116 may also be referred to as computer readable storage devices in these illustrative examples. Memory 5106, in these examples, may be, for example, a random access memory or any other suitable volatile or non-volatile storage device. Persistent storage 5108 may take various forms, depending on the particular implementation.

For example, persistent storage 5108 may contain one or more components or devices. For example, persistent storage 5108 may be a hard drive, a flash memory, a rewritable optical disk, a rewritable magnetic tape, or some combination of the above. The media used by persistent storage 5108 also may be removable. For example, a removable hard drive may be used for persistent storage 5108.

Communications unit 5110, in these illustrative examples, provides for communications with other data processing systems or devices. In these illustrative examples, communications unit 5110 is a network interface card.

Input/output unit 5112 allows for input and output of data with other devices that may be connected to data processing system 5100. For example, input/output unit 5112 may provide a connection for user input through at least one of a keyboard, a mouse, or some other suitable input device. Further, input/output unit 5112 may send output to a printer. Display 5114 provides a mechanism to display information to a user.

Instructions for at least one of the operating system, applications, or programs may be located in storage devices 5116, which are in communication with processor unit 5104 through communications framework 5102. The processes of the different embodiments may be performed by processor unit 5104 using computer-implemented instructions, which may be located in a memory, such as memory 5106.

These instructions are referred to as program code, computer usable program code, or computer readable program code that may be read and executed by a processor in processor unit 5104. The program code in the different embodiments may be embodied on different physical or computer readable storage media, such as memory 5106 or persistent storage 5108.

Program code 5118 is located in a functional form on computer readable media 5120 that is selectively removable and may be loaded onto or transferred to data processing system 5100 for execution by processor unit 5104. Program code 5118 and computer readable media 5120 form computer program product 5122 in these illustrative examples. In one example, computer readable media 5120 may be computer readable storage media 5124 or computer readable signal media 5126.

In these illustrative examples, computer readable storage media 5124 is a physical or tangible storage device used to store program code 5118 rather than a medium that propagates or transmits program code 5118. Alternatively, program code 5118 may be transferred to data processing system 5100 using computer readable signal media 5126. Computer readable signal media 5126 may be, for example, a propagated data signal containing program code 5118. For example, computer readable signal media 5126 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 5100 are not meant to provide architectural limitations to the manner in which different embodiments may be implemented. The different illustrative embodiments may be implemented in a data processing system including components in addition to or in place of those illustrated for data processing system 5100. Other components shown in FIG. 51 can be varied from the illustrative examples shown. The different embodiments may be implemented using any hardware device or system capable of running program code 5118.

Thus, the technical problem of information having different formats in an information system is solved through one or more technical solutions in the illustrative examples. In one illustrative example, a technical solution is present in which formats for a portion of the information are controlled by a limited number of sources 112.

In one illustrative example, each portion of the information is controlled by a source. By limiting the number of sources that control a portion of the information, the format for information in a particular portion of the information may be consistent throughout the information in that portion. As a result, access to the information may be simplified. For example, consumers of information may need to perform less reformatting of a portion of the information when the formatting is controlled by a single source.

Further, in an illustrative example, the information manager provides one or more technical solutions to the technical problem of information being usable at different times, changing over time, or both being usable at different times and changing over time in an information system. In one illustrative example, the technical solution uses temporal data to identify information to be returned to client computer system 1344. In this manner, the usability, and when changes are made to information 1304 may be taken into account in processing requests for information made by client computer systems 1320. Additionally, the temporal data may be returned with information that is responsive to requests. As a result the temporal data may make identifying and then performing operations more accurate.

In still another illustrative example, the information manager provides one or more technical solutions to the technical problem of managing multiple versions of information. In one illustrative example, a technical solution organizes versions of a piece of information into a hierarchy. In other words, branches are present for a piece of information in which the branches are in a hierarchical structure. These branches represent versions of a piece of information.

Further, when changes are made to a branch that has been requested, the changes made at that point in time may be returned in the request. In other words, the piece of the information may have the state of the transaction at a particular point in time if the transaction that changes the piece of the information is in progress.

Additionally, when the branches are versions of information with different formats, client computer systems may obtain a piece of the information in a desired format for processing. As a result, fewer changes to information by client data processing systems are needed.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for accessing information, the method comprising:
   receiving, by a computer system, a request from a client computer system for a version of a piece of information;
   identifying, by the computer system, an aggregate object in a graph database using an identifier in the request, wherein the aggregate object is an independently addressable node in the graph database that contains a hierarchical structure of branches, and wherein the branches are different versions of the piece of information that are effective at different time periods;
   identifying, by the computer system, a branch for the piece of information in the aggregate object using a time period indicated in the request;
   sending, by the computer system, a response to the client computer system, wherein the response includes the version of the piece of information that is effective at the time period indicated in the request;
   responsive to receiving a transaction to change the piece of information, performing, by the computer system, a group of changes to a branch for the piece of information in the aggregate object that is effective at a time period indicated in the transaction;
   sending, by the computer system, a response to the client computer system, wherein the response includes the piece of information with a set of the changes made to the branch at the time period indicated in the transaction;
   wherein performing the group of changes to the branch comprises:
   creating a new branch in the hierarchical structure, wherein the new branch includes a first set of objects under the aggregate object, wherein the first set of objects contain the changes made to the branch at the time period indicated by the transaction, and the identifier is a transaction identifier that identifies the transaction;
   wherein creating the new branch in the hierarchical structure further comprises:
   creating a snapshot for the version of the piece of information;
   linking the snapshot to the branch within the hierarchical structure according to the time period indicated in the transaction, wherein the snapshot is a descendant node in the graph database to an object having properties affected by the set of the changes;
   creating the first set of objects, wherein the first set of objects contain changed properties of the object;
   linking the first set of objects to the snapshot within the hierarchical structure, wherein the first set of objects are descendent nodes in the graph database to the snapshot;
   wherein the piece of information is in a portion of the information controlled by a source in sources that controls portions of the information at a location, the method further comprising:

receiving, by the computer system, a request from the client computer system to create another branch in the branch for the piece of information; and sending, by the computer system, the request to the source in the sources that controls the piece of information in the portions of the information at the location; and wherein creating the new branch in the hierarchical structure further comprises:

creating a branch name type node for the version of the piece of information;

linking the branch name type node to the branch within the hierarchical structure, wherein the branch name type node is a child node in the graph database to the object having properties affected by the set of the changes;

linking the snapshot to the branch name type node, wherein the snapshot is a child node in the graph database to the branch name type node;

linking the first set of objects to the snapshot within the hierarchical structure, wherein the set of objects are descendent nodes in the graph database to both the branch name type node and the snapshot; and linking a second set of objects to the snapshot within the hierarchical structure, wherein the second set of objects are existing objects in the graph database whose properties are not affected by the set of the changes.

2. The method of claim 1, wherein the versions have formats for the piece of information, wherein the versions have temporal data for the piece of information, and the identifier in the request includes at least one of a change date, an effective date, or a format for which a version of the versions of the piece of information is desired for the piece of information in the response.

3. The method of claim 1, wherein the information is in a location between sources for the information and the client computer system.

4. The method of claim 1, wherein a client computer system subscribes to the branch for the piece of information and further comprising:

sending, by the computer system, a notification to the client computer system subscribing to the branch of an occurrence of at least one of a change in a format for the piece of information in the branch, an addition of additional information to the piece of information in the branch, a deletion of the piece of information in the branch, a modification of the piece of information in the branch, or a change of a source controlling the piece of information in the branch.

5. A computer system comprising:

a processor;

an information manager that receives a request from a client computer system for a version of a piece of information; identifies an aggregate object in a graph database using an identifier in the request, wherein the aggregate object is an independently addressable node in the graph database that contains a hierarchical structure of branches, and wherein the branches are different versions of the piece of information that are effective at different time periods; identifies a branch for the piece of information in the aggregate object using a time period indicated in the request; and sends a response to the client computer system, wherein the response includes the version of the piece of information that is effective at the time period indicated in the request;

wherein the information manager:

responsive to receiving a transaction to change the piece of information, performs a group of changes to a branch for the piece of information in the aggregate object that is effective at a time period indicated in the transaction; and sends a response to the client computer system, wherein the response includes the piece of information with a set of the changes made to the branch at the time period indicated in the transaction;

wherein performing the group of changes to the branch by the information manager comprises:

creating a new branch in the hierarchical structure, wherein the new branch includes a first set of objects under the aggregate object, wherein the first set of objects contain the changes made to the branch at the time period indicated by the transaction, and the identifier is a transaction identifier that identifies the transaction;

wherein creating the new branch in the hierarchical structure by the information manager further comprises:

creating a snapshot for the version of the piece of information;

linking the snapshot to the branch within the hierarchical structure according to the time period indicated in the transaction, wherein the snapshot is a descendant node in the graph database to an object having properties affected by the set of the changes;

creating the first set of objects, wherein the first set of objects contain changed properties of the object; and linking the first set of objects to the snapshot within the hierarchical structure, wherein the first set of objects are descendent nodes in the graph database to the snapshot;

wherein creating a new branch in the hierarchical structure by the information manager comprises:

linking a branch name type node to the branch within the hierarchical structure, wherein the branch name type node is a child node in the graph database to the object having properties affected by the set of the changes;

linking a snapshot to the branch name type node, wherein the snapshot is a child node in the graph database to the branch name type node;

linking a first set of objects to the snapshot within the hierarchical structure, wherein the first set of objects are descendent nodes in the graph database to both the branch name type node and the snapshot; and linking a second set of objects to the snapshot within the hierarchical structure, wherein the second set of objects are existing objects in the graph database whose properties are not affected by the set of the changes.

6. The computer system of claim 5, wherein the piece of information is in a portion of the information controlled by a source in sources that controls portions of the information at a location; and wherein the information manager receives a request from the client computer system to create another branch in the branch for the piece of information and sends the request to the source in the sources that controls the piece of information in the portions of the information at the location.

7. The computer system of claim 5, wherein the versions have formats for the piece of information, wherein the versions have temporal data for the piece of information, and the identifier in the request includes at least one of a change date, an effective date, or a format for which a version of the versions of the piece of information is desired for the piece of information in the response.

8. The computer system of claim 5, wherein the information is in a location between sources for the information and the client computer system.

9. The computer system of claim 5, wherein a client computer system subscribes to the branch for the piece of information and the information manager sends a notification to the client computer system subscribing to the branch of an occurrence of at least of one a change in a format for the piece of information in the branch, an addition of additional information to the piece of information in the branch, a deletion of the piece of information in the branch, a modification of the piece of information in the branch, or a change of a source controlling the piece of information in the branch.

10. A computer program product for accessing information, the computer program product comprising:
   a non-transitory computer readable storage media;
   program code, stored on the computer readable storage media, for receiving a request from a client computer system for a version of a piece of information;
   program code, stored on the computer readable storage media, for identifying an aggregate object in a graph database using an identifier in the request, wherein the aggregate object is an independently addressable node in the graph database that contains a hierarchical structure of branches, and wherein the branches are different versions of the piece of information that are effective at different time periods;
   program code, stored on the computer readable storage media, for identifying a branch for the piece of information in the aggregate object using a time period indicated in the request;
   program code, stored on the computer readable storage media, for sending a response to the client computer system, wherein the response includes the version of the piece of information that is effective at the time period indicated in the request;
   program code, stored on the computer readable storage media, for performing a group of changes to a branch for the piece of information in the aggregate object that is effective at a time period indicated in a transaction in response to receiving the transaction to change the piece of information;
   wherein the program code for performing the group of changes to the branch comprises:
   creating a new branch in the hierarchical structure, wherein the new branch includes a first set of objects under the aggregate object, wherein the first set of objects contain the changes made to the branch at the time period indicated by the transaction, and the identifier is a transaction identifier that identifies the transaction;
   wherein the piece of information is in a portion of the information controlled by a source in sources that control portions of the information at a location and further comprising:
   program code, stored on the computer readable storage media, for creating a snapshot for the version of the piece of information;
   program code, stored on the computer readable storage media, for linking the snapshot to the branch within the hierarchical structure according to the time period indicated in a transaction, wherein the snapshot is a descendant node in the graph database to an object having properties affected by the set of the changes;
   program code, stored on the computer readable storage media, for creating a first set of objects, wherein the first set of objects contain changed properties of the object; and
   program code, stored on the computer readable storage media, for linking the first set of objects to the snapshot within the hierarchical structure, wherein the first set of objects are descendent nodes in the graph database to the snapshot.

11. A method for accessing information, the method comprising:
   receiving a request to change a piece of information from a source;
   identifying an aggregate object in a graph database using an identifier in the request, wherein the aggregate object is an independently addressable node in the graph database that contains a hierarchical structure of branches, and wherein the branches are different versions of the piece of information that are effective at different time periods and wherein the identifier identifies the branch;
   changing the piece of information when the request is from a source that controls a portion of the information in which the branches for the piece of information are located in a location and the source is part of sources that control portions of the information in the location, wherein changing the piece of information comprises creating a new branch in the hierarchical structure, wherein the new branch includes a set of objects under the aggregate object, wherein the set of objects contain the changes made to the branch at the time period indicated by a transaction, and the identifier is a transaction identifier that identifies the transaction;
   wherein the branches have different formats and the different formats used are controlled by the source, wherein the branches have temporal data for pieces of the information and the temporal data is controlled by the source;
   wherein creating the new branch in the hierarchical structure further comprises:
   creating a branch name type node for the version of the piece of information;
   linking the branch name type node to the branch within the hierarchical structure, wherein the branch name type node is a child node in the graph database to the object having properties affected by the set of the changes;
   linking a snapshot to the branch name type node, wherein the snapshot is a child node in the graph database to the branch name type node;
   linking a first set of objects to the snapshot within the hierarchical structure, wherein the set of objects are descendent nodes in the graph database to both the branch name type node and the snapshot; and
   linking a second set of objects to the snapshot within the hierarchical structure, wherein the second set of objects are existing objects in the graph database whose properties are not affected by the set of the changes.

12. The method of claim 11, wherein creating the new branch in the hierarchical structure further comprises:
   creating a snapshot for the version of the piece of information;
   linking the snapshot to the branch within the hierarchical structure according to the time period indicated in the transaction, wherein the snapshot is a descendant node in the graph database to an object having properties affected by the set of the changes;

creating a first set of objects, wherein the first set of objects contain changed properties of the object; and linking the first set of objects to the snapshot within the hierarchical structure, wherein the first set of objects are descendent nodes in the graph database to the snapshot.

13. The method of claim 11, wherein the different formats are selected from at least one of a file format for encoding the information for storage in a computer file, an audio format, a video format, a data type, a primitive type, a numeric type, a type of data structure, a structure for a record, a structure for a table, a name of a field in a data structure, a type of encryption, a message format, a date format, a type of currency, a font type, a font size, or a language.

14. The method of claim 11, wherein the location is between the sources and a group of client computer systems that access the information in the location.

15. The method of claim 14 further comprising: receiving a request from a client computer system in the group of client computer systems to create another branch in the branch for the piece of information; and sending the request to the source in the sources that controls the piece of information in the portions of the information at the location.

16. The method of claim 15 further comprising:
receiving another request from the source to create the another branch in the branch; and
adding the another branch in the branch in response to receiving the another request.

17. The method of claim 16, wherein the client computer system in a group of client computer systems subscribes to the branch for the piece of information and further comprising:
sending a notification to the client computer system subscribing to the branch of an occurrence of at least one of a change in a format for the piece of information in the branch, an addition of additional information to the piece of information in the branch, a deletion of the piece of information in the branch, a modification of the piece of information in the branch, a change of a source controlling the piece of information in the branch, or an addition of the another branch in the branch.

18. A computer system comprising:
a processor;
an information manager that receives a request to change a piece of information from a source; identifies an aggregate object in a graph database using an identifier in the request, wherein the aggregate object is an independently addressable node in the graph database that contains a hierarchical structure of branches, and wherein the branches are different versions of the piece of information that are effective at different time periods, and wherein the identifier identifies the branch; and changes the piece of information when the request is from a source that controls a portion of the information in which the branches for the piece of information are located in a location and the source is part of sources that control portions of the information in the location, wherein changing the piece of information comprises creating a new branch in the hierarchical structure, wherein the new branch includes a set of objects under the aggregate object, wherein the set of objects contain the changes made to the branch at the time period indicated by a transaction, and the identifier is a transaction identifier that identifies the transaction;

wherein creating the new branch by the information manager in the hierarchical structure further comprises:
creating a snapshot for the version of the piece of information;
linking the snapshot to the branch within the hierarchical structure according to the time period indicated in the transaction, wherein the snapshot is a descendant node in the graph database to an object having properties affected by the set of the changes;
creating a first set of objects, wherein the first set of objects contain changed properties of the object;
linking the first set of objects to the snapshot within the hierarchical structure, wherein the first set of objects are descendent nodes in the graph database to the snapshot;
wherein the branches have different formats and the different formats used are controlled by the source, wherein the branches have temporal data for pieces of the information and the temporal data is controlled by the source; and
wherein creating the new branch by the information manager in the hierarchical structure further comprises:
creating a branch name type node for the version of the piece of information;
linking the branch name type node to the branch within the hierarchical structure, wherein the branch name type node is a child node in the graph database to the object having properties affected by the set of the changes;
linking a snapshot to the branch name type node, wherein the snapshot is a child node in the graph database to the branch name type node;
linking a first set of objects to the snapshot within the hierarchical structure, wherein the set of objects are descendent nodes in the graph database to both the branch name type node and the snapshot; and
linking a second set of objects to the snapshot within the hierarchical structure, wherein the second set of objects are existing objects in the graph database whose properties are not affected by the set of the changes.

19. The computer system of claim 18, wherein the different formats are selected from at least one of a file format for encoding information for storage in a computer file, an audio format, a video format, a data type, a primitive type, a numeric type, a type of data structure, a structure for a record, a structure for a table, a name of a field in a data structure, a type of encryption, a message format, a date format, a type of currency, a font type, a font size, or a language.

20. The computer system of claim 18, wherein the location is between the sources and a group of client computer systems that access the information in the location.

21. The computer system of claim 20, wherein the information manager receives a request from a client computer system in the group of client computer systems to create another branch in the branch for the piece of information and sends the request to the source in the sources that controls the piece of information in the portions of the information at the location.

22. The computer system of claim 21, wherein the information manager receives another request from the source to create the another branch in the branch and adds the another branch in the branch in response to receiving the another request.

23. The computer system of claim 22, wherein the client computer system in a group of client computer systems subscribes to the branch for the piece of information and the information manager sends a notification to the client computer system subscribing to the branch of an occurrence of at least of one a change in a format for the piece of information in the branch, an addition of additional information to the piece of information in the branch, a deletion of the piece of information in the branch, a modification of the piece of information in the branch, a change of a source controlling the piece of information in the branch, or an addition of the another branch in the branch.

24. A computer program product for accessing information, the computer program product comprising:

a non-transitory computer readable storage media;

program code, stored on the computer readable storage media, for receiving a request to change a piece of information from a source;

program code, stored on the computer readable storage media, for identifying an aggregate object in a graph database using an identifier in the request, wherein the aggregate object is an independently addressable node in the graph database that contains a hierarchical structure of branches, and wherein the branches are different versions of the piece of information that are effective at different time periods, and wherein the identifier identifies the branch;

program code, stored on the computer readable storage media, for changing the piece of information when the request is from a source that controls a portion of the information in which the branches for the piece of information are located in a location and the source is part of sources that control portions of the information in the location, wherein changing the piece of information comprises creating a new branch in the hierarchical structure, wherein the new branch includes a set of objects under the aggregate object, wherein the set of objects contain the changes made to the branch at the time period indicated by a transaction, and the identifier is a transaction identifier that identifies the transaction;

wherein the program code for creating the new branch in the hierarchical structure further comprises:

program code, stored on the computer readable storage media, for creating a branch name type node for the version of the piece of information;

program code, stored on the computer readable storage media, for linking the branch name type node to the branch within the hierarchical structure, wherein the branch name type node is a child node in the graph database to the object having properties affected by the set of the changes;

program code, stored on the computer readable storage media, for linking a snapshot to the branch name type node, wherein the snapshot is a child node in the graph database to the branch name type node;

program code, stored on the computer readable storage media, for linking a first set of objects to the snapshot within the hierarchical structure, wherein the set of objects are descendent nodes in the graph database to both the branch name type node and the snapshot; and program code, stored on the computer readable storage media, for linking a second set of objects to the snapshot within the hierarchical structure, wherein the second set of objects are existing objects in the graph database whose properties are not affected by the set of the changes.

25. The computer program product of claim 24, wherein the program code for creating the new branch in the hierarchical structure further comprises:

program code, stored on the computer readable storage media, for creating a snapshot for the version of the piece of information;

program code, stored on the computer readable storage media, for linking the snapshot to the branch within the hierarchical structure according to the time period indicated in the transaction, wherein the snapshot is a descendant node in the graph database to an object having properties affected by the set of the changes;

program code, stored on the computer readable storage media, for creating a first set of objects, wherein the first set of objects contain changed properties of the object; and program code, stored on the computer readable storage media, for linking the first set of objects to the snapshot within the hierarchical structure, wherein the first set of objects are descendent nodes in the graph database to the snapshot.

26. The computer program product of claim 24, wherein the branches have different formats and the different formats used are controlled by the source, and the branches have temporal data for pieces of the information and the temporal data is controlled by the source.

27. The computer program product of claim 26, wherein the different formats are selected from at least one of a file format for encoding information for storage in a computer file, an audio format, a video format, a data type, a primitive type, a numeric type, a type of data structure, a structure for a record, a structure for a table, a name of a field in a data structure, a type of encryption, a message format, a date format, a type of currency, a font type, a font size, or a language.

28. The computer program product of claim 24, wherein the location is between the sources and client computer systems that access the information in the location and further comprising: program code, stored on the computer readable storage media, for receiving a request from a client computer system in the client computer systems to create another branch in the branch for the piece of information; and program code, stored on the computer readable storage media, for sending the request to the source in the sources that controls the piece of information in the portions of the information at the location.

* * * * *